United States Patent [19]

Washisu et al.

[11] Patent Number: 5,402,202
[45] Date of Patent: Mar. 28, 1995

[54] SHUTTER DEVICE FOR A CAMERA

[75] Inventors: Koichi Washisu; Shinichi Matsuyama, both of Tokyo; Yasuhiko Shiomi, Kawaguchi, all of Japan

[73] Assignee: Canon Kabushiki Kaisha, Tokyo, Japan

[21] Appl. No.: 99,696

[22] Filed: Jul. 30, 1993

[30] Foreign Application Priority Data

Sep. 4, 1992 [JP] Japan .................................. 4-237430

[51] Int. Cl.$^6$ ............................................. G03B 7/095
[52] U.S. Cl. ................................................... 354/435
[58] Field of Search ............... 354/435, 436, 437, 439, 354/440, 234.1

[56] References Cited

U.S. PATENT DOCUMENTS

| | | | |
|---|---|---|---|
| 4,989,030 | 1/1991 | Naka et al. | 354/435 |
| 5,014,082 | 5/1991 | Farrington | 354/437 |

Primary Examiner—W. B. Perkey
Attorney, Agent, or Firm—Fitzpatrick, Cella, Harper & Scinto

[57] ABSTRACT

An exposure control device for a camera includes a first opening state determination device for digitally determining an aperture opening state, and a second opening state determination device for determining with an analog device the aperture opening state. A control means controls the aperture opening state in accordance with information from at least one of the first opening state determination device and the second opening state determination device.

46 Claims, 53 Drawing Sheets

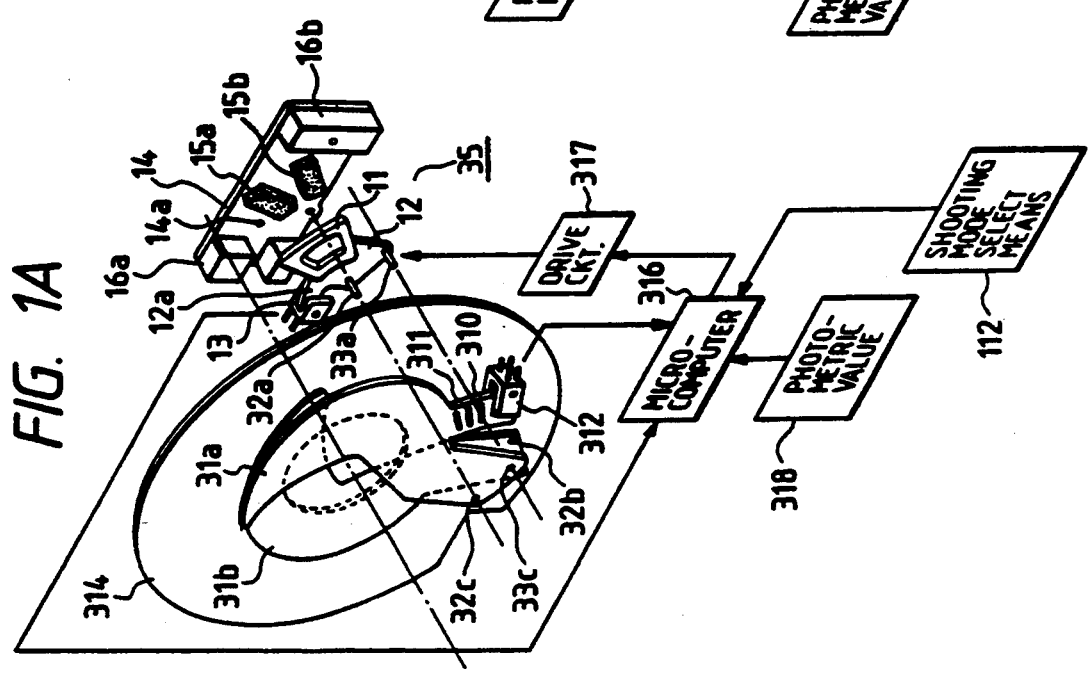

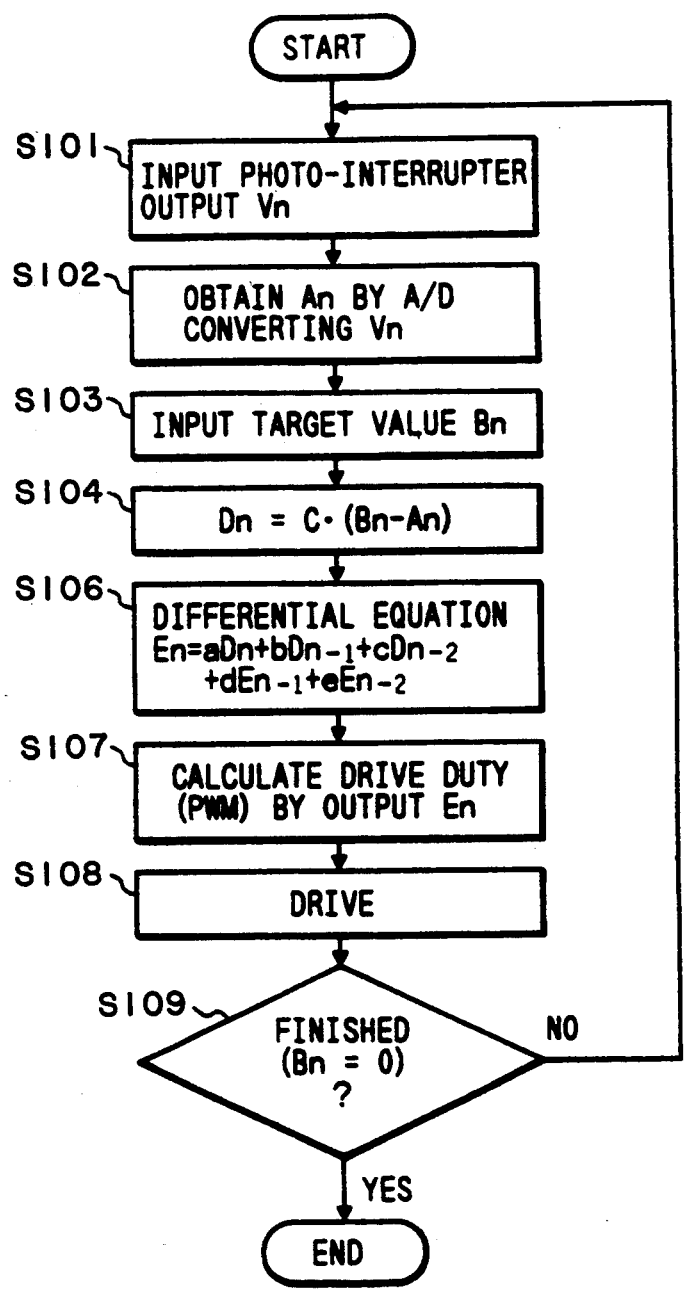

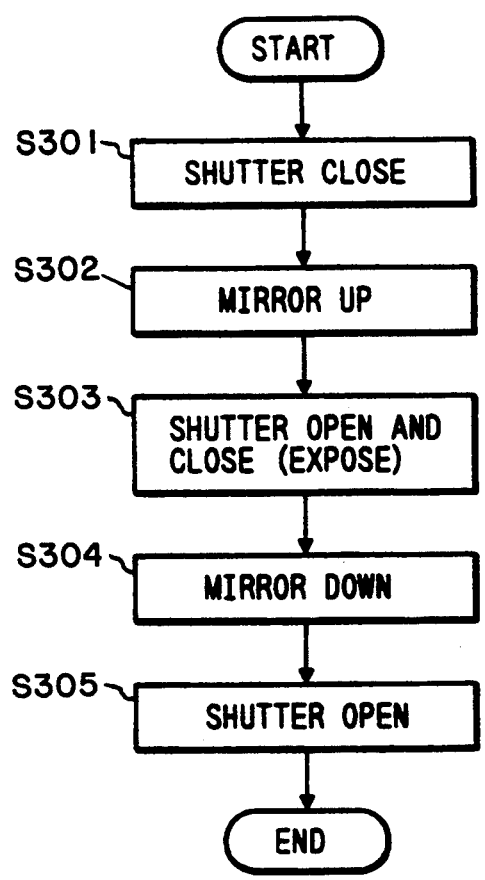

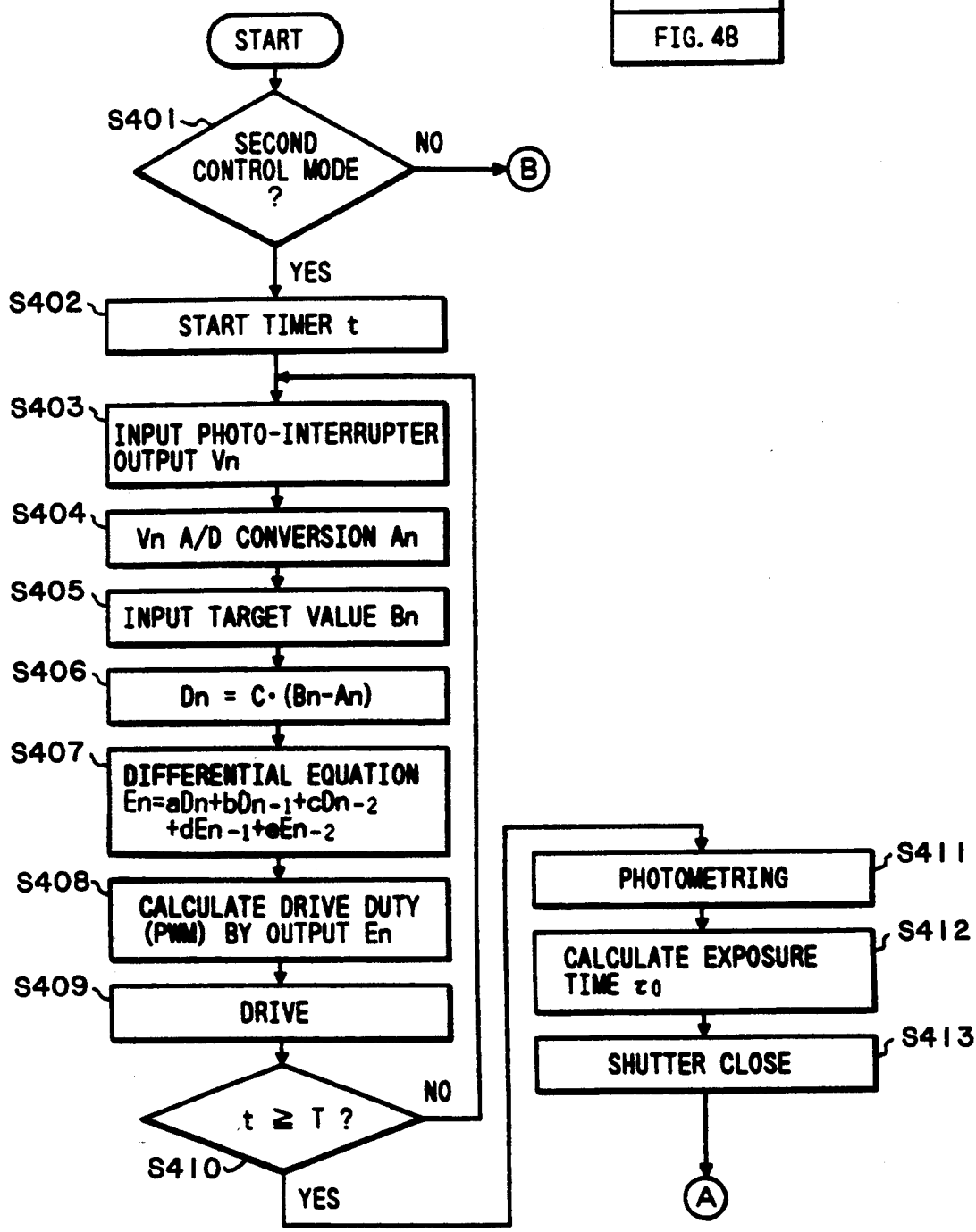

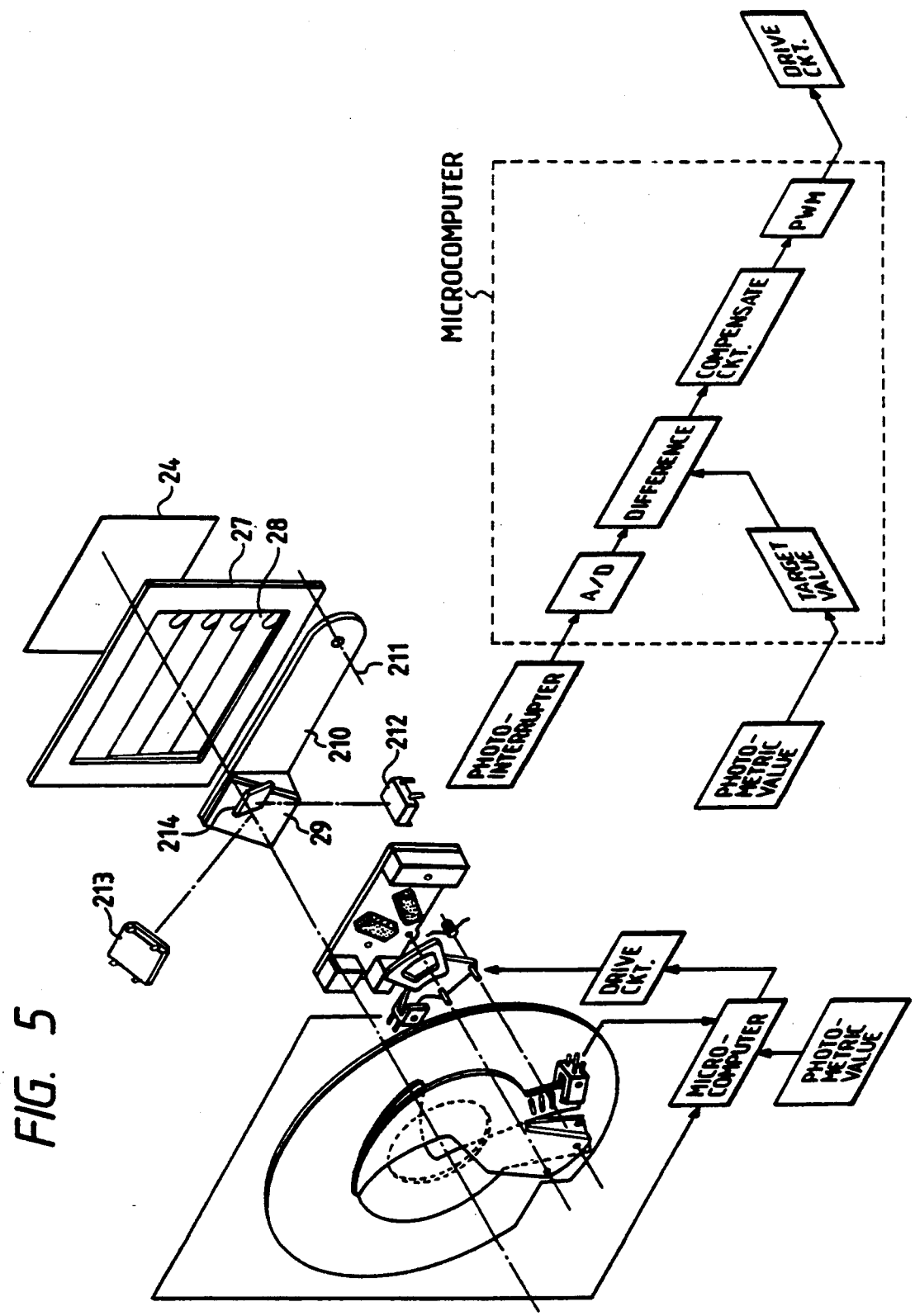

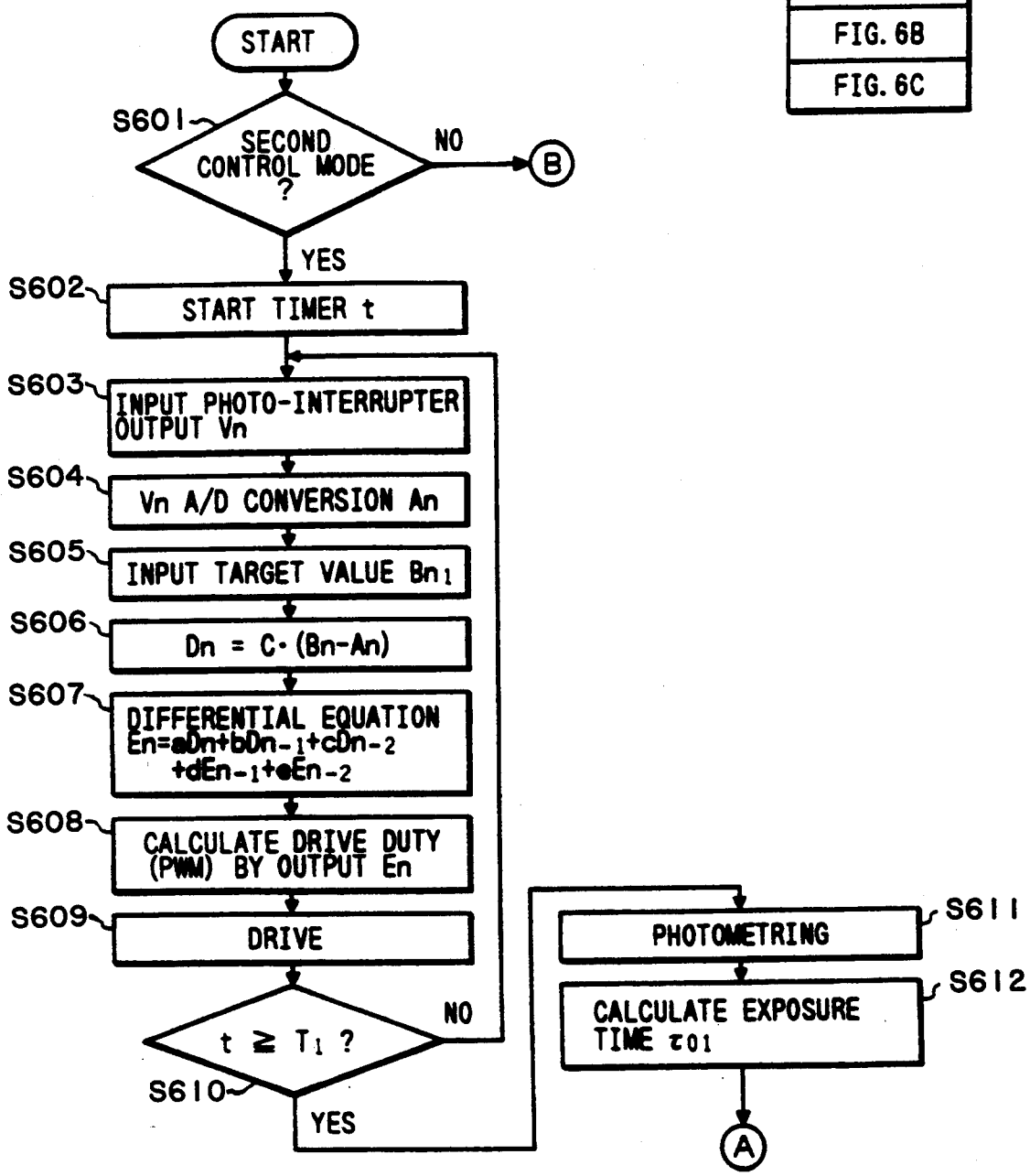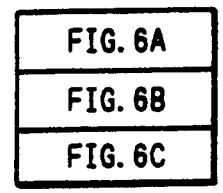

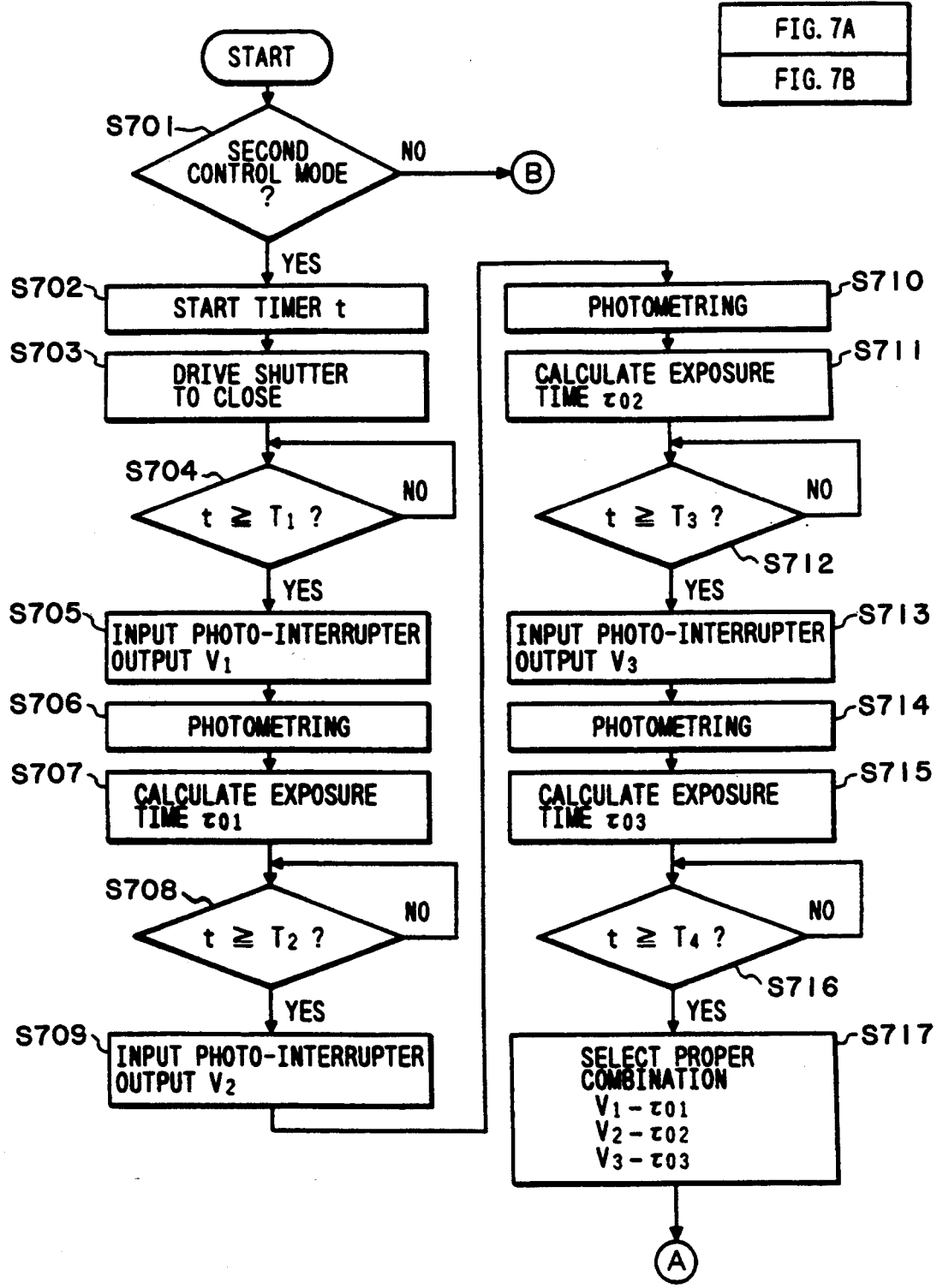

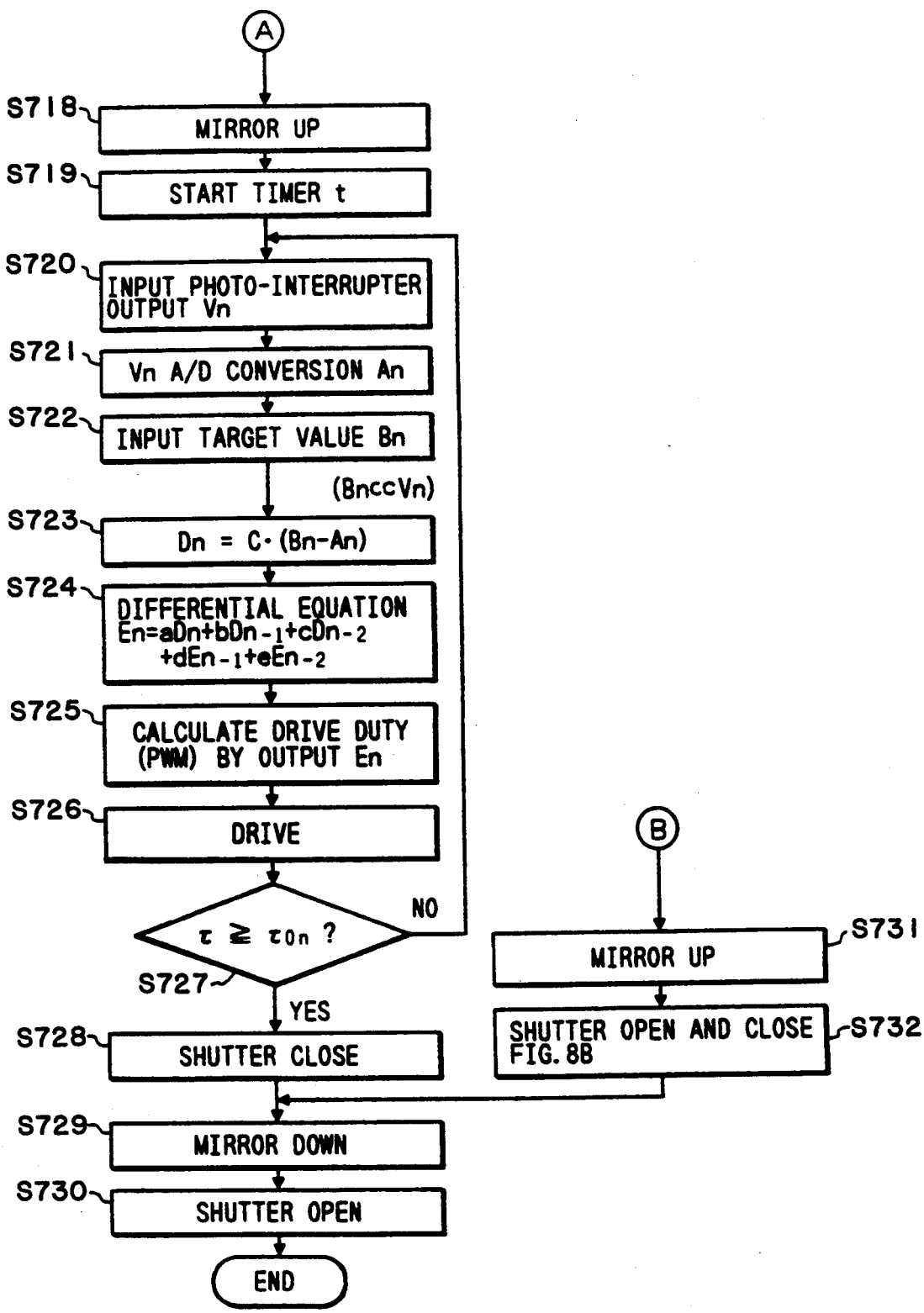

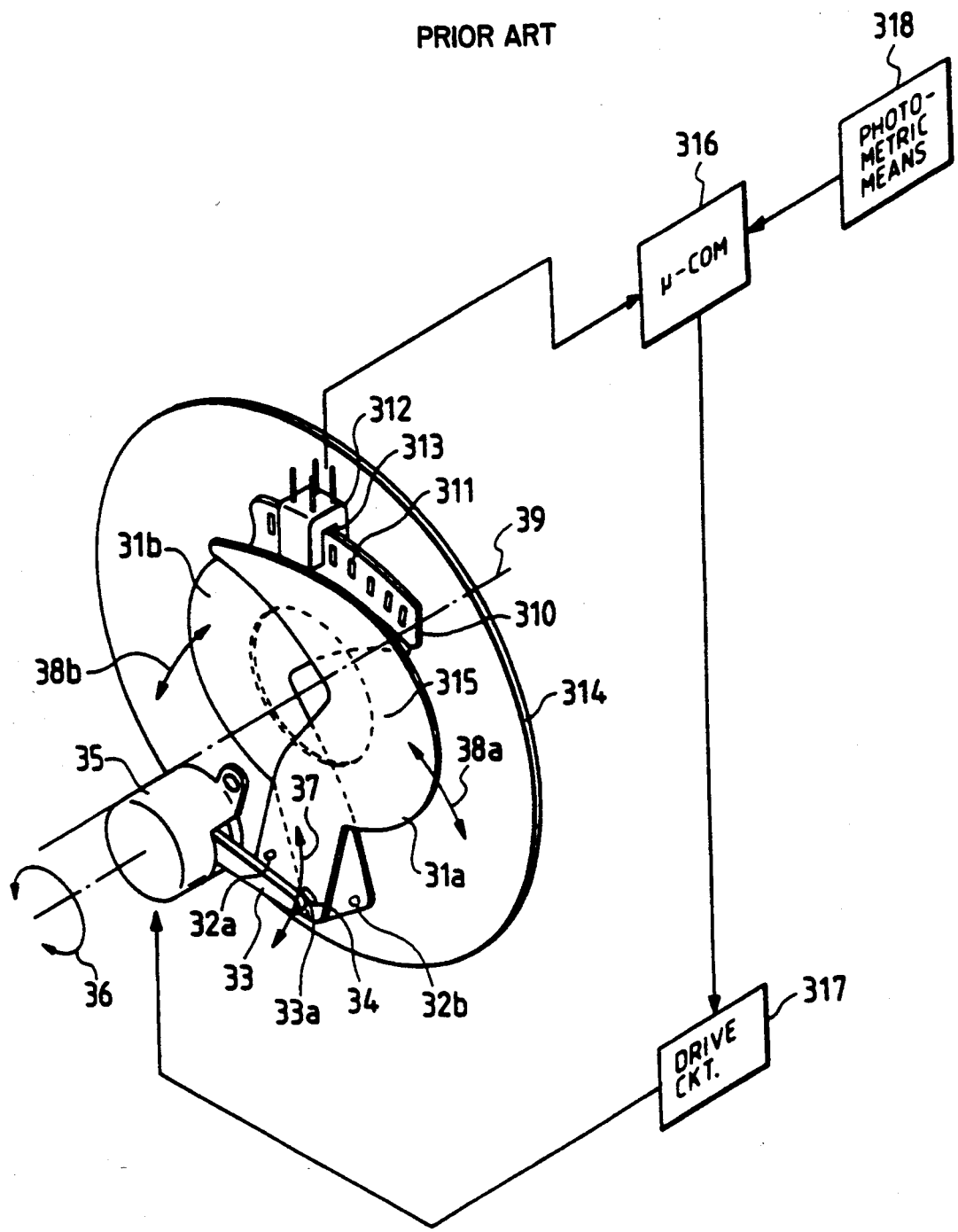

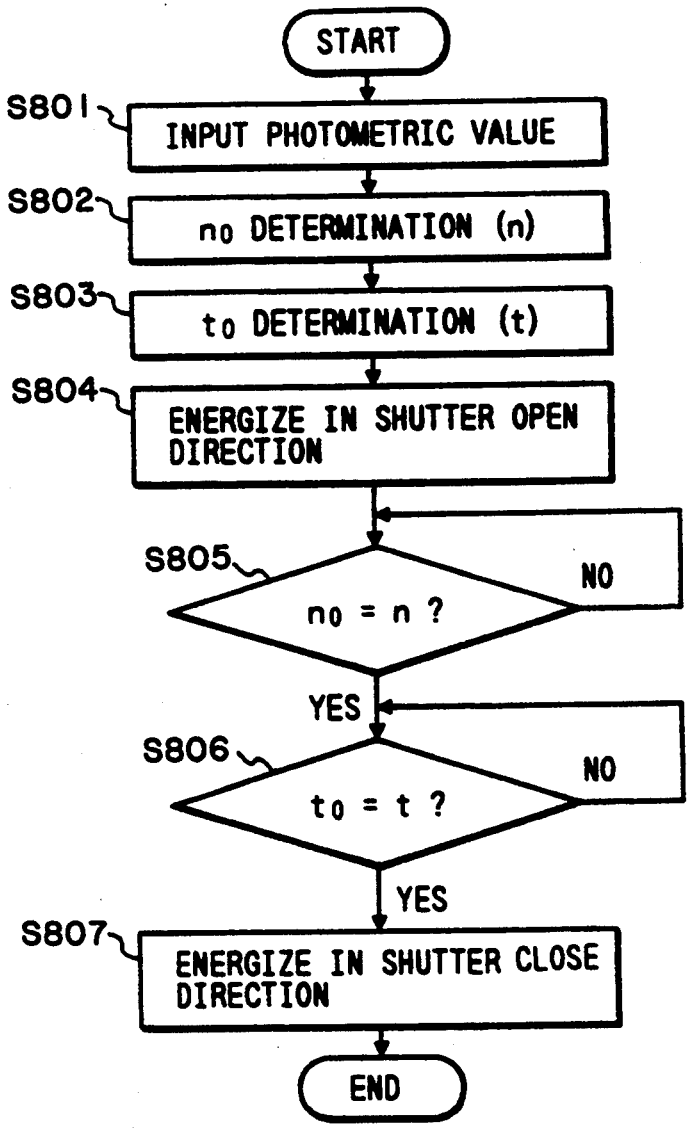

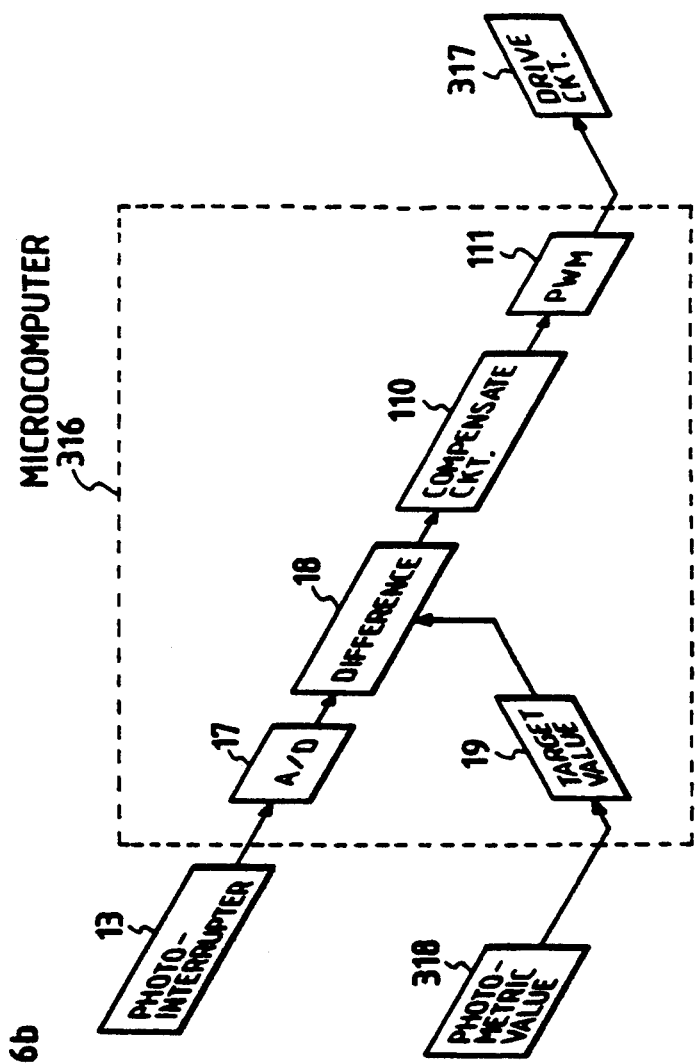
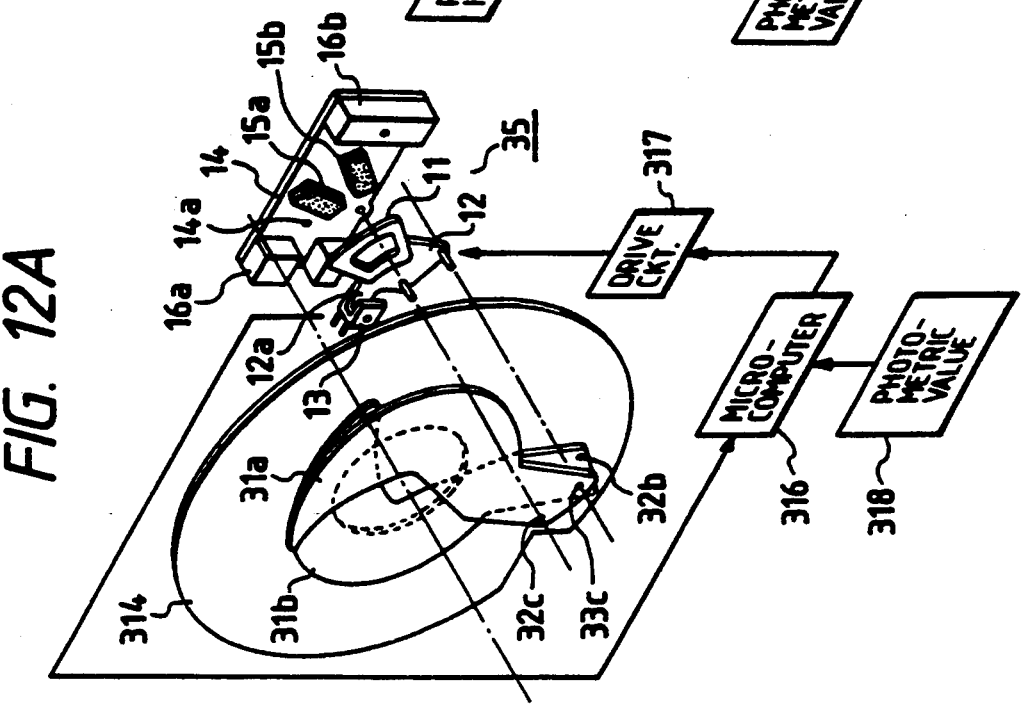

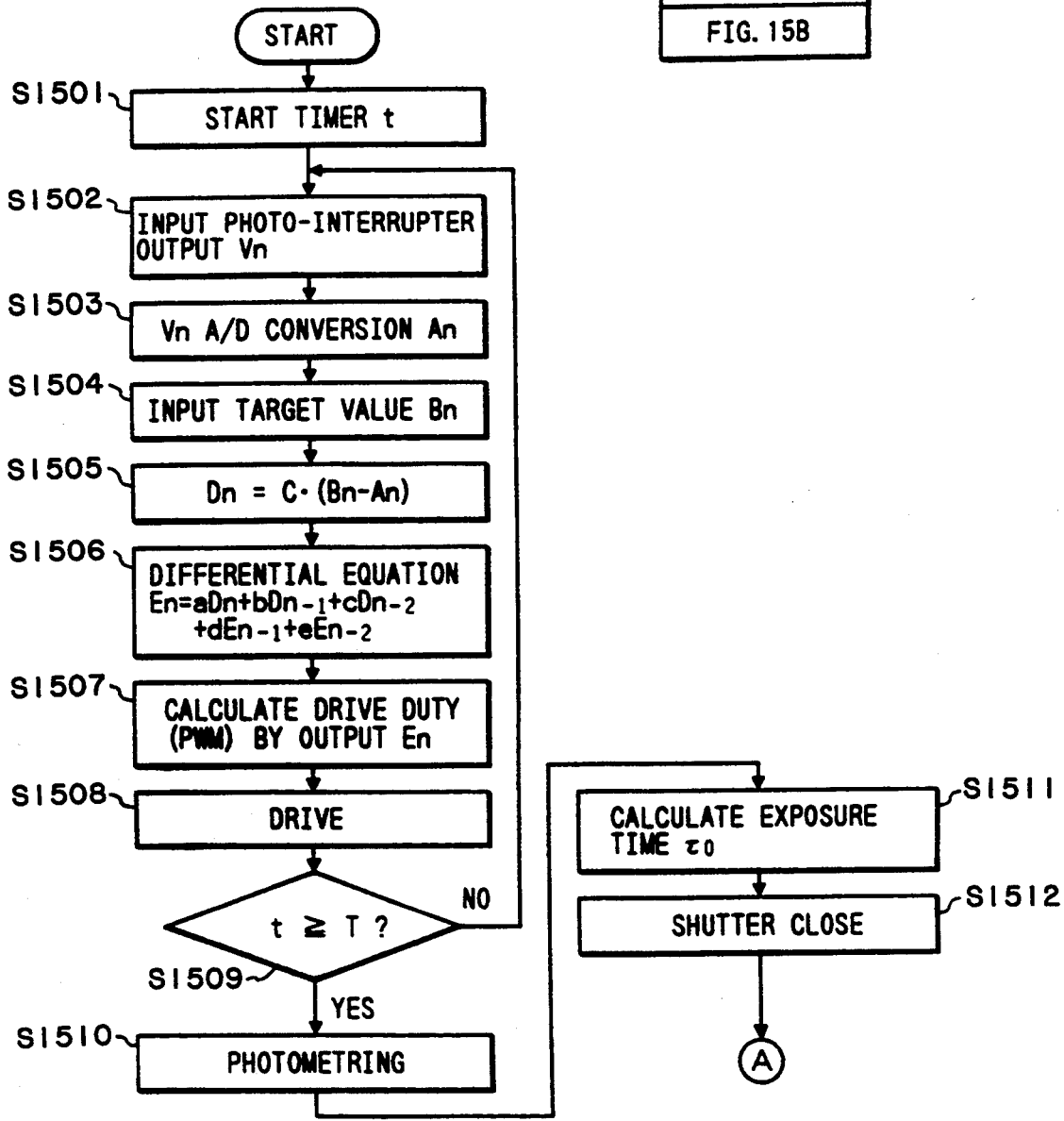

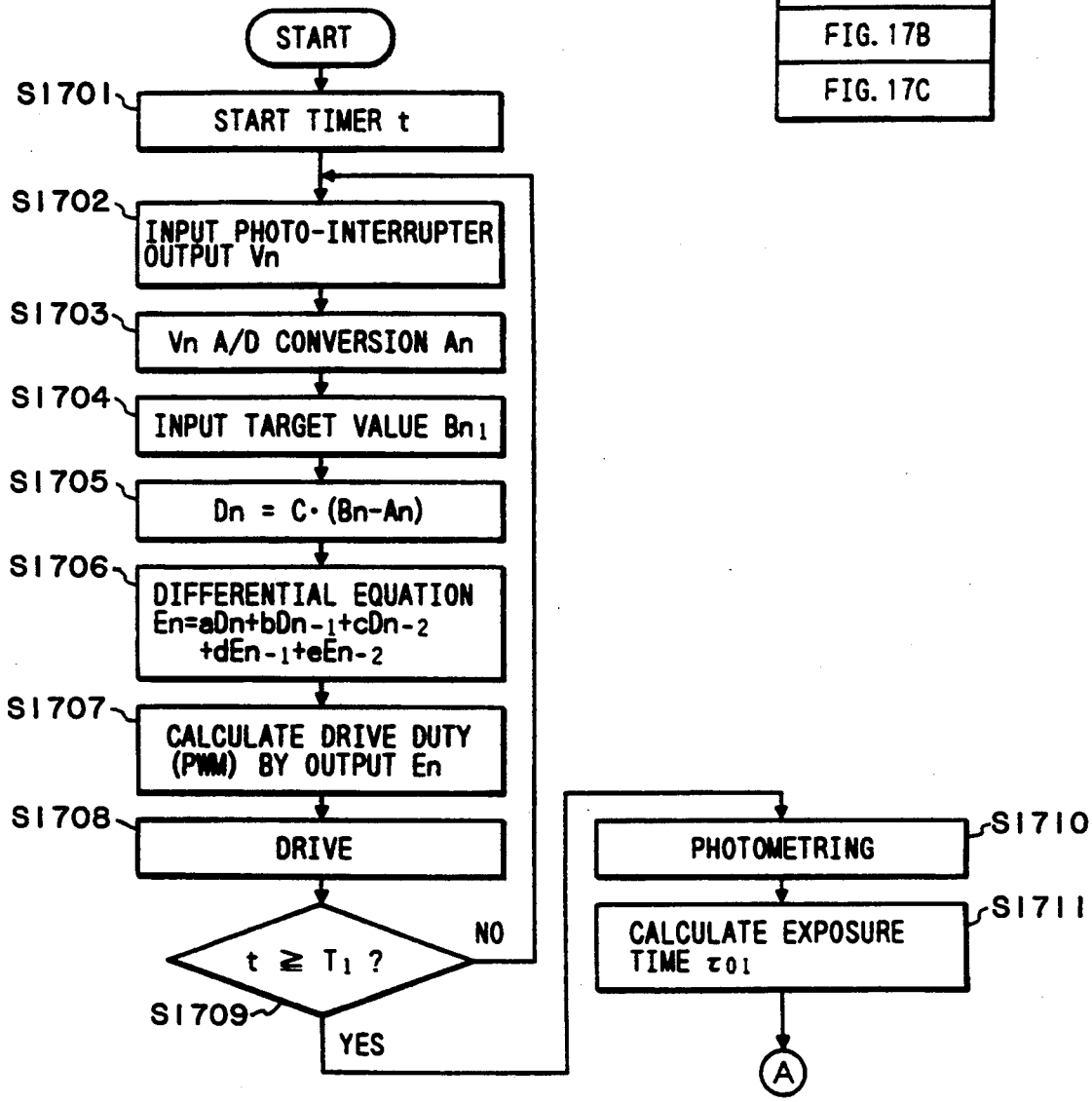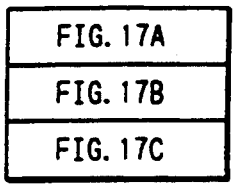

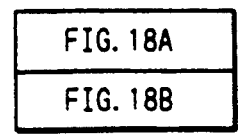
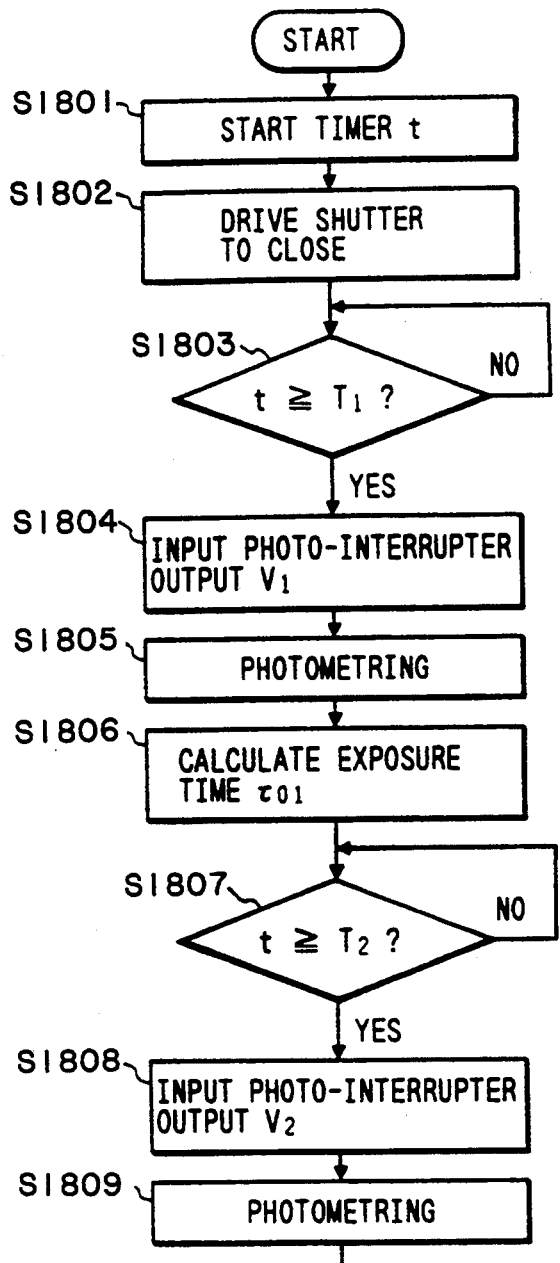
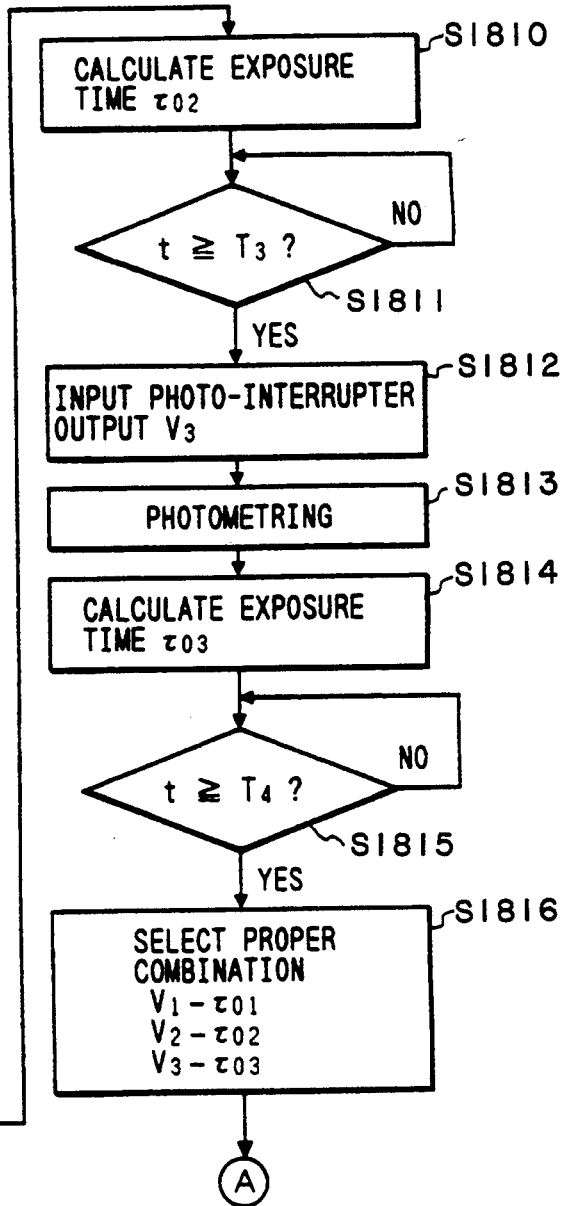

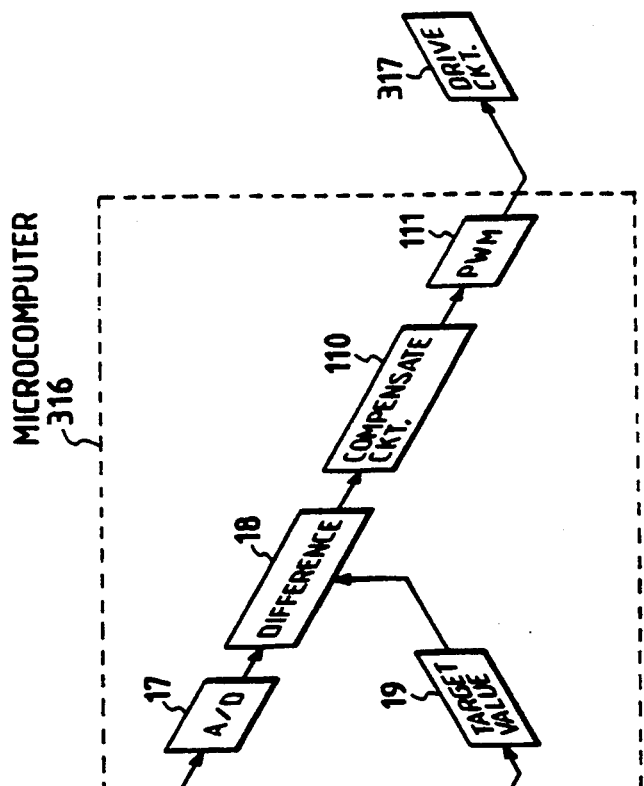
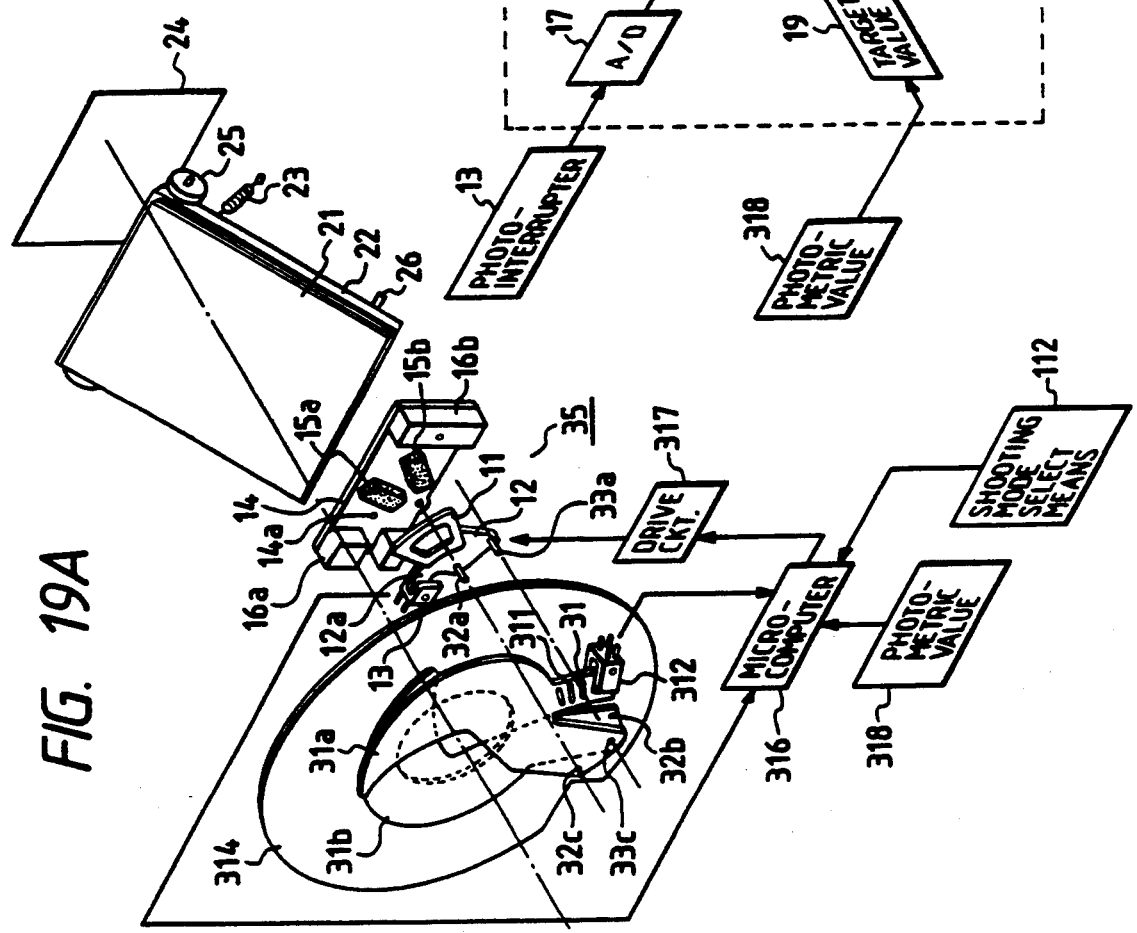
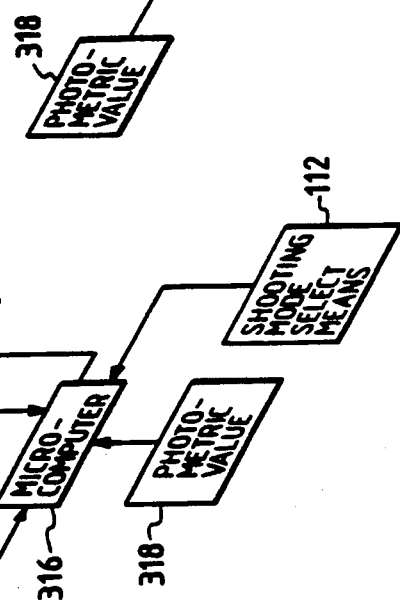
FIG. 19A
FIG. 19B

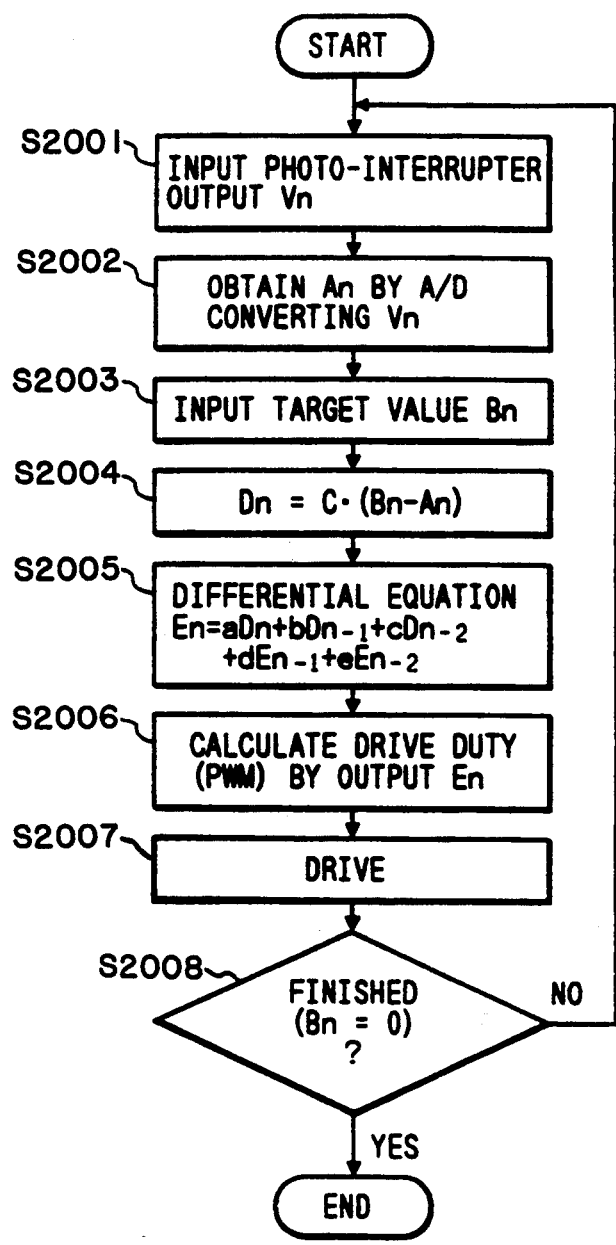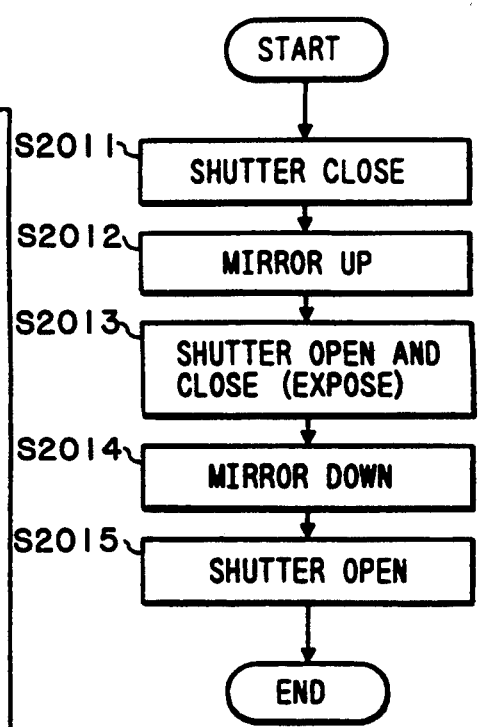
FIG. 20A
FIG. 20B

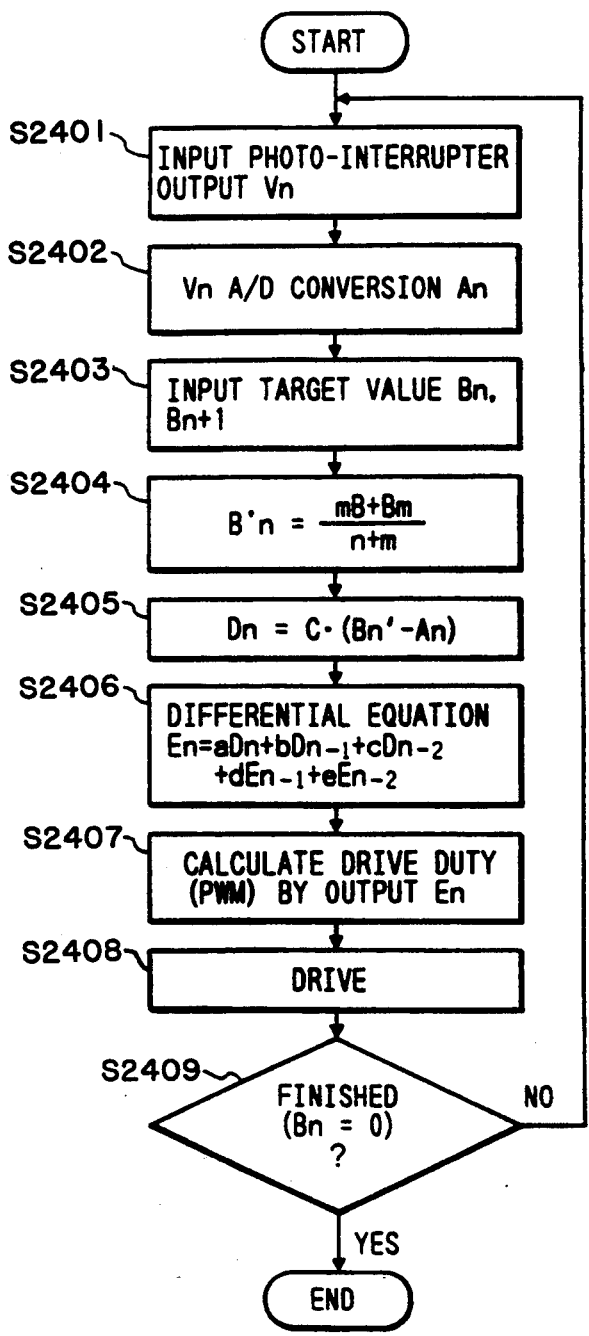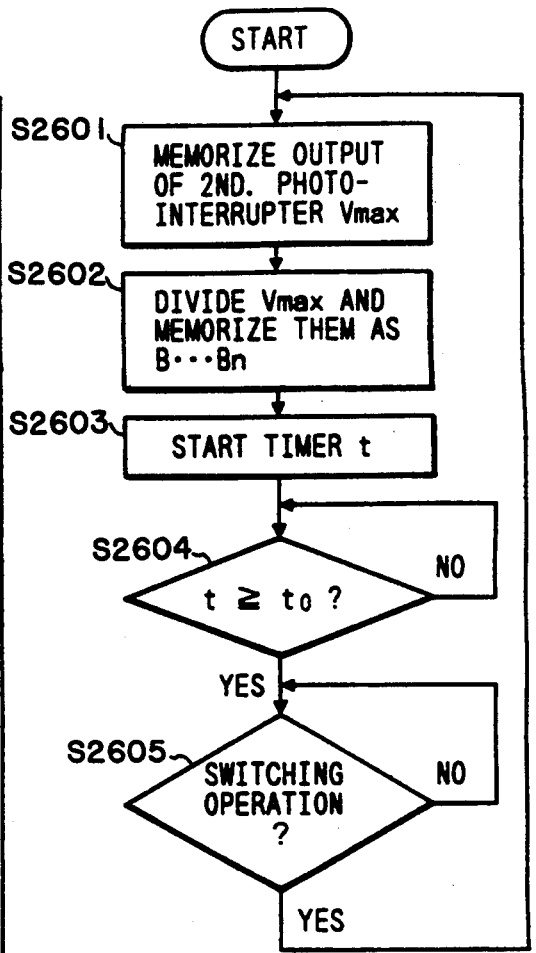

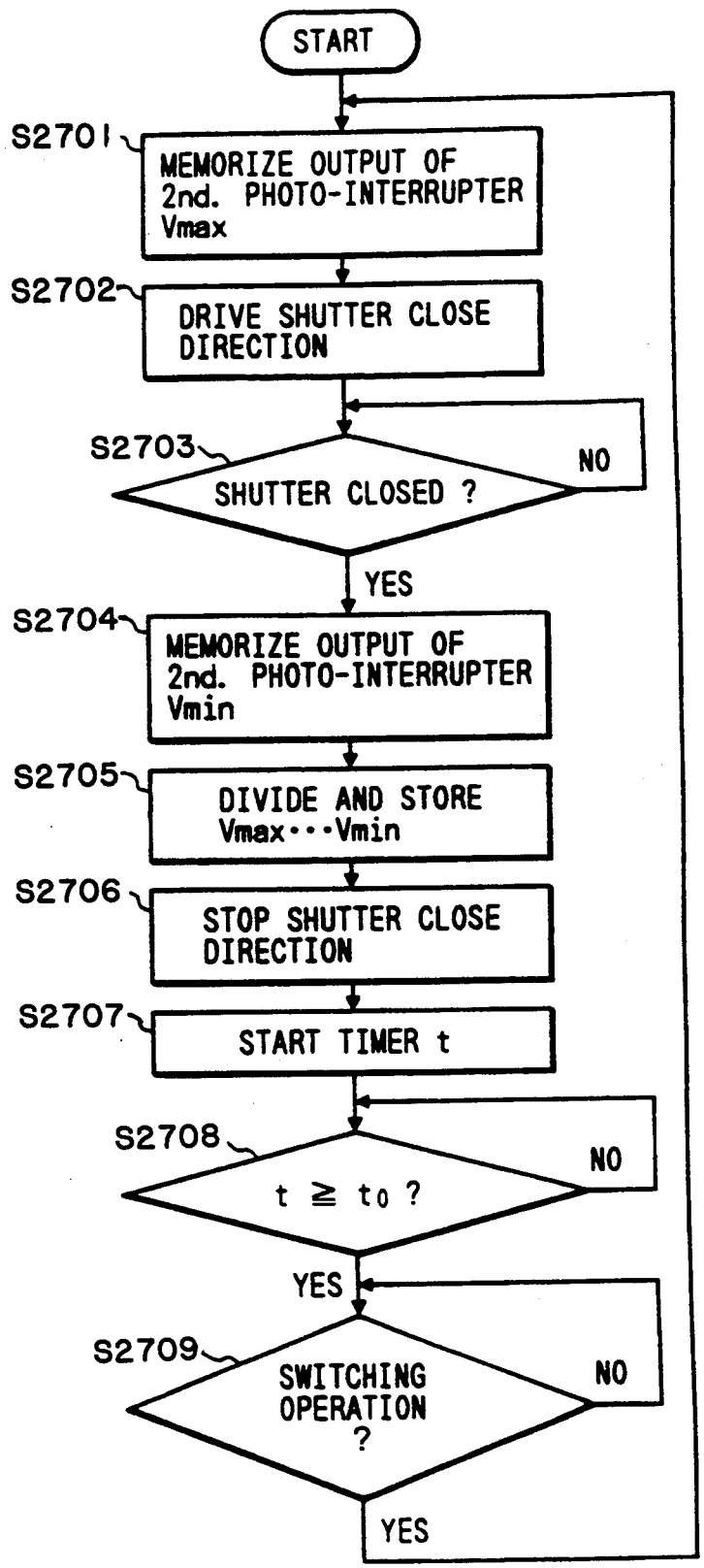

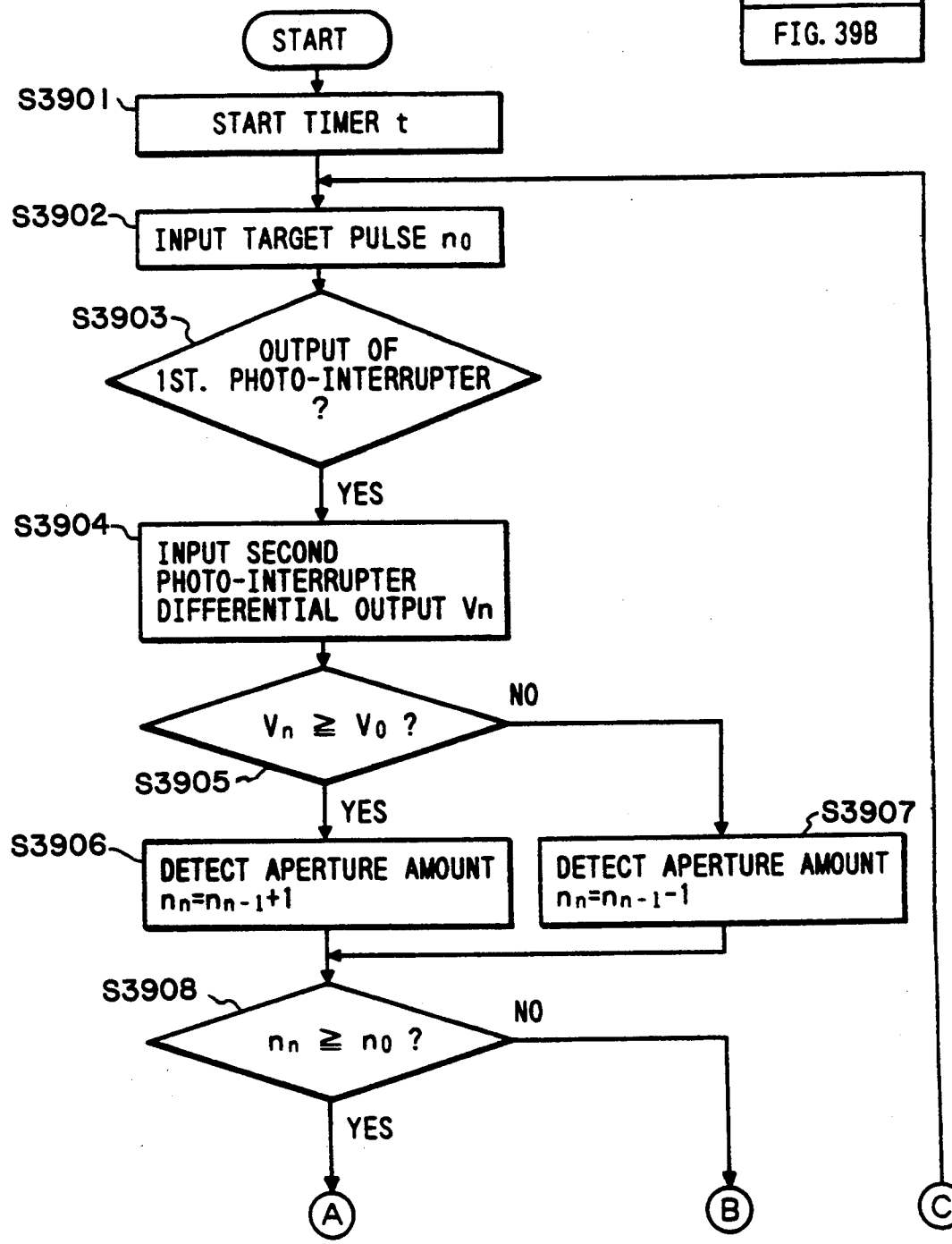

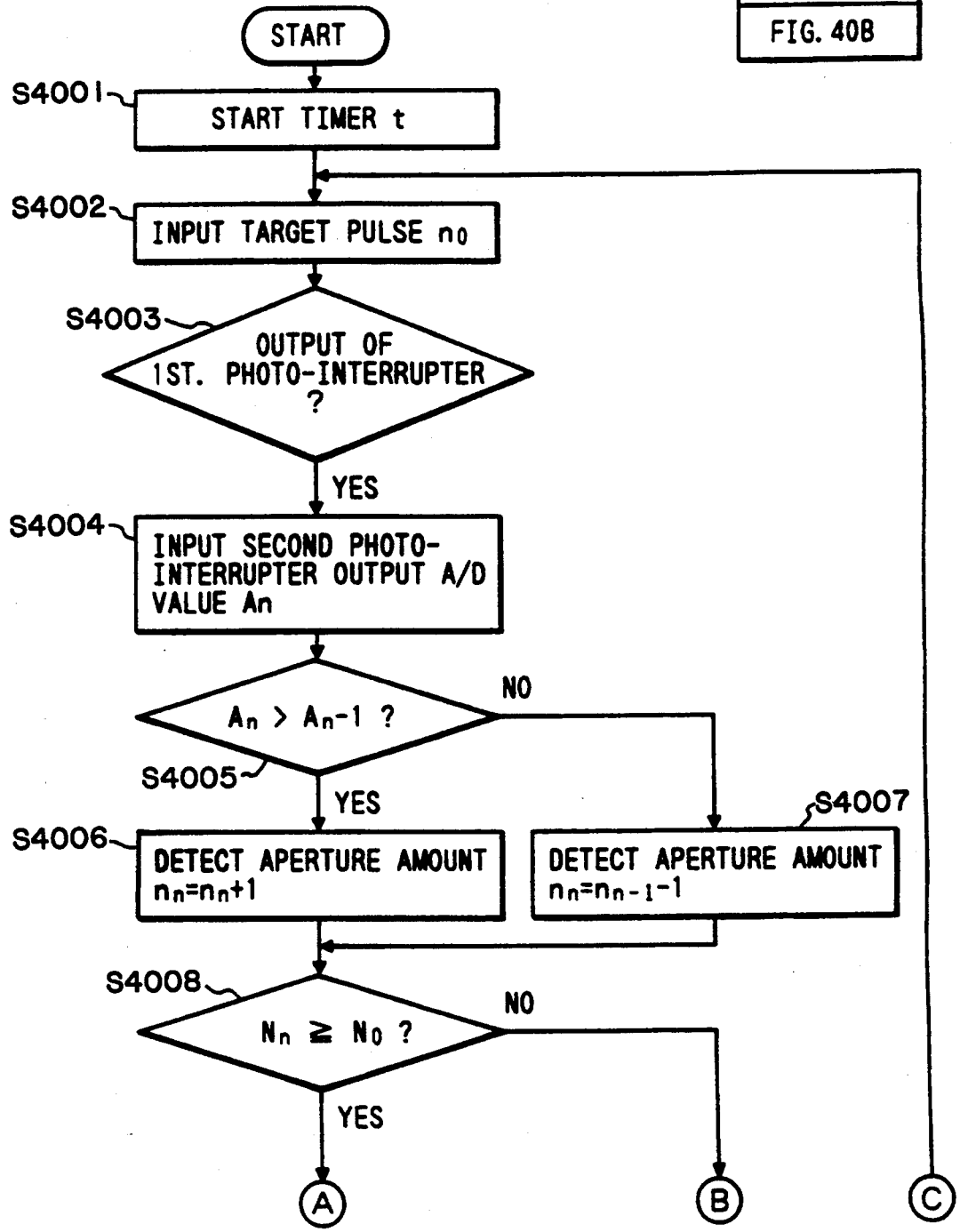

SHUTTER DEVICE FOR A CAMERA

BACKGROUND OF THE INVENTION

1. Field of the Invention

This invention relates to a shutter device for a camera, and particularly to a shutter device for a still camera.

2. Related Background Art

A stop and shutter (hereinafter referred to as a lens shutter) carried in a conventional compact camera, particularly a lens shutter carried in a high-class compact camera, is of such a construction as shown in FIG. 8A of the accompanying drawings.

In FIG. 8A, two shutter blades 31a and 31b are supported for rotation about shafts 32a and 32b, respectively, and a protruding shaft 34 provided on a lever 33 is fitted in slots 33a and 33b (the slot 33b being hidden and unseen behind the shutter blade 31a) formed in the respective shutter blades 31a and 31b. The lever 33 is mounted on an actuator 35, and the actuator 35, the lever 33 and the protruding shaft 34 together constitute driving means.

The actuator 35 is of the moving coil type and is rotatable in the direction of arrow 36 and therefore, the protruding shaft 34 is pivotally moved in the direction of arrow 37 through the intermediary of the lever 33, and the shutter blades 31a and 31b are driven in the directions of arrows 38a and 38b, respectively, by the slots 33a and 33b in which the protruding shaft 34 is fitted, thereby limit a light beam in the direction of the optical axis 39.

The shutter blade 31b is provided with a position indicating plate 310 which, in turn, is formed with a plurality of slits 311. The reference numeral 312 designates a photointerrupter which counts the number of the slits 311 passing through a space 313, thereby detecting the position of the shutter blade 31b, and thus detecting the positions of the two shutter blades 31a and 31b, i.e., the limited amount of the light beam in the direction of the optical axis 39, because the shutter blades 31a and 31b are driven substantially equal amounts by the protruding shaft 34 fitted in the slots 33a and 33b. The reference numeral 314 denotes the ground plate of the shutter, and the reference numeral 315 designates an opening (aperture) formed in the shutter ground plate.

In the above-described construction, the output of the photointerrupter 312 is input to the microcomputer 316 of a camera, a driving circuit 317 is controlled by the output of the microcomputer 316, and the actuator 35 is driven as controlled. The photometric value of an object from photometering means 318 is also input to the microcomputer 316, and the driving circuit is controlled by the photometric value and the output of the photointerrupter 312.

The method of control is such that for example, when the object is very light, the microcomputer 316 drives the shutter blades 31a, 31b in an opening direction by the pulse number of the pulse output of the photointerrupter 312 corresponding to the photometric value of the photometering means 318, and thereafter drive the shutter blades 31a, 31b in a closing direction, and when the object is dark, the microcomputer 316 drives the shutter blades 31a, 31b in the opening direction until the pulses of the photointerrupter 312 are all output (the shutter blades 31a, 31b become fully open), and continues to drive the shutter blades 31a, 31b in the opening direction still after that. In this case, the shutter blades 31a, 31b are fully open and are not driven as controlled any more in the opening direction by a stopper or the like, not shown, and remain fully open. After the lapse of a predetermined time, i.e., a sufficient time to expose the object to film, the shutter is driven in the closing direction to thereby fully close the shutter blades 31a, 31b.

Supplementing the above description of the operation, the shutter blades 31a, 31b are initially in their fully closed state, and by a shutter button being released, the shutter blades 31a, 31b are driven in the opening direction. Then, for example, when the object is light, the shutter is driven in the closing direction by a small pulse number, e.g. the two-pulse output of the photointerrupter 312 accompanying it, and when the object is dark, the shutter is driven in the closing direction after the lapse of a predetermined time after all the pulses of the photointerrupter 312 are output.

FIG. 8B of the accompanying drawings shows the flow of the driving operation of the shutter device of FIG. 8A. At a step S801, the photometric value of the object is input and on the basis thereof, at a step S802, the shutter opening diameter (aperture value) is found, and a corresponding count pulse n is obtained (the shutter is fully closed when $n=0$, and the shutter is fully open when $n=n_0$). Subsequently, on the basis of the input photometric value, at a step S803, a waiting time t is found. At a step S801, the shutter is electrically energized in the opening direction, whereby the shutter begins to be opened and a pulse is generated from the photointerrupter. At a step S805, when n pulses are generated, shift is made to the next step S806, and waiting is done for t seconds, whereafter at a step S807, the shutter is electrically energized in the closing direction, whereby the shutter is closed, thus terminating the operation. When the object is light, n is a small value and t is 0 or a very short time, and when the object is dark, $n=n_0$ and t is a long time. Therefore, when the object is light, the optical path is limited by the shutter blades 31a, 31b (the aperture area is small) and the opening time 41a is short, as shown in FIG. 9A of the accompanying drawings, and when the object is dark, the shutter is fully open and the opening time 41b becomes long.

In FIGS. 9A to 9I, the axis of abscissa represents time and the axis of ordinate represents the aperture area created by the shutter blades 31a, 31b being driven in the opening direction.

Here, consider a case where the photographer actually effects photographing. For example, in the case of a situation such as when a person who is the main object is to be photographed with a mountain as the background, the photographer often wants to take a photograph in which both the person and the mountain are in focus. When such a photograph is to be taken, it is necessary to stop down the aperture (reduce the shutter aperture area) as much as possible as shown in FIG. 9C and keep the shutter open until a sufficient time to expose the film. However, such a shutter blade driving method cannot be realized by the example of the prior art shown in FIGS. 8A and 8B, because in the example of the prior art shown in FIGS. 8A and 8B, the shutter can be driven only in the opening or closing direction and cannot be kept in a stopped-down state (a state of small aperture area).

In FIG. 8A, it seems that the shutter can be kept in the stopped-down state if in order to keep the shutter in the stopped-down state, for example, the shutter blades 31a, 31b begin to be opened and the shutter is operated in the closing direction after the photointerrupter 312 outputs two pulses, and the shutter blades continue to be driven in the closing and opening directions in conformity with an increase or a decrease in the pulses thereafter, but actually, the photointerrupter 312 can detect the number (pulses) of the slits 311 which have passed therethrough, but cannot know the direction in which they pass (an increase or a decrease in the pulses). For example, the photointerrupter cannot discriminate between a case where even if the shutter is electrically energized in the opening direction and after two pulses are output, the shutter begins to be electrically energized in the opposite direction, the shutter still moves in the opening direction due to its inertia and one pulse is output and then the shutter begins to be driven in the closing direction and −1 pulse is output and a predetermined desired aperture diameter is attained, and a case where the shutter is electrically energized in the opening direction and two pulses are output, whereafter the shutter begins to be electrically energized in the opposite direction and the shutter still moves in the opening direction due to its inertia and two pulses are output. That is, the photointerrupter cannot know the direction in which the shutter is being driven and therefore, the shutter cannot be kept in its stopped-down state. To keep the aperture in its stopped-down state, there is available a system as used in a video camera wherein the difference between the quantity of light incident on an image pickup element 51 shown in FIG. 10 of the accompanying drawings and a command value 52 is amplified by an amplifying circuit 53 and the shutter blades 31a, 31b are driven by the output of the amplifying circuit 53. In this case, the image pickup element 51 can detect the quantity of light incident thereon and the direction of increase or decrease in the quantity of light and therefore, can keep the aperture in a state in which the quantity of light incident on the image pickup element 51 is optimum.

Of course, it is impossible in terms of space and cost to prepare an image pickup element 51 in a still camera, but if from a similar point of view, as shown in FIG. 11 of the accompanying drawings, a hole 61 gradually widening along the opening direction of the shutter blade 31b is formed through a position indicating portion 310, the output of the photointerrupter will be varied by the position of the shutter blade 31b, and the position and direction of driving of the shutter blade 31b can be known from that output and the shutter blade 31b can be held by that output. That is, when in FIG. 11, the shutter blades 31a, 31b are driven in the opening direction, the output of the photointerrupter 312 becomes greater, but when the output of the photointerrupter 312 is smaller than the output of the microcomputer 316 conforming to the aperture value (aperture area) determined by the photometric value of the photometering circuit 315, the output difference is amplified by the amplifying circuit 53 and the driving circuit drives the driving means to thereby open the shutter blades 31a, 31b.

As the output of the photointerrupter 312 becomes approximate to the output of the microcomputer 316, the driving force of the driving means driving the shutter blades 31a, 31b in the opening direction becomes weak, and when the output of the photointerrupter 312 becomes equal to the output of the microcomputer 316, the driving force in the opening direction becomes null.

However, the shutter blades 31a, 31b move further in the opening direction due to their inertia forces and therefore, the output of the photointerrupter 312 becomes greater than the output of the microcomputer 316. Thereupon, the polarity of the output difference is now reversed and therefore, the driving circuit 317 drives the driving means in the opposite direction via the amplifying circuit 53 and drives the shutter blades in the closing direction. When the output of the photointerrupter 312 again becomes smaller than the output of the microcomputer 316, the shutter blades 31a, 31b are again driven in the opening direction.

By such repetition, the shutter blades 31a, 31b become gradually stabilized into a predetermined aperture value determined by the output of the microcomputer 316. When the output of the microcomputer 316 becomes small after the lapse of a predetermined exposure time, the shutter blades are driven in the closing direction so that the output of the photointerrupter 312 may become small (that is, the shutter blades may be closed), whereby the shutter is closed. If an attempt is made to drive the shutter blades 31a, 31b as shown, for example, in FIG. 9C, the output of the microcomputer 316 can be put out at a low level for a long time as shown in FIG. 9F, and if the shutter blades are driven as shown in FIG. 9B, the output of the microcomputer 316 can be put out at a high level as shown in FIG. 9E, and if the shutter blades are driven as shown in FIG. 9A, the output of the microcomputer 316 can be put out at a low level for a short time as shown in FIG. 9D, and the method of driving the shutter blades can be freely controlled by the magnitude and output time of the output of the microcomputer.

The output of the microcomputer itself (the output in the microcomputer) can be output only as a binarized value and therefore, even if the output interval δt is varied as shown in FIGS. 9D, 9E, 9F, 9G, 9H and 9I and is passed through a conventional smoothing circuit to thereby create the outputs of FIGS. 9D, 9E and 9F, the numerical data in the microcomputer can be converted into an analog output by a D/A converter to thereby create the outputs of FIGS. 9D, 9E and 9F.

A technique of detecting the amount of driving as shown in FIGS. 10 and 11 and automatically driving the shutter blades so as to decrease the difference between the value thereof and a target value is called an automatic control technique, and such a technique is used in a variety of fields.

However, an attempt to control the shutter aperture area (aperture) precisely in the example of the prior art shown in FIG. 11 has led to the following disadvantages.

There is an individual difference in the sensitivity output of the photointerrupter 312, and when for example, in FIG. 11, the output of the photointerrupter when the shutter is fully closed is $V_1$ and the output when the shutter is fully open is $V_2$ and the difference therebetween is $V_3$, assuming that the photointerrupter has been replaced by a new one and the output thereof when the shutter is fully closed is $V_{11}$ and the output thereof when the shutter is fully open is $V_{22}$ and the difference therebetween has become $V_{33}$, $V_1$ and $V_{11}$, $V_2$ and $V_{22}$, and $V_3$ and $V_{33}$ do not coincide very much with each other. Also, $V_1$, $V_2$ and V vary considerably with temperature and time. This has led to the disadvantage that even if the output of the photointerrupter is controlled so as to assume a target value, the actual aperture area varies with the individual difference, temperature and time and a correct aperture diameter is not obtained.

Also, in the shutter operation as in the prior art (the shutter operation described above in connection with FIGS. 8A and 8B) as well as during the stop-down slow shutter mode (i.e., when the aperture is stopped down so that both of the object and the background may be in focus, and long shutter time exposure is effected), the amount of opening is not controlled accurately and the exposure onto the film becomes "over" or "under".

SUMMARY OF THE INVENTION

One aspect of the invention is to provide a shutter device for a camera provided with a first control mode for controlling the amount of opening of a shutter on the basis of first opening amount detecting means for digitally detecting the amount of opening of the shutter, and a second control mode for controlling the amount of opening of the shutter on the basis of a second opening amount detecting means for analogously detecting the amount of opening of the shutter.

BRIEF DESCRIPTION OF THE DRAWINGS

FIGS. 1A to 1B show a shutter device in a first embodiment of the present invention.

FIG. 1C is a flow chart of the operation of the shutter device shown in FIGS. 1A and 1B.

FIG. 3 is a flow chart illustrating the operation of the first embodiment.

FIG. 5 shows a shutter device in a second embodiment of the present invention.

FIG. 7 is comprised of FIGS. 7A and 7B, which are flow charts illustrating the operation of a fourth embodiment of the present invention.

FIG. 8A and 8B show a shutter device according to the prior art.

FIGS. 12A and 12B show a shutter device in a fifth embodiment of the present invention.

FIGS. 19A and 19B show shutter devices in a ninth embodiment of the present invention.

FIGS. 20A and 20B are flow charts illustrating the operation of the ninth embodiment.

FIG. 24 is a flow chart illustrating the operation of an eleventh embodiment.

FIG. 26 is a flow chart illustrating the operation of the twelfth embodiment.

FIG. 27 is a flow chart illustrating the operation of a thirteenth embodiment.

DESCRIPTION OF THE PREFERRED EMBODIMENTS

Figure 2:
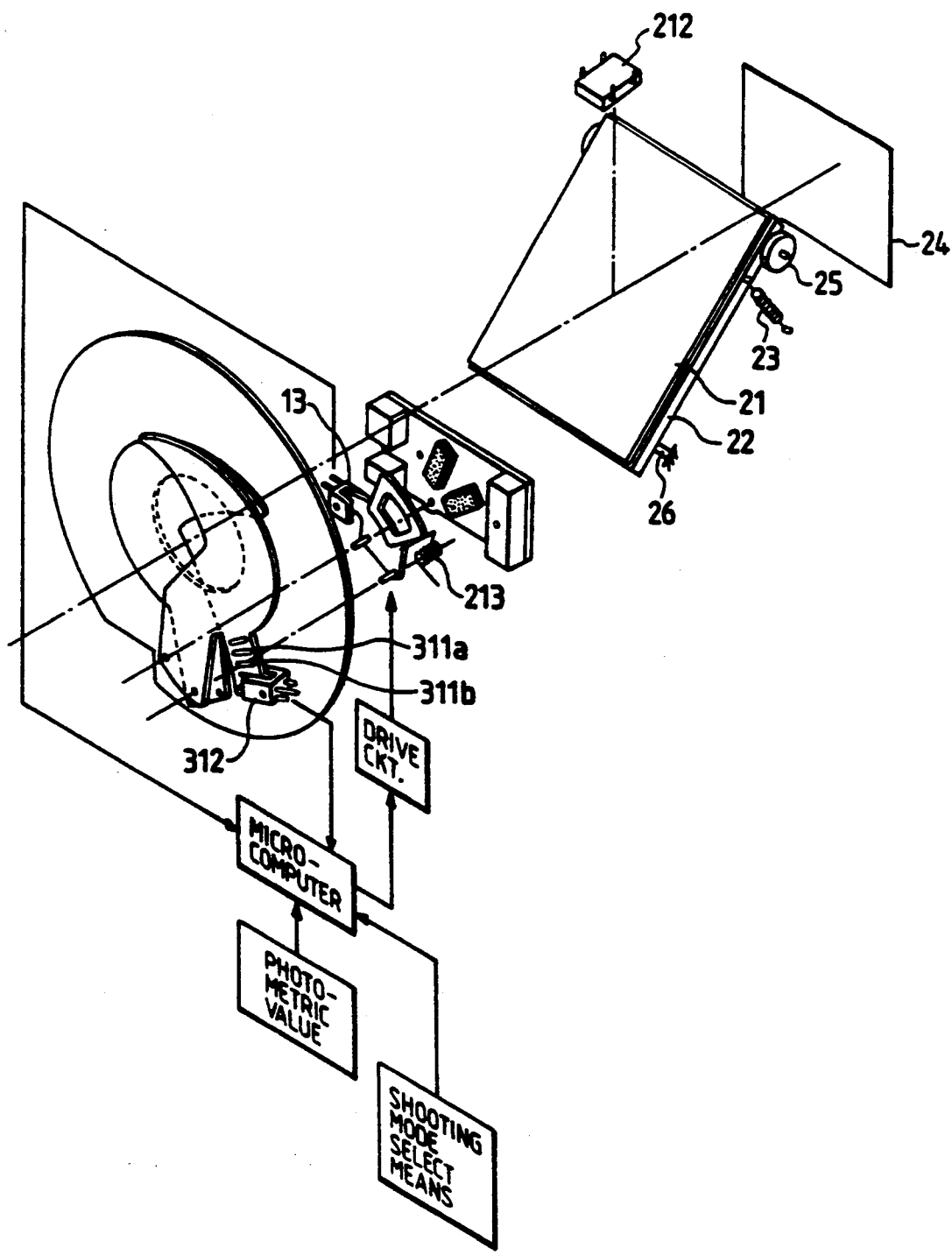
FIG. 2 shows the shutter device as the first embodiment.

Referring to FIGS. 1 to 4 which show a first embodiment of the present invention, members functionally similar to those in the example of the prior art are designated by similar reference characters and need not be described. The differences of this embodiment from the example of the prior art are that the actuator 35 is comprised of a flat coil 11, a base member 12, permanent magnets 15a, 15b opposed to the flat coil, a yoke 14 and a base 314 (which is a magnetic member and serves also as a yoke) with the flat coil 11 and the base member 12 interposed therebetween, and spacers 16a, 16b, and that a protruding portion 12a is provided on the base member 12 and is inserted in a second photointerrupter 13 (the photointerrupter 312 will hereinafter be referred to as the first photointerrupter)

Protruding shafts 32a and 33a are inserted from the base member 12 into holes 32c and 33c, respectively, in a shutter 31a, and by the flat coil 11 being electrically energized, the base member 12 is rotated about the protruding shaft 32a to thereby open or close shutters 31a and 31b (a slot 33c in the shutter 31b is also fitted over the protruding shaft 33a). With the rotation of the base member 12, the protruding portion 12a adjusts the quantity of intercepted light of the second photointerrupter 13, and when the shutter is fully open, the protruding portion 12a does not come into the second photointerrupter 13 and does not effect the light interception between the light projecting and receiving portions of the second photointerrupter 13, and when the shutter is fully closed, the protruding portion 13 fully comes into the second photointerrupter 13 to thereby completely intercept the light between the light projecting and receiving portions. Design is made such that when the shutter is in its intermediate position (stopped-down state), the protruding portion 12a comes about half into the second photointerrupter 13 to thereby intermediately intercept the light between the light projecting and receiving portions. The photointerrupter 13 is screwed in the threaded hole 14a of the yoke 14. Therefore, automatic control similar to that described in connection with FIG. 11 can be accomplished by the second photointerrupter 13 and actuator 35, and the output of the second photointerrupter 13 can be introduced into the microcomputer 316 and compared with the target value to thereby determine the direction of driving of the actuator.

This will now be described in more detail. The second photointerrupter 13 effects an output conforming to the opening of the shutter, and effects the greatest output when the shutter is fully open, effects zero output when the shutter is fully closed, and effects medium output when the shutter is in its stopped-down state. The second photointerrupter detects by analog means the amount of opening of the shutter by the output magnitude of the output thereof. The output of the second photointerrupter 13 is A/D-converted by an A/D converter 17 in the microcomputer 316 shown in FIG. 1B and is made into numerical data, and is converted into a numerical value 0 when for example, the output of the second photointerrupter 13 is zero, and is converted into a numerical value 2048 when the output of the second photointerrupter 13 is maximum.

On the other hand, a target value 19 is set in conformity with the photometric value 318, and for example, an output (numerical value 1024) corresponding to the output of the second photointerrupter 13 in the stopped-down state is output from a target value circuit 19, and the difference between this output and the A/D-converted value 17 is found by a difference network 18 and is passed through a compensation circuit 110 (which will be described later), and the duty cycle driving is determined by PWM (pulse width modulation) 111 and sent to a driving circuit 317. PWM 111 outputs a duty cycle of 0:10 when the difference between the output of the target value circuit 19 and the A/D-converted value 17 is zero, and does not effect driving with the rate of the energization of the driving circuit as zero, and as the difference becomes greater, the rate of the energization of the driving circuit is increased to e.g. 5:5, 7:3, etc. ( for example, the driving circuit is energized for 0.7 msec. of 1 msec. and is deenergized for 0.3 msec.) to thereby increase the drive force. Also, the design is made such that when the difference between the output of the target value circuit 19 and the output of the A/D-converted value 17 is reversed, the rate of driving is increased as described above as the difference becomes greater, but the direction of electrical energization becomes opposite.

Therefore, when the shutter is initially fully closed and the output of the second photointerrupter 13 is zero, the target value is 1024, whereas the A/D-converted value 17 is 0 and thus, the difference therebetween is very great, and the driving circuit 317 is substantially fully energized to thereby drive the shutter in the opening direction, and as the difference becomes smaller, the drive force is weakened. Automatic control is effected such that when the A/D conversion output becomes 1024 or greater (when the shutter goes too far due to its inertia force and reaches a target aperture or greater), the flat coil 11 is reversely energized in conformity with that difference, whereby the A/D conversion output 17 reaches the target value 1024.

FIG. 1C shows the above-described flow, which starts by a release button being depressed, and at a step S101, the output $V_n$ of the second photointerrupter 13 is input, and at a step S102, A/D conversion is effected to thereby obtain $A_n$ in conformity with $V_n$. At a step S103, the then target value $B_n$ is input, and at a step S104, the difference n between $A_n$ and $B_n$ is found to thereby find a value $D_n$ amplified to C times. A step S105 is a portion corresponding to a compensation circuit 20, i.e., a phase compensating filter portion having the function of enhancing the degree of stability of automatic control, and more particularly, a phase compensating portion using a conventional digital filter for multiplying $D_n$ and $D_{n-1}$, $D_{n-2}$ (values introduced by the last and before-last loops) and $E_{n-1}$, $E_{n-2}$ (ditto) by a coefficient to thereby find $E_n$. A step S106 is a PWM portion for determining the rate of driving in conformity with the output of $E_n$ and the operation thereof is as previously described. At a step S107, the actuator 35 is driven in conformity with that rate, and the flow comes to an end when at a step S108, the target value output puts out zero for a desired time, and the flow returns to the step S101.

Turning back to FIG. 1A, the first photointerrupter 312 outputs pulses as it passes through the slits 311 formed in the position indicating portion 310, and detects the amount of opening of the shutter blade 31a to thereby control the actuator 35, and in this respect, the present embodiment is similar to the example of the prior art. That is, the embodiment of FIG. 1A has two control modes, i.e., the control of the actuator 35 by the first photo interrupter 312 (a first control mode), and the automatic control of the actuator 35 by the second photointerrupter 13 (a second control mode).

Usually, the shutter is driven by the first control mode, and when a photograph in which both of the main object and the background are in focus (hereinafter referred to as the stopped-down photographing is desired, the shutter is driven by the second control mode. The switching of these control modes is effected by a shooting mode switching means 112, and the signal of this shooting mode switching means 112 is input to the microcomputer 316, which thus determines by which control mode the shutter should be driven.

During the first control mode which usually is often used in the construction as described above, the detection of the amount of opening of the shutter is effected by the counting of the pulse output of the first photointerrupter 312 by the slits 311 provided in conformity with the amount of opening of the shutter and therefore, any fluctuation of the output of the first photointerrupter 312 (individual difference, temperature and lapse of time) does not deteriorate the accuracy of the detection of the amount of opening of the shutter.

Now, a single-lens reflex camera has an optical path for directing light passed through a photo-taking lens to a finder by a mirror, and an optical path for directing the light to the surface of film and therefore, it has merit in that the photographer can observe an image exposed on the film as it is and thus, no parallax occurs.

In contrast, generally in a compact camera, an optical path directed to the surface of the film and an optical path directed to a finder are formed by a photo-taking optical system and a finder optical system, respectively, and this results in the parallax that the composition of each object slightly differs, and the error becomes greater as the distance to an object becomes shorter.

FIG. 2 shows a lens shutter device free of parallax constructed by the use of the lens shutter shown in FIG. 1A. In this lens shutter device, a mirror 21 is provided on the rear surface (that side more adjacent to the surface of film than to the shutter relative to the optical axis) of the lens shutter of FIG. 1A, and this mirror 21 is fixedly supported on a mirror supporting bed 22. The mirror supporting bed 22 is supported for rotation about a shaft 25, is counter-clockwisely biased by a spring 23, bears against a stopper 26 and is stationary. The mirror supporting bed 22 serves also to shield the film surface 24 from light, and even when the shutter is open, if the mirror supporting bed 22 is in its down state (the state of FIG. 2), the film surface is shielded from light.

In such a system, the design is made such that when an object is aimed at, the shutter is always opened by an opening spring 213 and the picked-up image of the object can be passed through the shutter and be confirmed by means of the finder via the mirror, and during photographing, the shutter is driven in accordance with a flow shown in FIG. 3.

In FIG. 3, the release button is fully depressed to start this flow, and at a step S301, the shutter so far opened is closed and the surface rearward from the shutter is shielded from light, and at a step S302, the mirror 21 is upped by a motor or the like to thereby release the light interception by the mirror supporting bed 22 (the film is not exposed because the shutter is closed), and at a step S303, the shutter is opened and closed in accordance with the first or second control mode to thereby expose the film, and at a step S304, the mirror is downed to thereby shield the film surface from light, and at a step S305, the shutter is opened to thereby secure the optical path to the finder, thus completing the flow.

In the flow shown in FIG. 3, the shutter is opened and closed at the steps S301 and S305 and therefore, by the utilization of it, the following operation is possible.

In FIG. 3, during the second control mode, the shutter is once stopped down to a predetermined aperture diameter before the mirror up which takes place immediately after the full depression of the release button, and the incident light from the object which is incident through the shutter at that time is reflected by the mirror 21 and photometered by a photometric sensor 212, and the exposure time is determined by the photometric value. Thereafter, the shutter is closed and the mirror is upped, and with said aperture diameter as a target value, the shutter is opened and closed with the exposure time set by photometering to thereby effect exposure.

However, this exposure time is set so that proper exposure may be effected with the time until the shutter reaches the set aperture diameter and the time until the shutter is fully closed from the set aperture diameter being also taken into account.

With such a system, even if the output of the photointerrupter 13 is varied by temperature, humidity or lapse of time and the aperture diameter is varied thereby, the exposure time will also be varied correspondingly thereto and therefore, proper exposure can be accomplished as a whole.

Figure 4B:
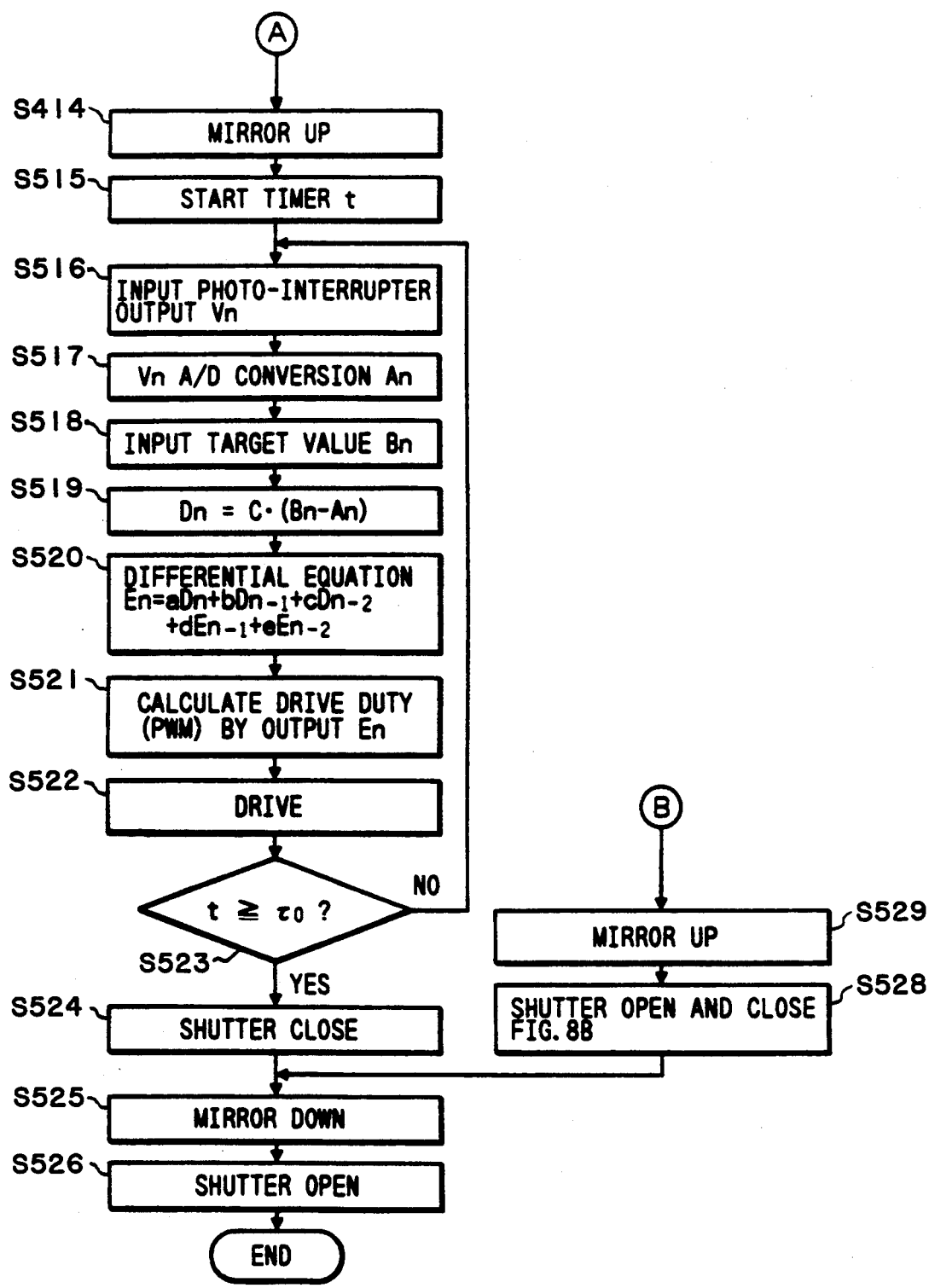
FIG. 4 is comprised of FIGS. 4A and 4B, which are flow charts illustrating the operation of the first embodiment.

The steps shown in the flow chart of FIGS. 4A and 4B are started by the release button being fully depressed, and if at a step S401, the shutter is in the second control mode (discriminated by the shooting mode select means 112), advance is made to a step S402, where a timer t is started.

At steps S403 to S412, the shutter is held at a desired aperture diameter by operations similar to the steps S101 to S107 in FIG. 1C, and at a time T set to more than the time during which at the step S410, the shutter blades are stabilized at the desired aperture diameter, advance is made to the step S411, where the object light incident through the shutter is photometered by the photometric sensor 212, and at the step S412, the exposure time $\tau_0$ is calculated in conformity with the photometric value, whereafter at a step S413, the shutter is closed, and at a step S414, the mirror is upped, and at steps S416 to S422, the shutter is held at the desired aperture diameter as in FIG. 1C, and if at a step S423, the exposure time $\tau_0$ calculated at the step S412 is exceeded, the shutter is closed at a step S424, and at a step S425, the mirror is downed, and at a step S426, the coil is electrically deenergized, whereby the shutter is opened by the force of the spring 213 and thus, this flow is terminated.

The exposure time of the step S412 has added thereto the time until the shutter reaches the desired aperture diameter and the time until the shutter is closed from the desired aperture diameter, but if the output of the photointerrupter 13 is fluctuating and the aperture diameter obtained by the drive force of the step S409 is smaller than the target value, the exposure time will become longer, and if said aperture diameter is greater than the target value, the exposure time will become shorter and therefore, as a whole, proper exposure becomes possible irrespective of the fluctuation of the output of the photointerrupter 13.

At the steps S413 and S424, a constant voltage or a constant current is applied to the coil to thereby force the shutter to be closed, but here, the target value $B_n=0$ (the shutter is fully closed when the output of the photointerrupter 13 reaches the target value) may be input and the operations of the steps S403 to S409 may be performed again to close the shutter and upon the termination of the mirror up of the step S414 and the mirror down of the step S-25, advance may be made to the steps S415 and S426.

Also, during the first control mode, the light incident through the shutter when the shutter is fully open is photometered, and as is well known in a program lens shutter, the shutter is opened and closed from the photometric value on the basis of the program graph of the shutter (steps S427→S428→S425→S426).

SECOND EMBODIMENT

FIG. 5 shows a second embodiment.

In FIG. 2, the mirror supporting bed 22 shields the film surface 24 from light and therefore, the shutter can be opened and closed independently of the shielding of the film from light. Accordingly, in a construction wherein during each exposure, the incident light passing through the shutter immediately before that can be photometered, the influence of the fluctuation of the output of the second photointerrupter 13 upon exposure becomes null, but the shielding of the film surface 24 from light is not limited to by the mirror supporting bed 22, and as shown in FIG. 5, can also be accomplished by a light intercepting device 27 having a group of light intercepting blades 28. In this case, the photographer observes an object through an external finder, not shown.

In FIG. 5, the reason why the film surface 24 is shielded from light by the light intercepting device 27 is that the light beam from the object is reflected by a half mirror 29 and is directed to an element 213 for auto focusing, and the reflected light from a mirror 214 in the half mirror 29 is directed to the photometric sensor 212. The shutter remains open and the light intercepting device 27 shields the film surface 24 from light until automatic focus adjustment is terminated, whereafter the mirror 29 is rotated from an arm 210 about a shaft 211 and is retracted from the light beam, and the shutter is closed and the group of light intercepting blades 28 of the light intercepting device 27 is retracted and the shutter is opened and closed to effect exposure. Again in such a construction, photometering can be effected as in FIG. 2 immediately before the operation of the shutter being closed before exposure.

THIRD EMBODIMENT

Figure 6B:
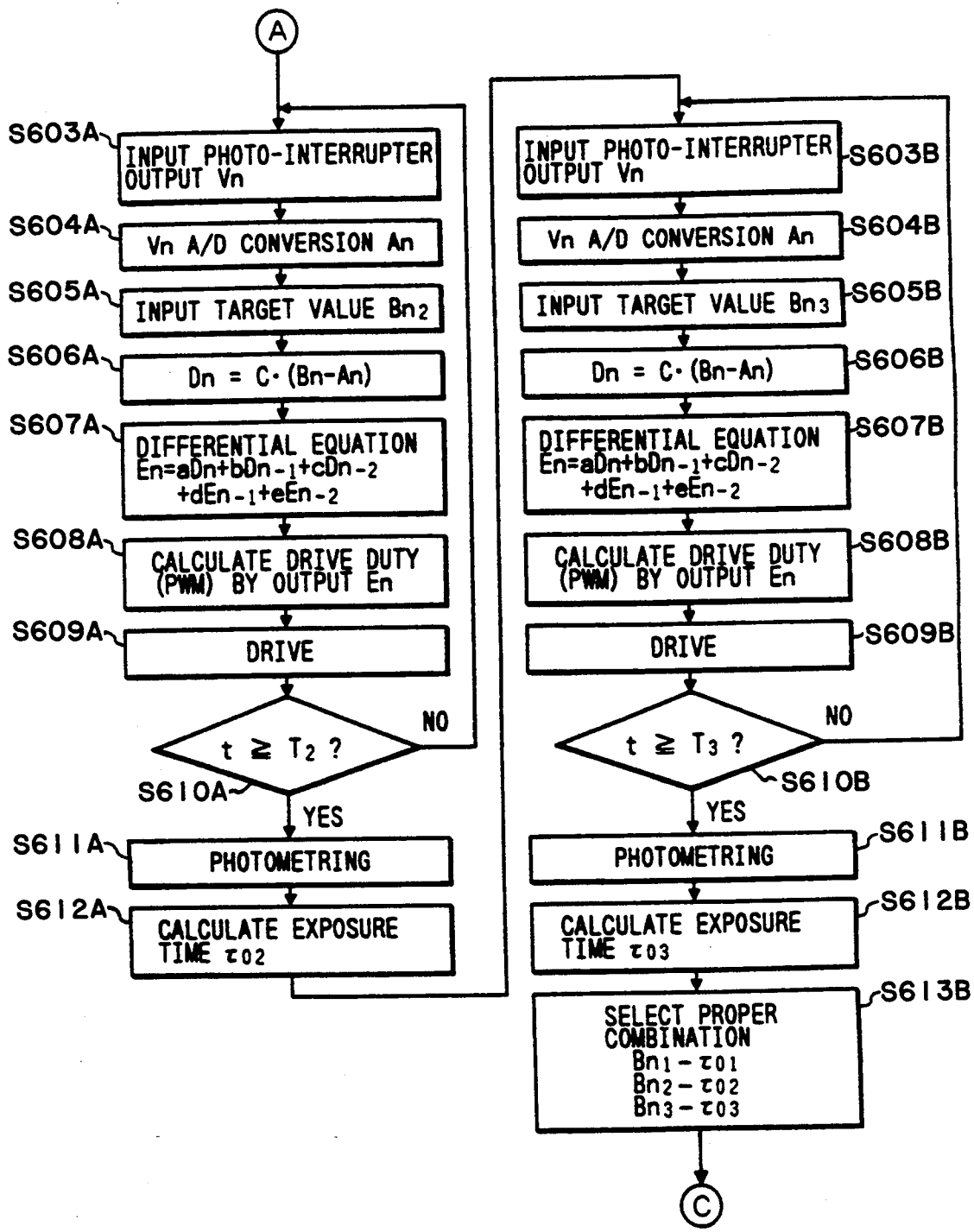
FIG. 6 is comprised of FIGS. 6A to 6C, which are flow charts illustrating the operation of a third embodiment of the present invention.
Figure 6C:
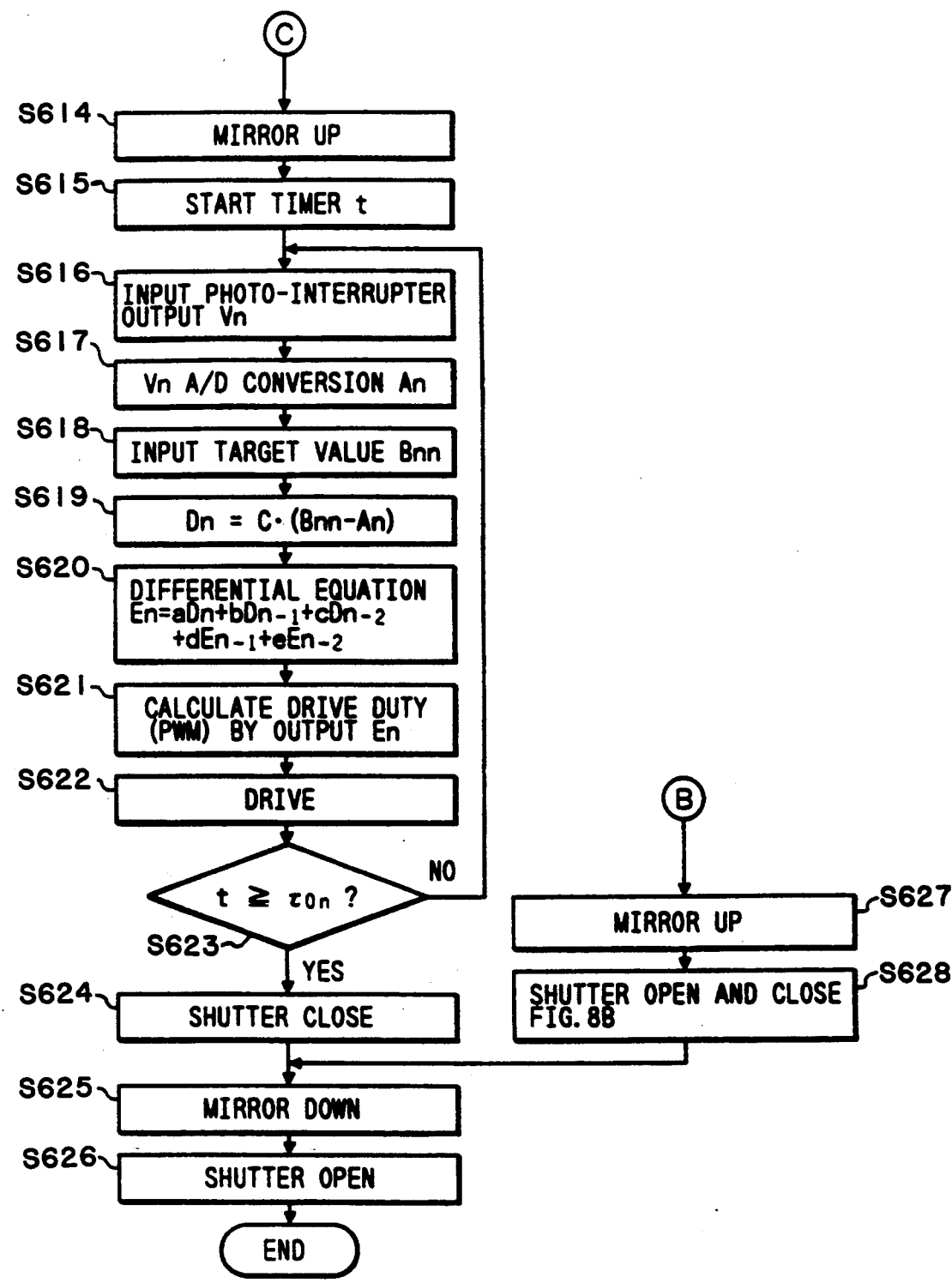
Figure 9A:
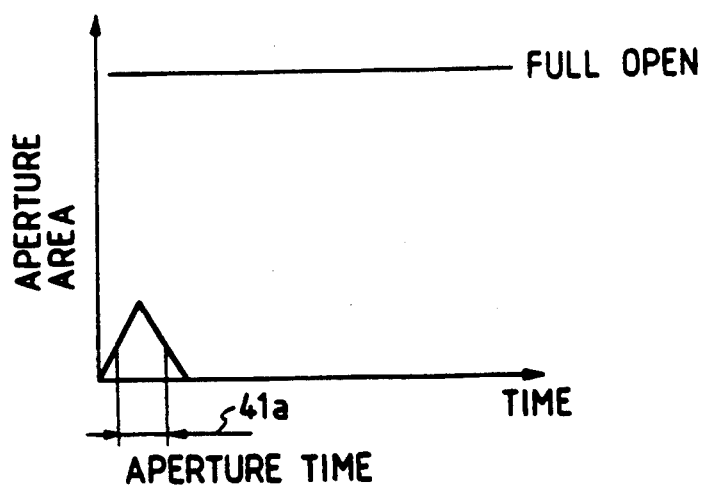
FIGS. 9A to 9I are timing charts for illustrating the operation of the shutter device of FIG. 8.
Figure 9B:
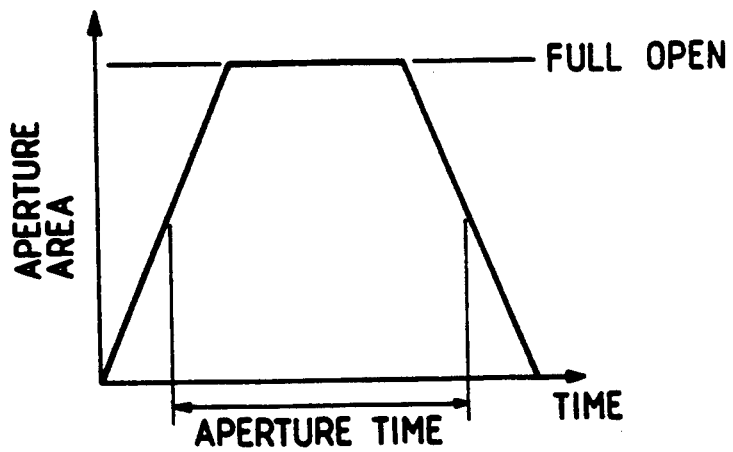
Figure 9C:
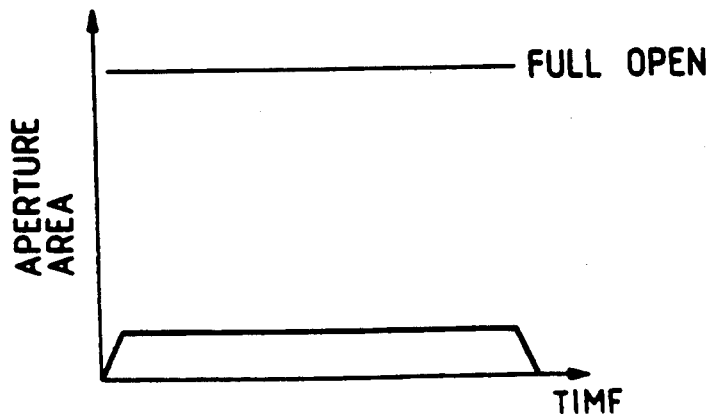
Figure 9D:
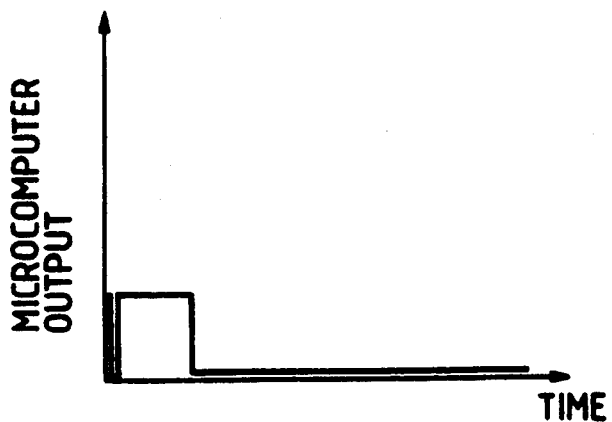
Figure 9E:
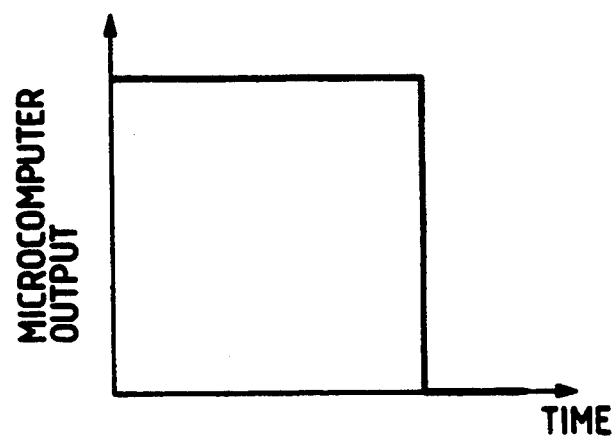
Figure 9F:
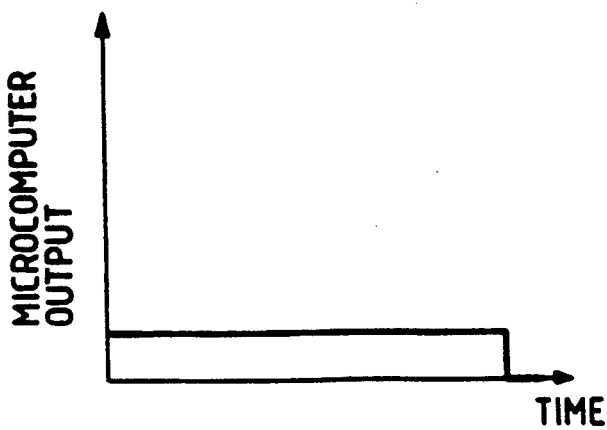
Figure 9G:
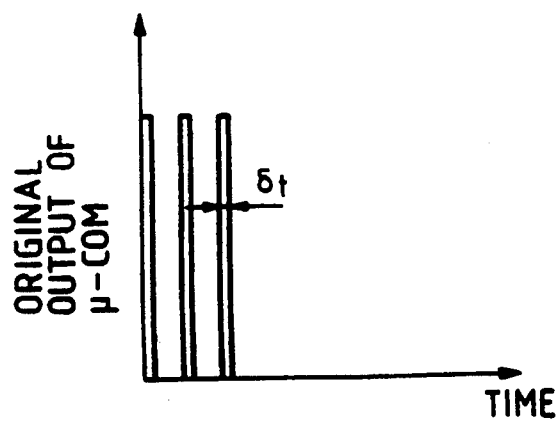
Figure 9H:
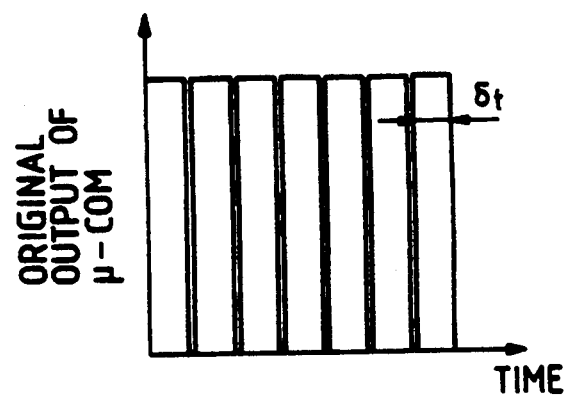
Figure 9I:
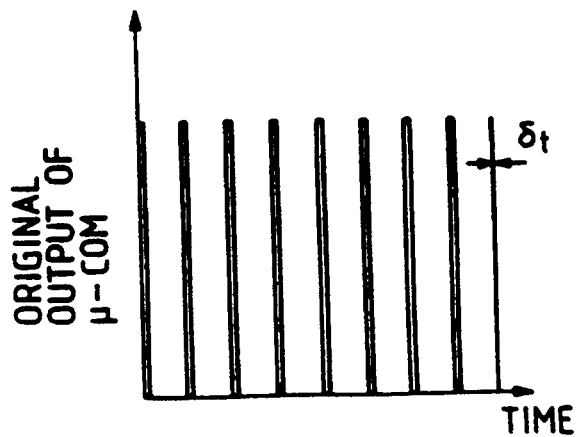
Figure 10:
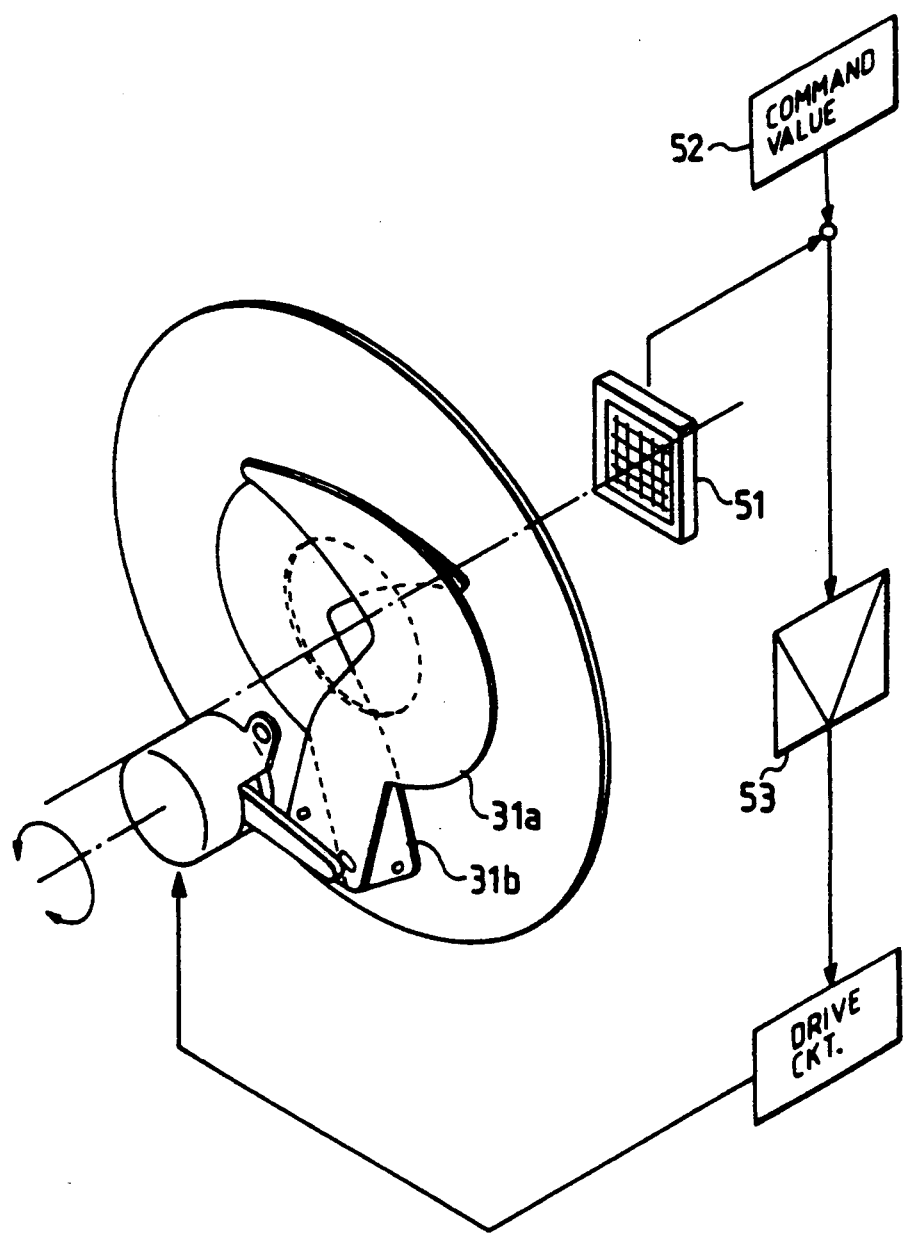
FIG. 10 shows a shutter device according to the prior art.

FIGS. 6A to 6C show a third embodiment.

In the above-described second embodiment, photometry is effected only in the case of one aperture diameter, while in the present embodiment, a plurality of aperture diameters are formed, and each time an aperture diameter is formed, photometry is effected to thereby find a plurality of exposure times corresponding to the respective aperture diameters, and an optimum combination is chosen from among the aperture diameters and exposure times, and on the basis thereof, the shutter is opened and closed and also, the photographer sets an exposure time and on the basis of a combination of an aperture diameter and an exposure time appoximate to said exposure time, the opening and closing of the shutter is controlled.

FIGS. 6A to 6C are flow charts for illustrating the operation of the present embodiment, and the differences of this flow chart from the flow chart shown in FIGS. 4A and 4B are that steps S603 to S612 are repeated a total of three times, i.e., at steps S603A to S612A and steps S603B to S612B, whereby exposure times $\tau_{01}$, $\tau_{02}$ and $\tau_{03}$ corresponding to three different amounts of opening (target values $B_{n1}$, $B_{n2}$ and $B_{n3}$) are found, that when at a step S613 for example, the photographer selects a stop-down mode, a combination in which the aperture diameter of $B_{n3}$–$\tau_{03}$ is small and the exposure time is long is automatically selected and that when the photographer desires to photograph at the exposure time of $\tau_{02}$, a combination of $B_{n3}$–$\tau_{02}$ is selected. At steps S614 to S623, exposure is effected, but of course, at this time the target value $B_{nn}$ of the step S618 and the exposure time $\tau_{on}$ of the step S623 are in a selected combination.

With such a construction, photographing can be accomplished with the photographer's favorite aperture diameter and exposure time.

FOURTH EMBODIMENT

FIGS. 7A and 7B are flow charts showing a fourth embodiment.

In each of the above-described embodiments, during photometry as well, the shutter is automatically controlled to keep the aperture diameter and thereby effect photometry, but since the time required for photometry is very short, the present embodiment is designed to continuously effect photometry during a series of operations of shutter opening→shutter closing.

In FIGS. 7A and 7B, the flows are started by depressing the release button, and at a step S701, whether the shutter device is in the second control mode is judged, and if it is in the second control mode, at a step S702, the timer begins counting, and at a step S703, the coil begins to be electrically energized to close the shutter, whereby the shutter is gradually closed. The amount of electrical energization of the coil is smaller than usual and the opening→closing operations of the shutter is set so as to be relatively slow.

At a step S704, the photographer waits for a desired time (the shutter assumes a predetermined aperture diameter), and at a step S705, the then output $V_1$ of the photointerrupter 13 is memorized in the microcomputer (this is the target value in the case of the predetermined aperture diameter obtained). At a step S706, the light passed through the shutter is photometered, and at a step S707, exposure time $\tau_{01}$ is calculated on the basis of the photometric value, and at a step S708, the photographer waits for a further desired time (which may be equal to or different from the waiting time at the step S704, and the shutter further assumes an aperture diameter at the small aperture side), and operations similar to the steps S705 to S707 are repeated at steps S709 to S711, and likewise at steps S712 to S715, the outputs $V_2$ and $V_3$ of the photointerrupter 13 and exposure times $\tau_{02}$ and $\tau_{03}$ in the case of an aperture diameter at a smaller aperture side are calculated. At a step S716, the photographer waits for a predetermined time (the total time from the step S702 is equal to or longer than the time required for the shutter to be fully closed), and the shutter is then closed and at a step S717, in the same manner as described above, one combination is selected from among proper combinations (selected from among $V_1$–$\tau_{01}$, $V_2$–$\tau_{02}$ and $V_3$–$\tau_{03}$), and at a step S718, the mirror is upped, and at steps S719 to S718, exposure is effected, but here, the photointerrupter output which has selected the target value of the step S722 is Bn (Obtain Bn by A/D converting Vn ($V_1$-$V_3$)) and the waiting time (exposure time) of the step S727 is a value selected from $\tau_{01}$, $\tau_{03}$.

At a step S729, the mirror is downed, and at a step S730, the shutter is opened, whereupon this flow is terminated.

At the steps S712 to S716, the shutter is not automatically controlled but is closed, and at this time, the aperture diameter (the output of the photointerrupter) during each photometry is also memorized and exposure is effected as the aperture target value and therefore, proper exposure can be accomplished and any fluctuation of the output of the photointerrupter does not derange exposure accuracy.

With such a method, a plurality of (in the present embodiment, three ) combinations of aperture diameter and exposure time can be obtained within a short time and the release time lag can be shortened.

When the photographer chooses a stop diameter (an aperture diameter), if at the step S717, the exposure time corresponding thereto is too short for the shutter to follow, the stability of exposure can be enhanced by carrying out a process such as "giving warning" or "automatically bringing the stop diameter to the small aperture side and effecting exposure by a combination with the then exposure time". Also, a case where the exposure time is too long can likewise be coped with by giving a camera shake warning or automatically bringing the stop diameter to the open side.

FIFTH EMBODIMENT

FIGS. 12A to 15B show a fifth embodiment.

Figure 11:
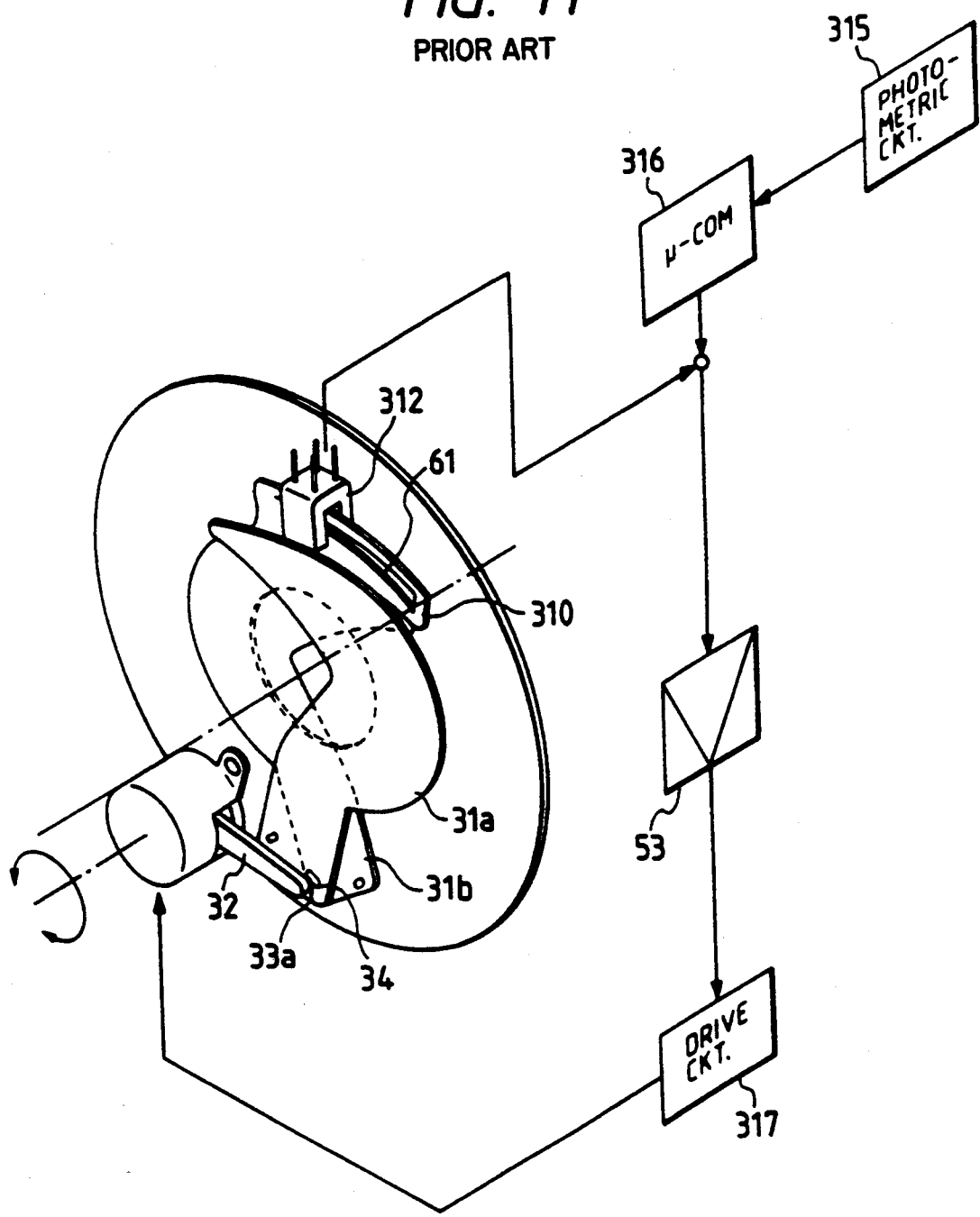
FIG. 11 shows a shutter device according to the prior art.

The difference of this embodiment from the example of the prior art shown in FIG. 11 is that the actuator 35 is comprised of a flat coil 11, a base member 12, permanent magnets 15a, 15b opposed to the flat coil, a yoke 14 and a base 314 (which is a magnetic member and serves also as a yoke) with the flat coil 11 and base member 12 interposed therebetween, and spacers 16a, 16b, and a protruding portion 12a is provided on the base member 12 and comes into a photointerrupter 13.

Protruding shafts 32a and 33a are fitted from the base member 12 into holes 32c and 33c, respectively, is a shutter 31a, and by the flat coil 11 being electrically energized, the base member 12 is rotated about a protruding shaft 32 to thereby open and close shutters 31a and 31b (a slot 33c in the shutter 31b is also fitted over the protruding shaft 33a). With the rotation of the base member 12, the protruding portion 12a adjusts the quantity of intercepted light of the photointerrupter 13, and when the shutter is fully open, the protruding portion 12a does not come into the photointerrupter 13 and does not effect the light interception between the light projecting and receiving portions of the photointerrupter 13, and when the shutter is fully closed, the protruding portion 12a comes fully into the photointerrupter 13 and completely intercepts the light between the light projecting and receiving portions. When the shutter is in its intermediate position (stopped-down state), the protruding portion 12a comes halfway into the photointerrupter 13 and intermediately intercepts the light between the light projecting and receiving portions. The photointerrupter 13 is screwed in a threaded hole 14a in the yoke 14. Therefore, automatic control similar to that described in connection with FIG. 11 is possible by the photointerrupter 13 and actuator 35, and the output of the photointerrupter 13 can be introduced into a microcomputer 316 and compared with a target value to thereby determine the direction of driving of the actuator.

This will now be described in more detail. The photointerrupter 13 effects an output conforming to the opening of the shutter, and puts out a maximum output when the shutter is fully open, puts out a zero output when the shutter is fully closed, and puts out a medium output when the shutter is in its stopped-down state. The photointerrupter 13 analogously detects the amount of opening of the shutter in accordance with the magnitude of its output. The output of the photointerrupter 13, as shown in FIG. 12B, is A/D-converted into numerical data in the microcomputer 316 by an A/D converter 17, and for example, is converted into a numerical value 0 when the output of the photointerrupter 13 is zero, and is converted into a numerical value 2048 when the output of the photointerrupter is maximum. On the other hand, a target value is set by target value setting means 19 in conformity with the photometric value of photometering means 318, and for example, an output (numerical value 1024) corresponding to the output of the photointerrupter 13 when the shutter is in its stopped-down state is output from the target value setting means 19, and the difference between that output and the A/D-converted value is found by a different circuit 18 and is passed through a compensation circuit 110 (which will be described later), and the duty of driving is determined by PWM 111 and sent to a driving circuit 317. PWM 111 outputs a duty cycle of 0:10 when the difference between the target value and the A/D-converted value is zero, and does not effect driving with the rate of the energization of the driving circuit as zero, and as said difference becomes greater, it increases the rate of the energization of the driving circuit 317 such as to 5:5 and 7:3 ( for example, energizes the driving circuit for 0.7 msec. of 1 msec. and does not energize the driving circuit for 0.3 msec.), thereby increasing the drive force. Also, when the difference between the output of the target value setting means 19 and the output of the A/D converter 17 is reversed, PWM 111 is set so that as described above, as said difference becomes greater, the rate of driving may be increased, but the direction of energization may become opposite.

Therefore, when the shutter is initially fully closed and the output of the photointerrupter 13 is zero, the target value is 1024, whereas the A/D-converted value is 0 and thus, the difference therebetween is very great, and the driving circuit 317 is substantially fully energized to drive the shutter in the opening direction, and as the difference becomes smaller, the drive force is weakened. When the A/D conversion output exceeds 1024 (when the shutter goes too far and assumes more than the target aperture due to its inertia), the flat coil 11 is reversely energized in conformity with the difference and automatic control is effected so that the A/D conversion output may assume the target value 1024.

This operation is similar to that shown in FIG. 1C, and by the release button being depressed, the operation is started, and at a step S101, the output $V_n$ of the photointerrupter 13 is introduced, and at a step S102, A/D conversion is effected and $A_n$ is found in conformity with $V_n$. At a step S103, the then target value $B_n$ is introduced, and at a step S104, the difference between $A_n$ and $B_n$ is found, and a value $D_n$ amplified to C times is found. A step S105 is a phase compensation filter portion corresponding to the compensation circuit 20 and having the function of enhancing the degree of stability of automatic control, and more particularly, a phase compensating portion using a conventional digital filter for multiplying $D_n$, $D_{n-1}$, $D_{n-2}$ (values introduced in the last and before-last loops) and $E_{n-1}$, $E_{n-2}$ (ditto) by a coefficient and finding $E_n$. A step S106 is a PWM 21 portion for determining the rate of driving in conformity with the output of $E_n$, and the operation thereof is as previously described. At a step S107, the actuator 35 is driven in conformity with that rate, and the flow is terminated when at a step S108, the output of the target value puts out zero for a desired time, and design is made such that before that, return is made to the step S101.

Figure 13:
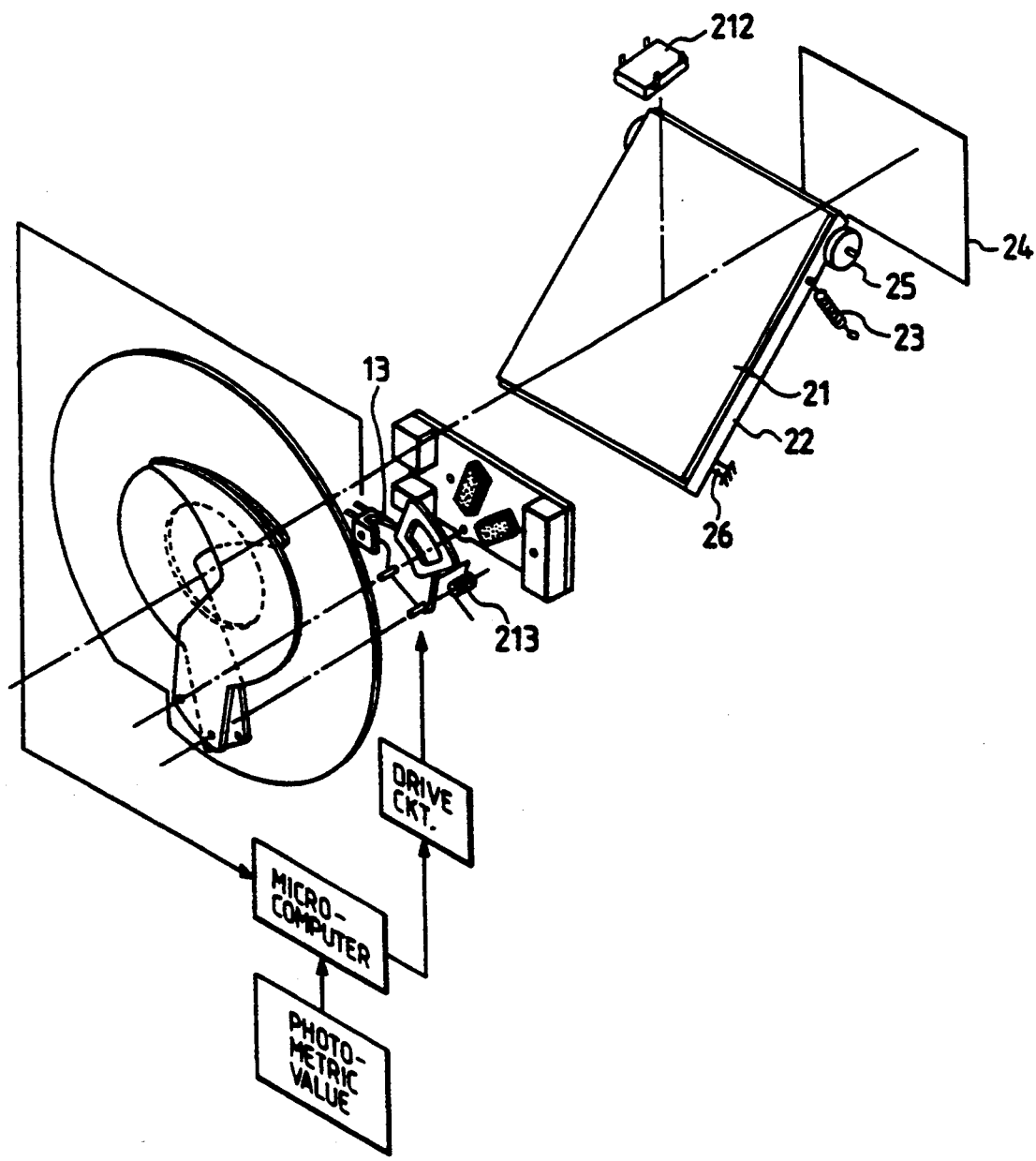
FIG. 13 shows the shutter device in the fifth embodiment.

FIG. 13, like FIG. 2, shows a system free of parallax which is constructed by the utilization of a lens shutter device, and on the rear surface of the lens shutter device of FIG. 12A, there is provided a mirror 21 fixedly supported on a mirror supporting bed 22, which in turn is supported for rotation about a shaft 25, is counter-clockwisely biased by a spring 23, bears against a stopper 26 and is stationary. The mirror supporting bed 22 serves also to shield the film surface 24 from light, and even when the shutter is open, if the mirror supporting bed 22 is in its down state (the state of FIG. 13), the film surface is shielded from light.

Figure 14:
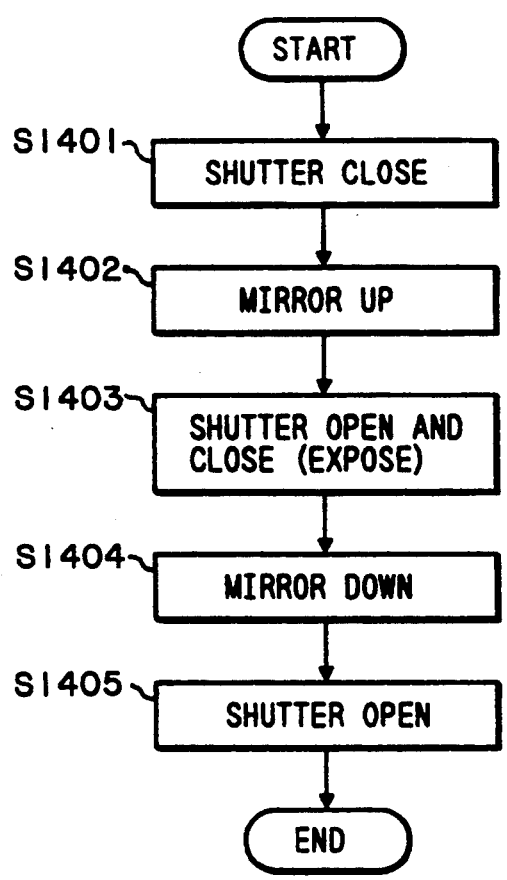
FIG. 14 is a flow chart illustrating the operation of the fifth embodiment.

Such a system is designed such that when an object is being aimed at, the shutter is always opened by an opening spring 213 and the picked-up image of the object can be passed through the shutter and be confirmed by the finder via the mirror, and during photographing, the shutter is driven in accordance with a flow shown in FIG. 14.

In FIG. 14, the flow is started by the release button being fully depressed, and at a step S1401, the shutter so far opened is closed and the surface rearward of the shutter is shielded from light, and at a step S1402, the mirror 21 is upped by a motor or the like to thereby release the light interception by the mirror supporting bed 22 (the film is not exposed because the shutter is closed), and at a step S1403, the shutter is opened and closed to expose the film, and at a step S1404, the mirror is downed to thereby shield the film surface from light, and at a step S1405, the shutter is opened to secure the optical path to the finder, thus completing the flow.

The shutter is normally open except when the mirror is upped, and the present invention utilizes this to perform the following operation.

In FIG. 13, before the mirror is upped (immediately after the release button is fully depressed), the shutter is once stopped down to a predetermined aperture diameter, and the incident light from the object incident through the shutter at that time is reflected by the mirror 21, and is photometered by the photometric sensor 212, and exposure time is determined from the photometric value. Thereafter, the shutter is closed, and the mirror is upped, and with said aperture diameter as the target value, the shutter is opened and closed in accordance with the exposure time set by photometry to thereby effect exposure. The exposure time at this time is set so that proper exposure may be effected with the time until the shutter reaches the set aperture diameter and the time until the shutter is fully closed from the set aperture diameter being also taken into account.

Accordingly, with such a system, even if the output of the photointerrupter 13 is varied by temperature, humidity or lapse of time and the aperture diameter is varied thereby, the exposure time will also be varied in accordance therewith and therefore, proper exposure can be accomplished as a whole.

Figure 15B:
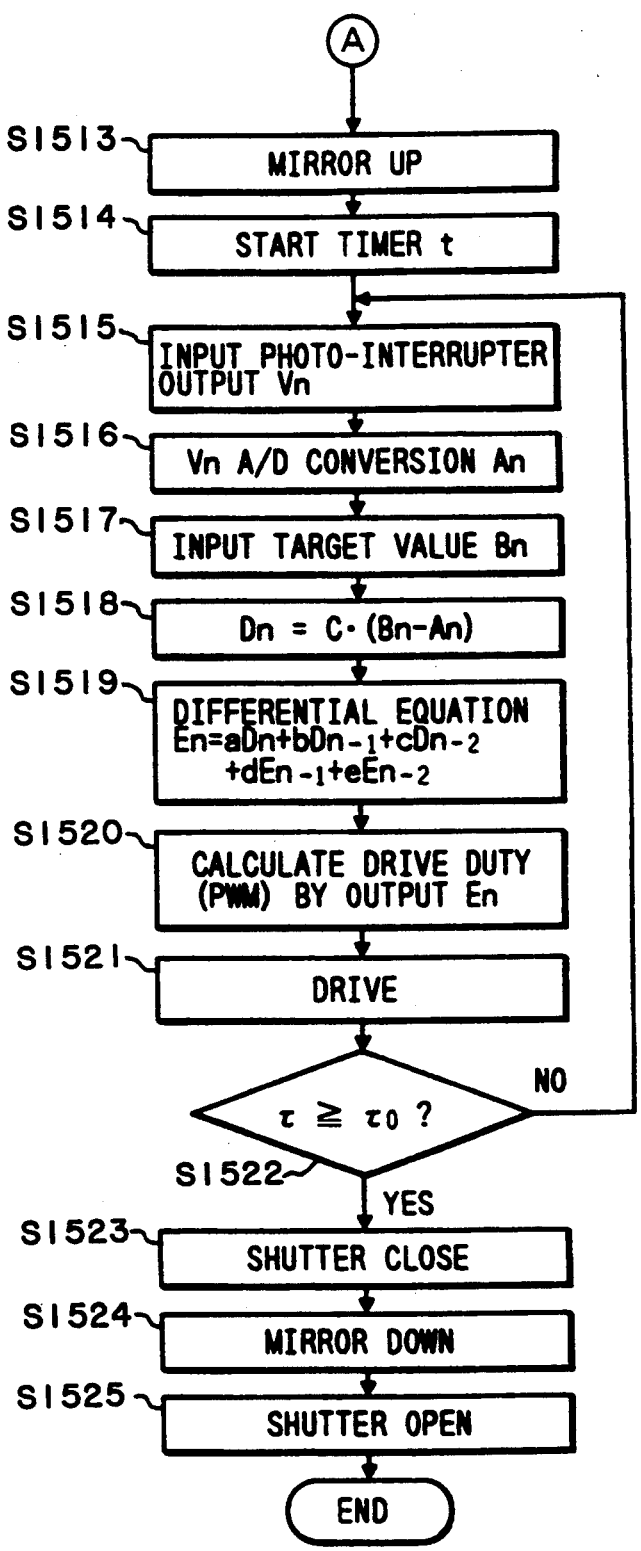
FIG. 15 is comprised of FIGS. 15A and 15B, which are flow charts illustrating the operation of the fifth embodiment.

FIGS. 15A and 15B show the flows of it. By the release button being fully depressed, this flow is started. Steps S1502 to S1509 are similar to the steps S403 to S410 of FIGS. 4A and 4B, and by this operation, the shutter is held at a desired aperture diameter, and in a time T set to greater than the time during which at the step S1509, the shutter blades are stabilized at the desired aperture diameter, advance is made to a step S1510, where the object light incident through the shutter is photometered by the photometric sensor 212, and at a step S1511, exposure time $\tau_0$ is calculated in conformity with the photometric value, whereafter at a step S1512, the shutter is closed, and at a step S1515, the mirror is upped, and at steps S1515 to S1521, as in FIGS. 4A and 4B, the shutter is held at the desired aperture diameter, and when at a step S1522, the exposure time $\tau_0$ calculated at the step S1511 is exceeded, the shutter is closed at a step S1523, and at a step S1524, the mirror is downed and at a step S1525, the coil is electrically deenergized, whereby the shutter is opened by the force of the spring 213 and thus, this flow is terminated. Here, the exposure time of the step S1511 has added thereto the time until the shutter reaches the desired aperture diameter and the time until the shutter is closed from the desired aperture diameter, but if the output of the photointerrupter 13 is fluctuating and the aperture diameter obtained by the driving of the step S1508 is smaller than the target value, the exposure time will become longer, and if the aperture diameter is greater than the target value, the exposure time will become shorten and therefore, as a whole, proper exposure becomes possible irrespective of any fluctuation of the output of the photointerrupter 13.

At the steps S1512 and S1523, a constant voltage or a constant current is applied to the coil to thereby force the shutter to be closed, but the target value $B_n=0$ (the shutter is fully closed when the output of the photointerrupter 13 reaches the target value) may be input and the operations of the steps S1502 to S1508 may be again performed to close the shutter and with the termination of the mirror up of the step S1513 and the mirror down of the step S1524, advance may be made to the steps S1514 and S1525.

SIXTH EMBODIMENT

Figure 16:
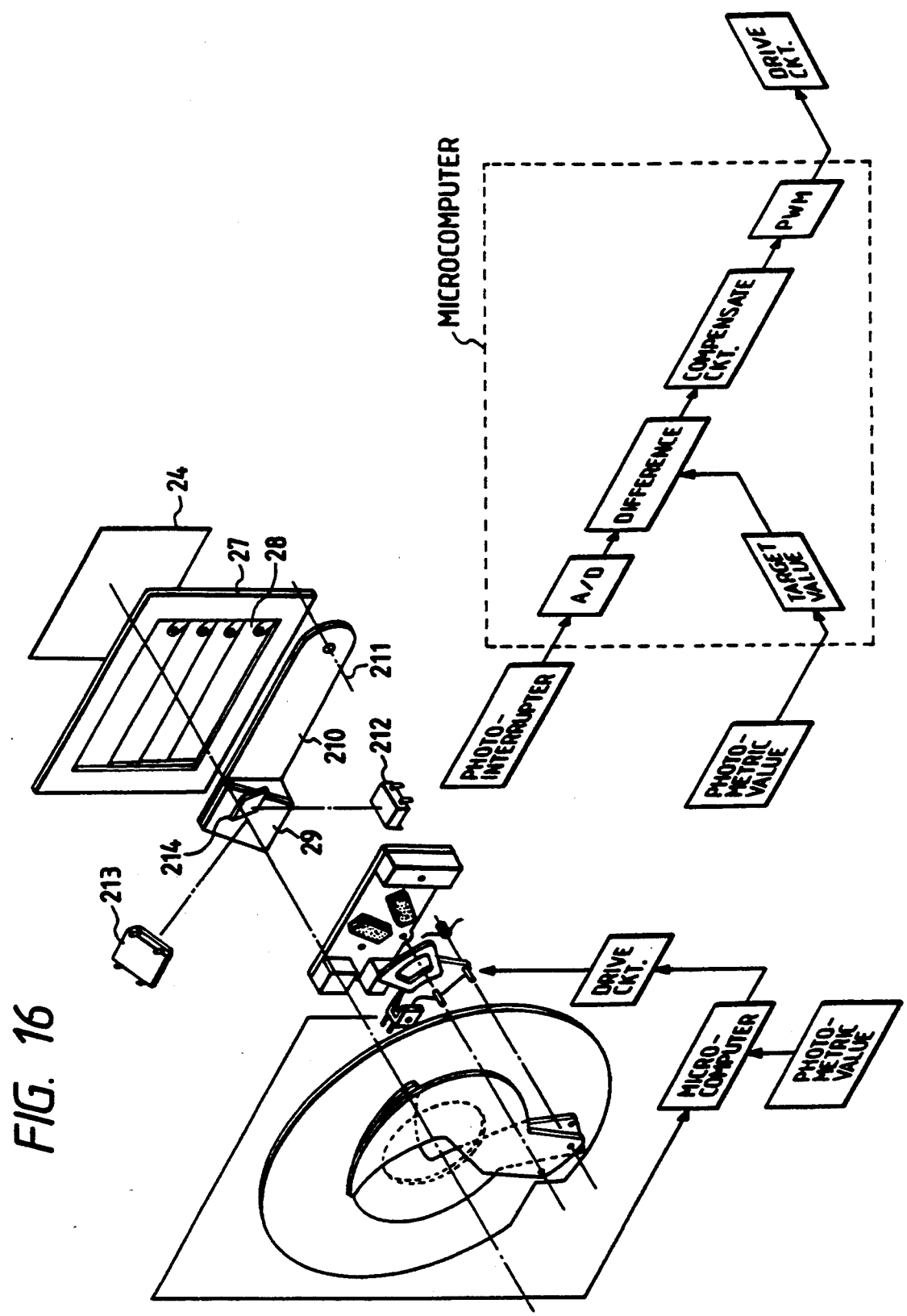
FIG. 16 shows a shutter device in a sixth embodiment of the present invention.

FIG. 16 shows a sixth embodiment.

In the embodiment shown in FIG. 13, the mirror supporting bed 22 shields the film surface from light and therefore, the shutter can be opened and closed independently of the shielding of the film from light. Accordingly, in a construction wherein during each cycle of exposure, the incident light passing through the shutter immediately before that can be photometered, the influence of any fluctuation of the output of the photointerrupter 13 upon exposure becomes null, but the shielding of the film surface 24 from light is not limited to this by the mirror supporting bed 22, and as in the second embodiment, such shielding can also be effected by a light intercepting device 27 having a group of light intercepting blades as shown in FIG. 16. In this case, the photographer observes the object through an external finder, not shown.

In FIG. 16, the reason why the shielding of the film surface 25 from light is effected by the light intercepting device 27 is that the light beam from the object is reflected by a half mirror 29 and is directed to an element 213 for auto-focusing, and the reflected light from a mirror 214 in the half mirror 29 is directed to a photometric sensor 212. Design is made such that until automatic focus adjustment is terminated, the shutter remains open and the light intercepting device 27 shields the film surface 25 from light, whereafter the mirror 29 is rotated from an arm 210 about a shaft 211 and retracted from the light beam. The shutter is then closed and the group of light intercepting blades 28 of the light intercepting device 27 is retracted and the shutter is opened and closed to thereby effect exposure. In the case of such a construction, as in FIG. 13, photometry can be effected immediately before the operation of the shutter being closed before exposure.

SEVENTH EMBODIMENT

Figure 17B:
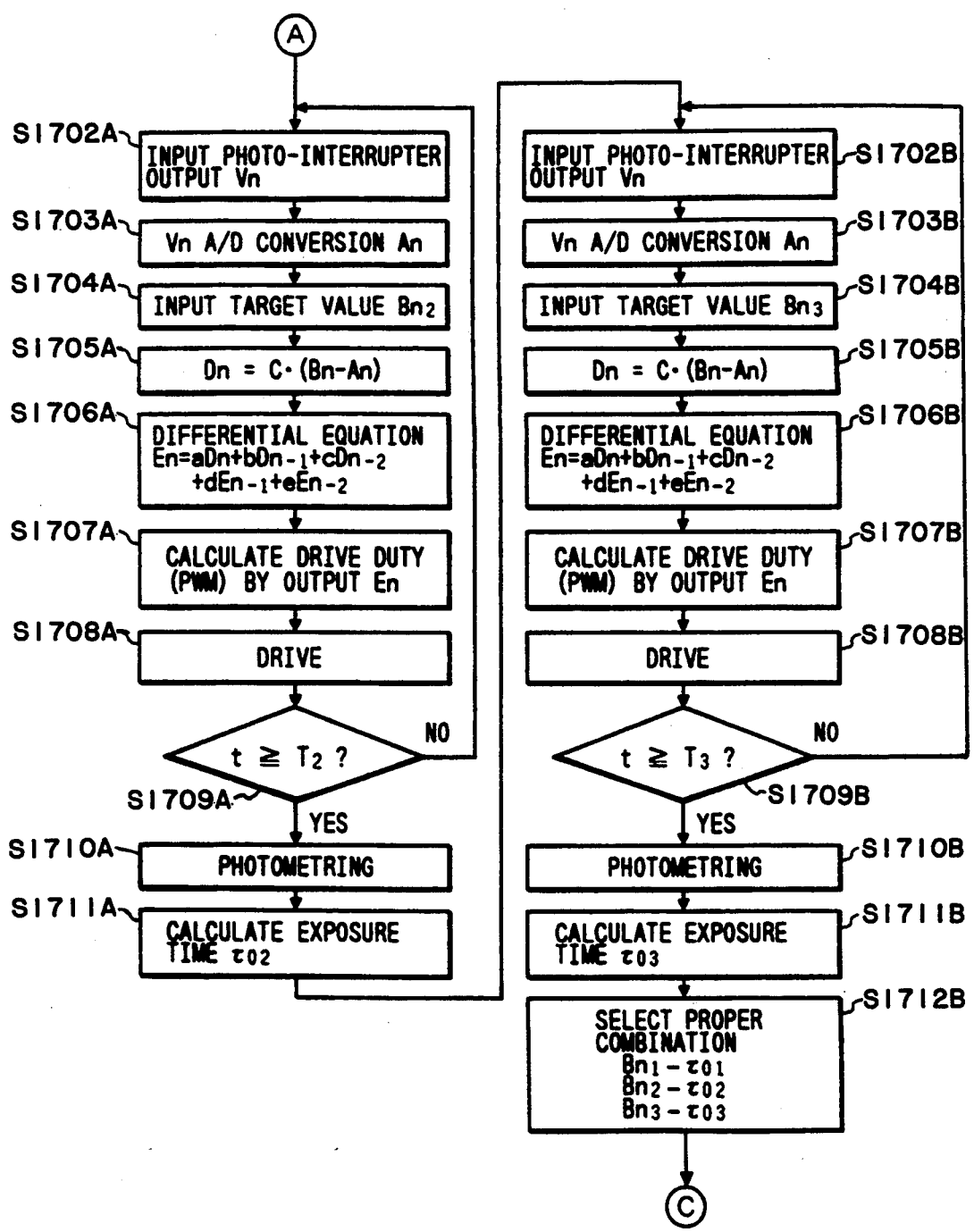
FIG. 17 is comprised of FIGS. 17A to 17C, which are flow charts for illustrating the operation of a seventh embodiment.
Figure 17C:
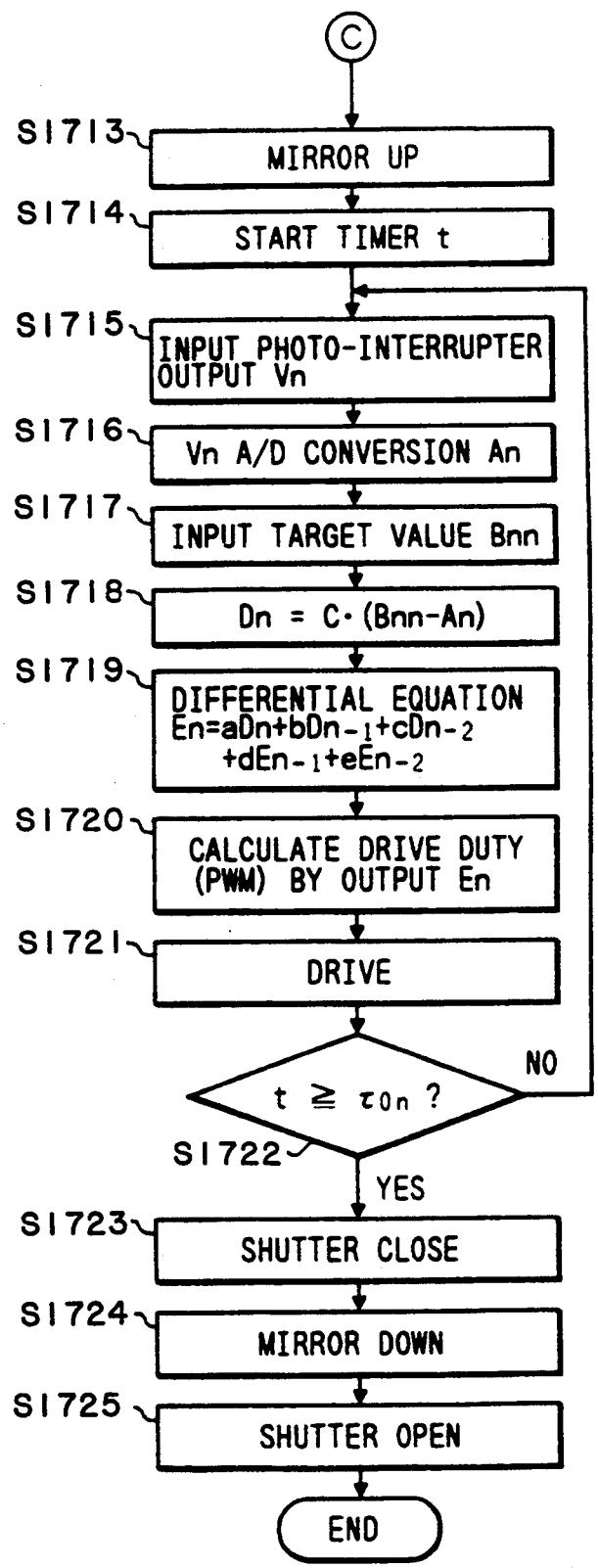

FIGS. 17A to 17C show a seventh embodiment.

In the sixth embodiment described just above, photometry is effected only when there is one aperture diameter, while in the present embodiment, a plurality of aperture diameters are formed and each time an aperture diameter is formed, photometry is effected, and a plurality of exposure times corresponding to the respective aperture diameters are found, and an optimum combination is chosen from among the aperture diameters and exposure times, and on the basis thereof, the shutter is opened and closed, and also the photographer sets an exposure time and on the basis of a combination of an aperture diameter and an exposure time approximate thereto, the opening and closing of the shutter are controlled as in the third embodiment.

FIGS. 17A to 17C show the flows. The differences of this flow from the flow of FIGS. 15A and 15B are that steps S1702 to S1711 are repeated three times such as S1702A to S1711A and S1702B to S1711B, whereby exposure times $\tau_{01}$, $\tau_{02}$ and $\tau_{03}$ corresponding to three different amounts of opening (target values $B_{n1}$, $B_{n2}$ and $B_{n3}$) are found and that when at a step S-42, for example, the photographer selects the stop-down mode, a combination in which the aperture diameter of $B_{n3}$–$\tau_{03}$ is small and the exposure time is long is automatically selected, and when the photographer desires to photograph at the exposure time of $\tau_{02}$, a combination of $B_{n3}$–$\tau_{02}$ is selected. At steps S1713 to S1720, exposure is effected, and of course, at this time, the target value $B_{nn}$ of a step S1717 and the exposure time $\tau_{on}$ of the step S1720 are in a selected combination.

With such a construction, photographing can be effected with the photographer's favorite aperture diameter and exposure time.

EIGHTH EMBODIMENT

Figure 18B:
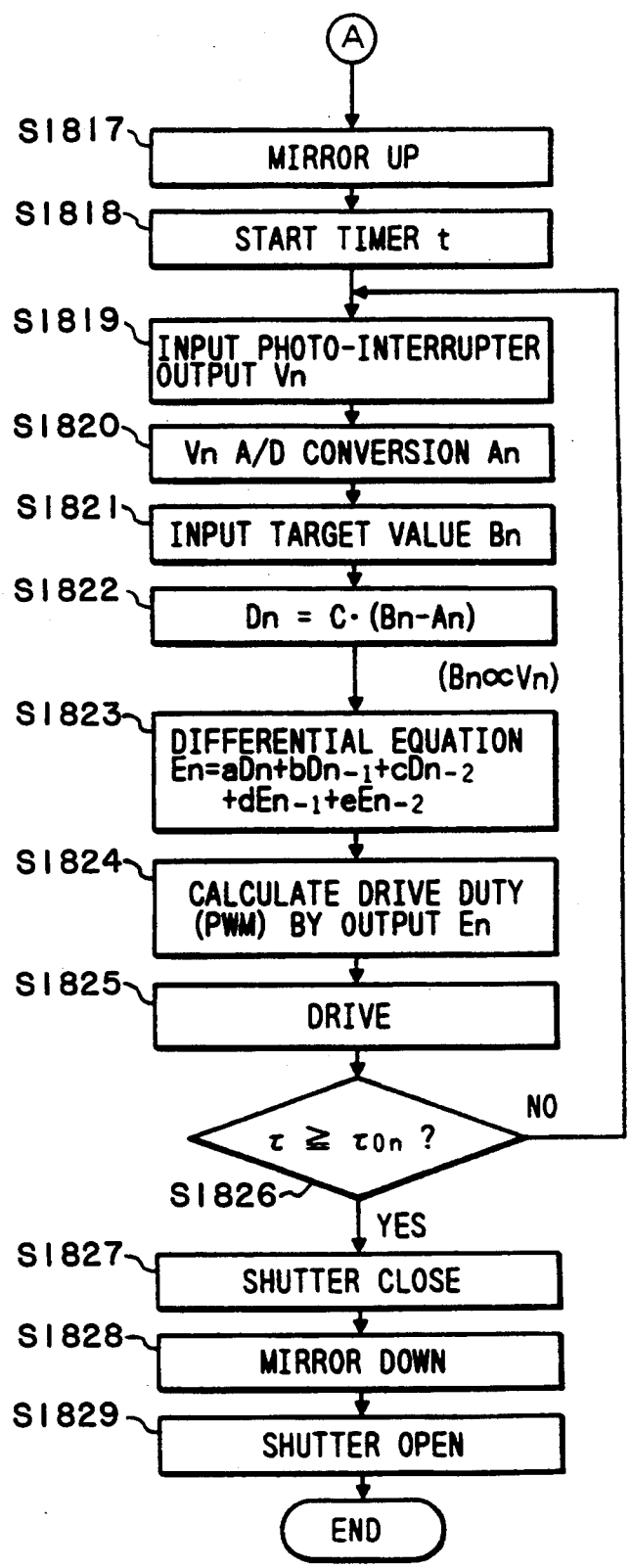
FIG. 18 is comprised of FIGS. 18A and 18B, which are flow charts illustrating the operation of an eighth embodiment.

FIGS. 18A and 18B show an eighth embodiment.

In the fifth to seventh embodiments described above, during photometry as well, the shutter is automatically controlled to hold the aperture diameter, thereby effecting photometry, but the time required for photometry is very short and therefore, in the present embodiment, photometry is continuously effected during a series of operations of shutter opening→shutter closing.

FIGS. 18A and 18B show the flows. By the release button being fully depressed, the flow is started. At a step S1801, the timer begins counting, and at a step S1802, the coil begins to be electrically energized to close the shutter, whereby the shutter is gradually opened (the amount of electrical energization of the coil is smaller than usual and the operations of shutter opening→shutter closing are set so as to be relatively slow). At a step S1803, the photographer waits for a desired time (the shutter reaches a predetermined aperture diameter), and at a step S1904, the then output $V_1$ of the photointerrupter 13 is memorized in the microcomputer (this is used as the target value in the case of the predetermined aperture diameter obtained). At a step S1805, the incident light passed through the shutter is photometered, and at a step S1806, the exposure time $\tau_{01}$ is calculated on the basis of the photometric value, and at a step S1807, the photographer further waits for a desired time (which may be equal to or different from the waiting time of the step S1802 and the shutter further assumes an aperture diameter at the small aperture side), and operations similar to the steps S1804 to S1806 are repeated at steps S1808 to S1810, and at steps S1811 to S1814, the outputs $V_2$, $V_3$ of the photointerrupter 13 in the case of the aperture diameter at the small aperture side and exposure times $\tau_{02}$, $\tau_{03}$ are further found. At a step S1815, the photographer waits for a predetermined time (the total time from the step S1801 is equal to or longer than the time required for the shutter to be fully closed) and the shutter is fully closed, and at a step S1816, in the same manner as described above, a combination is selected from among proper combinations (selected from among $V_1$–$\tau_{01}$, $V_2$–$\tau_{02}$ and $V_3$–$\tau_{03}$) and at a step S1817, the mirror is raised up, and at steps S1818 to S1827, exposure is effected, and here, the target value of the step S1828 is the selected photointerrupter output $B_n$ (Obtain $B_n$ by A/D converting $V_n$ ($V_1$–$V_3$) and the waiting time (exposure time) is also a value selected from among $\tau_{01}$–$\tau_{02}$. At a step S1829, the mirror is is downed, and at a step S-89, the shutter is opened, thus terminating this flow.

At the steps S-75 to S1815, the shutter is not automatically controlled but is closed, and at this time, the aperture diameter (photointerrupter output) during each cycle of photometry is also memorized and exposure is effected as the aperture target value and therefore, proper exposure can be accomplished, and any fluctuation of the output of the photointerrupter does not derange the exposure accuracy. With such a method, a plurality of (in FIG. 18, three) combinations of aperture diameter and exposure time can be obtained within a short time and the release time lag can be shortened.

When the photographer chooses a stop diameter (an aperture diameter), if at the step S-16, the exposure time corresponding thereto is too short for the shutter to follow, the stability of exposure can be enhanced by carrying out a process such as "giving warning" or "automatically bringing the stop diameter to the small aperture side and effecting exposure by a combination with the then exposure time". Also, a case where the exposure time is too long can likewise be coped with by giving a camera shake warning or automatically bringing the stop diameter to the open side.

NINTH EMBODIMENT

FIGS. 19A and 19B show a ninth embodiment.

This embodiment is of a construction similar to that of FIG. 2 in which a movable mirror is disposed rearwardly of the shutter device shown in FIG. 1, and is also similar in basic construction to the afore described embodiments, as shown in FIGS. 20A and 20B. Also, by the utilization of the shutter being closed and opened at the steps S301 and S305 shown in FIG. 3, design is made in FIG. 4 such that proper exposure can be obtained even if the output of the photointerrupter 13 is varied by temperature, humidity or lapse of time to thereby vary the aperture diameter, while in the present embodiment, by the utilization of the film surface being shielded from light by the mirror supporting bed 22, the calibration of the second photointerrupter 13 is effected. This processing is shown in FIG. 21.

Figure 21:
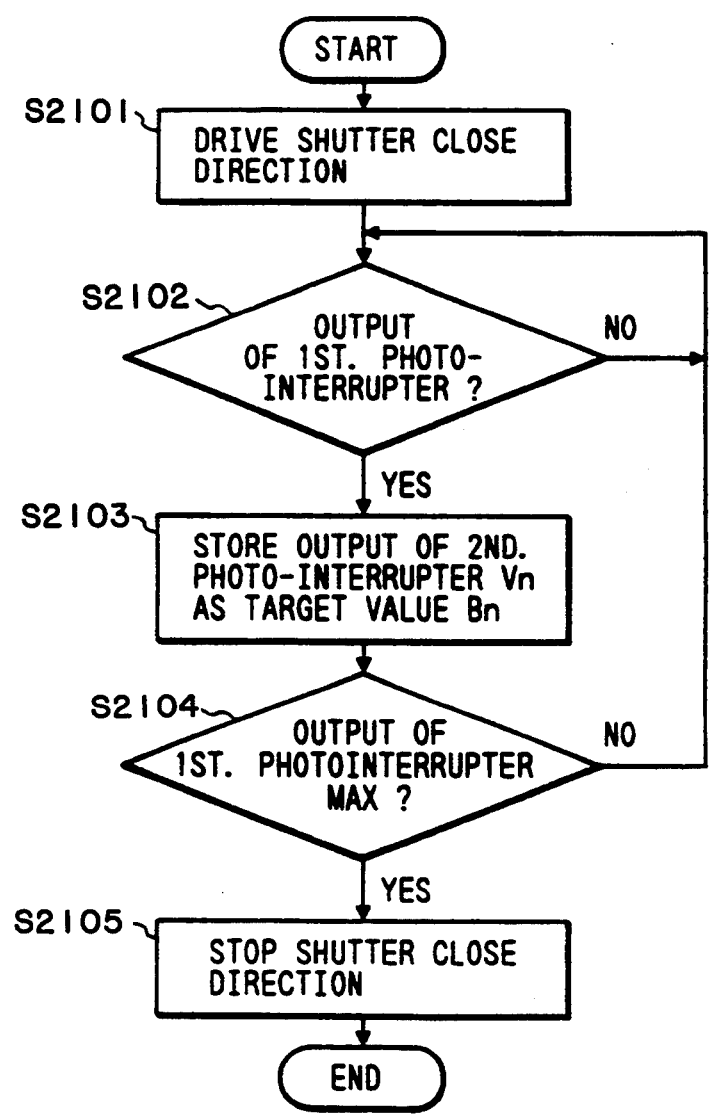
FIG. 21 is a flow chart illustrating the operation of the ninth embodiment.

The flow chart shown in FIG. 21 is started by the main switch of the camera being closed. At a step S2101, the coil 11 is electrically energized so as to initially drive the shutter in the closing direction, and if at a step S2102, a slit 311 passes through the first photointerrupter 312, whereby the first photointerrupter puts out an output, the then output $V_n$ of the second photointerrupter is memorized as a target value $B_n$ (n=1, 2, 3, ...) in the microcomputer (step S2103), and this flow is repeated, and when at a step S2104, the first photointerrupter 312 puts out a preset maximum pulse output (when all slits 311 pass through the first photointerrupter 312), at a step S2105, the driving of the shutter in the closing direction is stopped (the coil is electrically deenergized), and the shutter is biased in the opening direction by the spring, thus terminating this flow. That is, by the closing of the main switch, target values $B_1$, $B_2$, ..., $B_n$ corresponding to the respective slits (respective stop diameters) are found and memorized in the microcomputer.

On the other hand, during stopped-down photographing which is the second control mode, the target value $B_n$ is drawn out of a table memorizing it, in conformity with the photometric value from the photometering means 318, and photographing is effected in accordance with a flow shown in FIG. 20B. At a step S2013 in FIG. 20B, exposure is effected in accordance with the flow described with reference to FIG. 20A, thus completing the flow.

During the first control mode usually often used in the construction as described above, the pulse output of the first photointerrupter 312 is counted by the slits 11 provided in conformity with the amount of opening of the shutter to thereby detect the amount of opening of the shutter and therefore, any fluctuation of the output (individual difference, temperature, humidity, lapse of time or the like) of the first photointerrupter 312 does not deteriorate the detection of the amount of opening of the shutter, and during the second control mode as well, the calibration of the second photointerrupter 13 (exactly, the target value $B_n$ is calibrated by the output of the second photointerrupter 13) is effected each time the main switch is closed and therefore, any fluctuation of the output of the second photointerrupter 13 does not cause any fluctuation of the amount of opening and stopped-down photographing becomes possible with stable accuracy.

The reason why the second photointerrupter 13 is calibrated by the closing of the main switch is that the main switch is closed prior to photographing and the conditions (temperature, humidity, etc). are substantially the same as those during photographing and thus, any fluctuation of the output of the second photointerrupter does not occur from the closing of the main switch until photographing is effected.

However, when the photographer forgets to open the main switch, the shutter is opened at the last calibrated value during the next photographing and it cannot be said that the conditions during photographing and during the closing of the main switch are the same.

Figure 22:
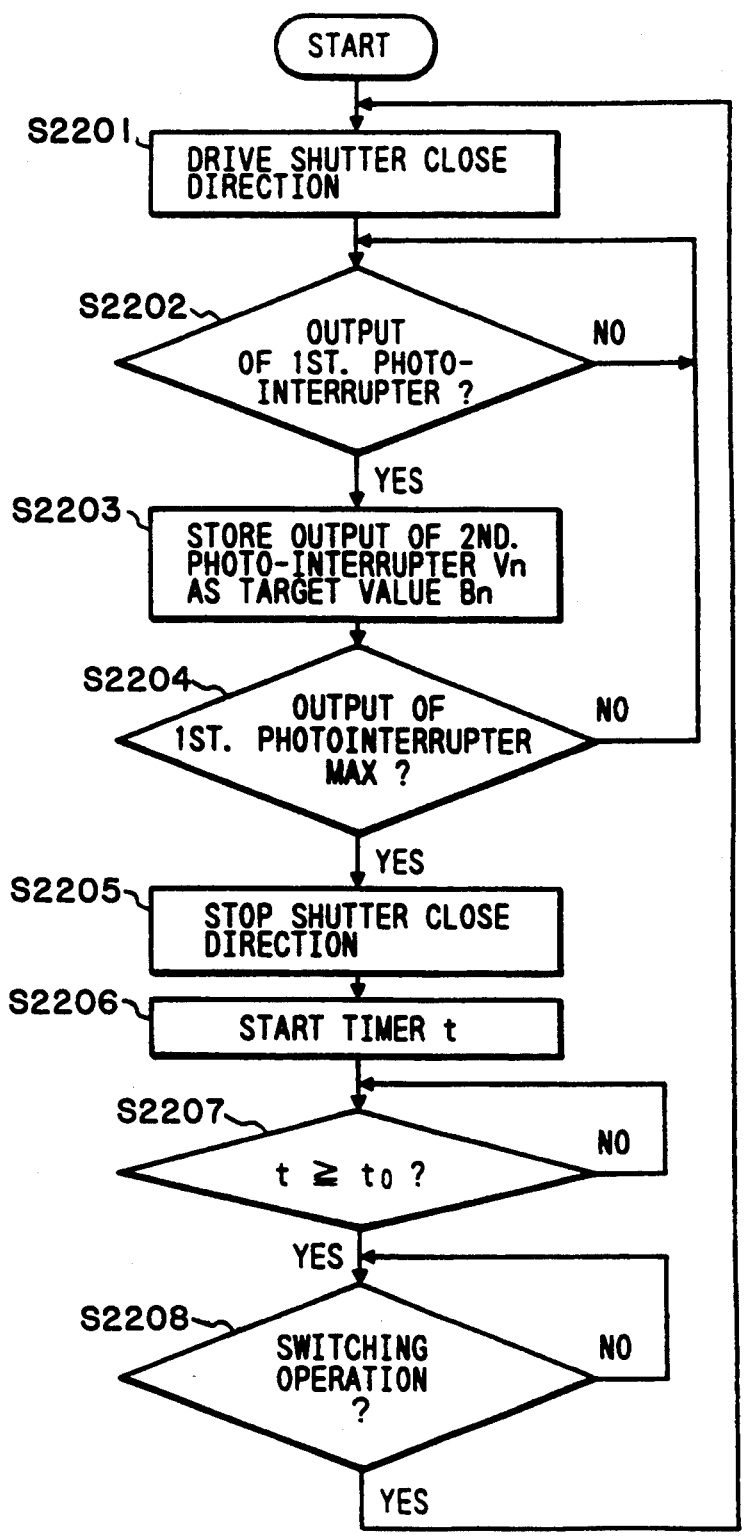
FIG. 22 is a flow chart illustrating the operation of the ninth embodiment.

So, in the flow shown in FIG. 22, after the flow of the steps S2201→S2105 of FIG. 21, at a step S2206, the timer t is started, and if at a step S2207, the timer count is equal to or greater than $t_0$ (for example, if 3600 seconds have passed after the start of the timer), at a step S2208, a switch provided on the camera or the lens is operated, whereby return is made to the step before the step S2201, where calibration is effected. The above-described flow is forced to be, discontinued by the main-switch being opened.

With such a construction, even if the photographer forgets to open the main switch, when a switch operation for photographing is performed after the lapse of a predetermine time, recalibration is effected and therefore, calibration under substantially the same conditions as those during photographing can be accomplished.

The above-described example is a case where the desired aperture during photographing is just on the pulse of the output of the first photointerrupter 312 (for example, the slit 311$a$ of FIG. 19A), but when there is no slit corresponding to the desired aperture, such as when the desired aperture is between the slit 311$a$ and the slit 311$b$, the output of the second photointerrupter 13 during the output of the nearer slit is used as the target value $B_n$.

TENTH EMBODIMENT

Figure 23:
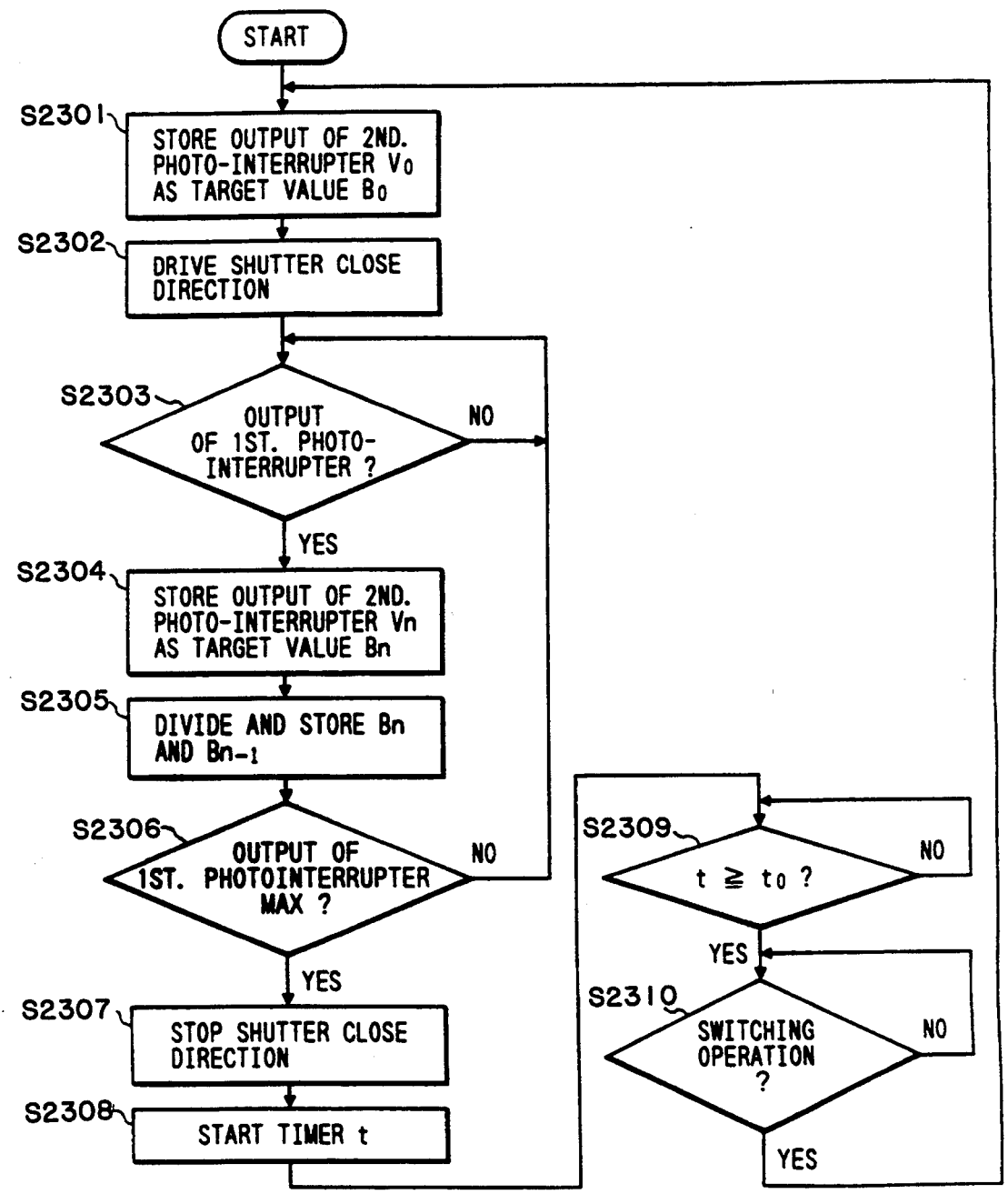
FIG. 23 is a flow chart illustrating the operation of a tenth embodiment.

FIG. 23 is a flow chart showing a tenth embodiment.

This embodiment is such that when the desired aperture described above in the ninth embodiment exists between the slits, the output of the second photointerrupter 13 is used as the target value $B_n$ faithfully to that state.

In FIG. 23, at a step S2301, the output $V_0$ of the second photointerrupter when the shutter is fully open is memorized as a target value $B_0$, whereafter the same operations as the steps S2201–S2203 in the flow of FIG. 22 are performed. Then, at a step S2305, the value between target values $B_n$ and $B_{n-1}$ is divided into a plurality and memorized. That is, for the first time after the start, at the step 2304, the target value $B_1$ is memorized, but at the step S2305, $B_1$ and $B_0$ are divided, for example, into $B_{00}=B_0$, $B_{01}=[(k-1)B_0+B_1]/k$, $B_{02}=[(k-2)B_0+B_1]/k$ ... $B_0(k-1)=[B_0+(k-1)B_1]/k$, and $B_{0k}=B_1$, each of which is memorized.

Likewise, $B_n$ and $B_{n-1}$ are memorized as $B_{(n-1)0}=B_{n-1}$, $B_{(n-1)1}=[(k-1)B_{n-1}+B_n]/k$ ... $B_{(n-1)(k-1)}=[B_{n-1}+(k-1)B_n]/k$, and $B_{(n-1)k}=B_n$.

That is, the values into which the value between the target values $B_{n-1}$ and $B_n$ has been divided are calculated and memorized, whereby for example, even when the desired aperture exists between the slits, the shutter can be opened and closed in the flow shown in FIG. 20A, in accordance with a target value $B_n(k-a)$ corresponding thereto, whereby fine aperture control becomes possible.

The operations of the steps S2306–S2310 of FIG. 23 are the same as the operations of the steps S2204–S2208 of FIG. 22.

ELEVENTH EMBODIMENT

FIG. 24 is a flow chart showing an eleventh embodiment.

This embodiment is a modification of the above-described tenth embodiment, and is designed such that the target values $B_0$, ..., $B_n$ are memorized in that flow of FIG. 22, whereafter during photographing, the target value at the step S2003 in the flow of FIG. 20A is divided and obtained from the memorized target values $B_0$, ..., $B_n$.

In the flow shown in FIG. 24, steps S2401 and S2402 perform the same operations as steps S2001 and S2002, respectively, in FIG. 20A, and at steps S2403 and S2404, a target value $B_n$ greater in aperture diameter than the desired aperture value and a target value $B_{n+1}$ smaller in aperture diameter than the desired aperture value are divided to thereby obtain a target value $B_n$, for the desired aperture. The operations of the steps S2405–S2409 of FIG. 24 are the same as the operations of the steps S2004–S2008 in the flow of FIG. 20A.

In the case of the present embodiment, the memory capacity for the target value can be decreased as compared with the tenth embodiment shown in FIG. 23.

TWELFTH EMBODIMENT

Figure 25:
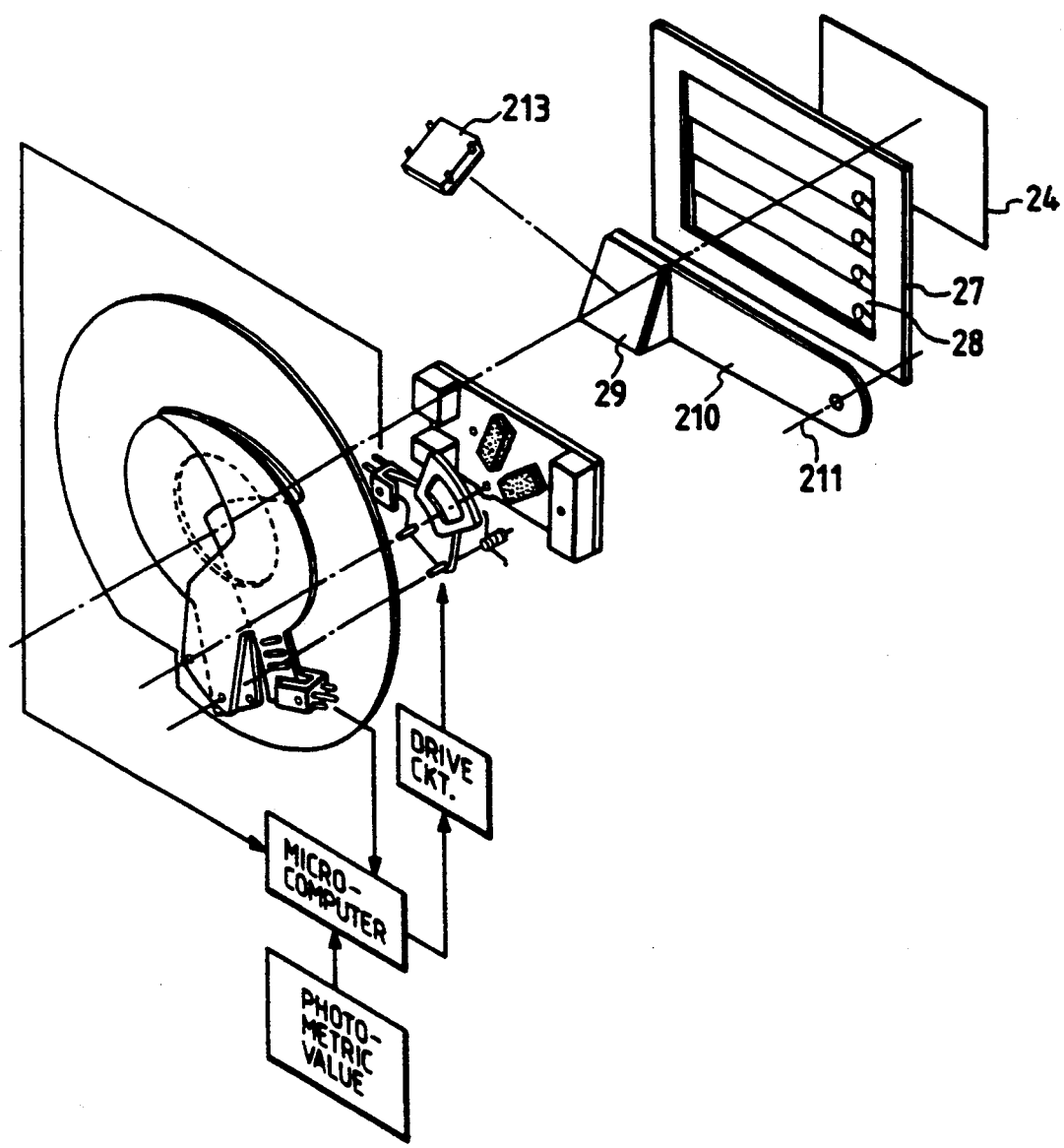
FIG. 25 shows a shutter device in a twelfth embodiment of the present invention.

FIG. 25 shows a twelfth embodiment.

In a construction wherein since as in FIG. 19A, the mirror supporting frame 22 shields the film surface 24 from light, the shutter can be opened and closed independently of the shielding of the film from light and therefore, each time and immediately before the main switch is closed, the second photointerrupter 13 can be calibrated, the influence of the fluctuation of the output of the second photointerrupter 13 upon exposure becomes null, whereas the shielding of the film surface 24 from light is not limited to by the mirror supporting frame 22, but may be also effected by a light intercepting device 27 as shown in FIG. 25, and the photographer recognizes the object by means of an external finder, not shown.

The reason why in FIG. 25, the film surface 24 is shielded from light by the light intercepting device 27 is that the light beam from the object is reflected by the mirror 29 and is directed to the element 213 for auto focusing, and until automatic focus adjustment is terminated, the shutter remains in its open state and the light intercepting device 27 shields the film surface 24 from light, whereafter the mirror 29 is rotated from the arm 210 about the shaft 211 and is retracted from the light beam, whereby the shutter is closed and the group of light intercepting blades 28 of the light intercepting device 27 is retracted to thereby open and close the shutter and effect exposure. In the case of such a construction, the calibration of the second photointerrupter 13 can be effected when the shutter is closed before exposure.

Also, the calibration of the second photointerrupter 13, as described above, is not effected on the basis of the output of the first photointerrupter 312, but the maximum output value of the second photointerrupter 13 (the output when the shutter is fully open) may be obtained, and it may be divided to thereby calculate the output of the second photointerrupter corresponding to the desired aperture, and this output may be used as the target value $B_n$, and in such case, the first photointerrupter 312 need not be driven (turned on) during calibration and thus, power saving can be achieved.

In FIG. 26, steps S2603-S2305 are the same as the steps S2308-S2310 of FIG. 23, and this flow is started by the main switch being closed, and at a step S2601, the output $V_{max}$ of the second photointerrupter (at this time, the second photointerrupter puts out a maximum output because the shutter is biased to its full open state by the spring) is obtained, and at a step S2602, the maximum output $V_{max}$ is divided into a plurality, and $B_1$-$B_n$ are memorized as $B_1=1/n\cdot V_{max}$, $B_2=2/n\cdot V_{max}$, $B_{n-1}=(n-1)/n\cdot V_{max}$ and $B_n=V_{max}$. On the basis of these memorized target values, the shutter is opened and closed in accordance with the flow of FIG. 20A. Of course, the step S2602, as in FIG. 23, may be carried out immediately before exposure.

THIRTEENTH EMBODIMENT

FIG. 27 shows a thirteenth embodiment.

In FIG. 26, the maximum output of the second photointerrupter 13 is divided to thereby obtain an output corresponding to the desired aperture value, whereby calibration is effected, and this is possible because it is premised on the fact that the output of the second photointerrupter 13 is maximum when the shutter is fully open, and is zero when the shutter is fully closed. However, the output of the photointerrupter 13 when the shutter is fully closed is not always zero, but in some cases, it includes a DC offset voltage, and in such cases, even if the maximum output is divided to obtain an output corresponding to the desired aperture value, the errors thereof will be superposed one upon another. This will now be described specifically. Let it be assumed that for example, when the maximum output is $V_{max}$, $B_n=A/(A+B)V_{max}$ and an output corresponding to the desired aperture value has been obtained. If the output when the shutter is fully closed is zero, the output corresponding to the desired aperture value is correct, but if there is an output $V_{min}$ (corresponding to DC offset) when the shutter is fully closed, the true maximum output is $V_{max}-V_{min}$ and therefore, $A/(A+B)V_{max}$ is not an output corresponding to the desired aperture value. Therefore, when a correct output is to be obtained, it is necessary to obtain the minimum output $V_{min}$ of the second photointerrupter 13 as well, subtract it from the maximum output $V_{max}$ and divide the result.

FIG. 27 shows the flow of it. The difference of this flow from the flow of FIG. 26 is that at a step S2701, the output (maximum output) of the second photointerrupter 13 when the shutter is fully open is obtained, whereafter at a step S2702, the shutter is closed, and at a step S2703, it is confirmed by the timer or the first photointerrupter that the shutter has become fully closed, whereafter at a step S2704, the output (minimum output) of the second photointerrupter 13 when the shutter is fully closed is obtained, and at a step S2705, the difference between the maximum output and the minimum output is obtained, and it is divided into target values ($B_1$, ..., $B_n$). At a step S2706, the driving of the shutter in the closing direction is stopped and the shutter is operated in the opening direction by the spring force. Steps S2702-S2709 are the same as the steps S2603-S2605 of FIG. 26.

According to the above-described method, even if a DC offset is created in the output of the second photointerrupter 13, the output of the second photointerrupter 13 corresponding to the desired aperture value can be obtained without any error and the accuracy of calibration can be enhanced.

In the embodiments shown in FIGS. 19 to 27, the first and second photointerrupters have been described as being used as first and second opening amount detecting means, whereas this is not restrictive, but of course, these photointerrupters can be replaced by magneto-electrical conversion elements such as Hall elements or other sensors such as sensors using an eddy current, and what is important is that a means for digitally detecting the amount of opening in a pulse encoder fashion and a means for detecting in an analog manner the amount of opening are provided at a time on the shutter and for example, where Hall elements or the like are employed, the position detecting portion 310 is magnetized in a slit-like fashion, instead of providing the slits 311, and a highly permeable member or a magnetic member is attached to the protruding portion 12a of the base member 12 and is opposed to the Hall elements and the second photointerrupter 13 is calibrated when the main switch is closed.

A fourteenth embodiment will now be described.

Figure 28:
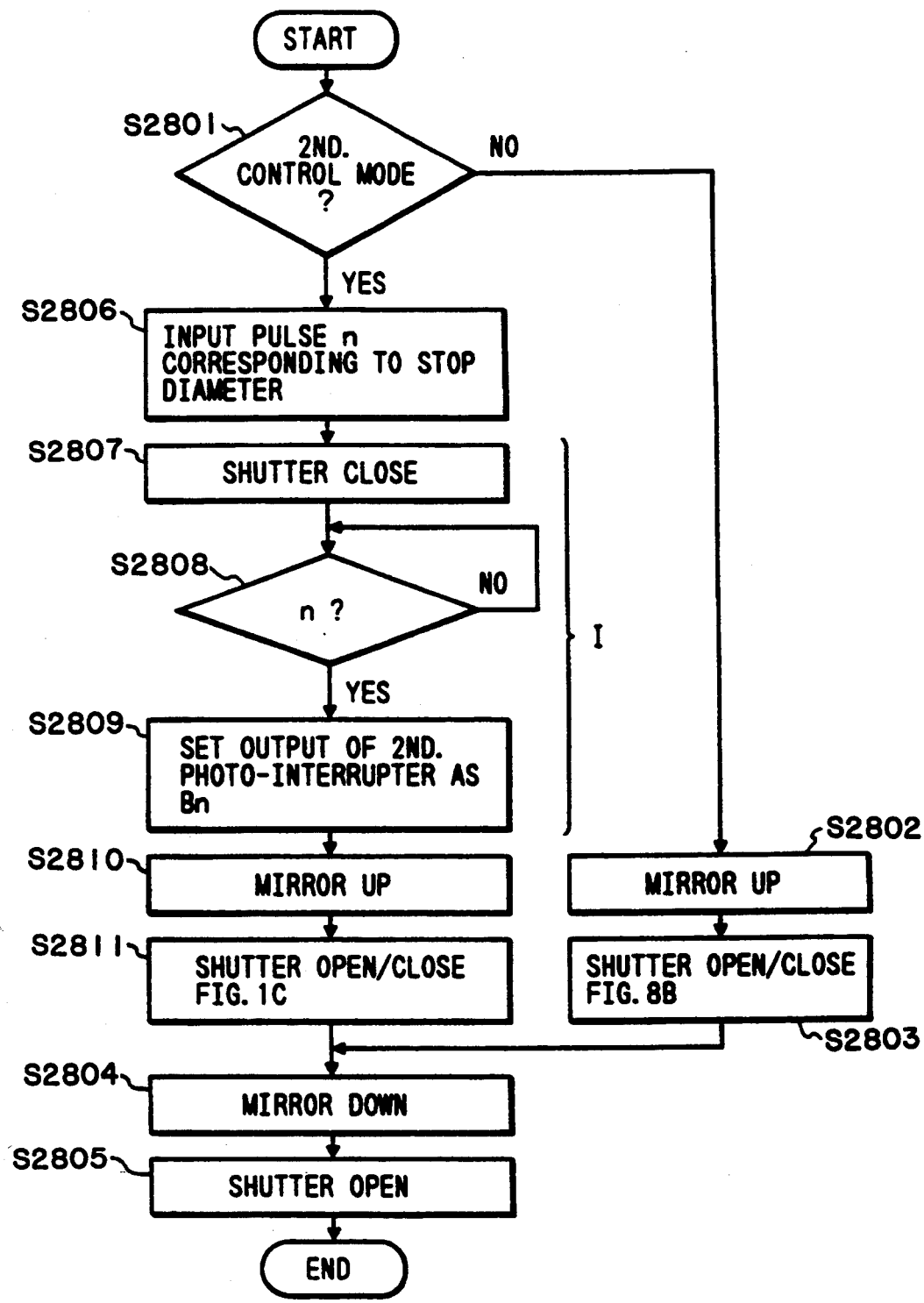
FIG. 28 is a flow chart illustrating the operation of a fourteenth embodiment.

FIG. 28 is a flow chart of the fourteenth embodiment, in which the type of FIG. 2 is used as the construction of the shutter device.

In FIG. 28, the flow is started by the release button being fully depressed, and at a step S2801, whether the mode is normal photographing (the first control mode) or stopped-down photographing (the second control mode) is judged by photographing mode switching, and if the mode is the first control mode, at a step S2802, the mirror is upped, and at a step S2803, the shutter is opened and closed (the flow of FIG. 8B), and at a step S2804, the mirror is downed, and at a step S2805, the shutter is returned to its open state, thus terminating the flow. On the other hand, if at the step S2801, the mode is the second control mode, at a step S2806, a stopped-down aperture value conforming to the photometric value is determined, and the count number n of the slits 311 corresponding thereto is input. Subsequently, at a step S2807, the shutter closing operation is started, and when at a step S2808, the first photointerrupter 312 outputs n pulses, advance is made to a step S2809, where the then output of the second photointerrupter 13 is set to the target value $B_n$. Subsequently, at a step S2810, the mirror is upped, and at a step S2811, the shutter is opened and closed (the flow S301→S305 of FIG. 3), and at the step S2804, the mirror is downed, and at the step S2805, the shutter is opened, thus terminating the flow.

With the above-described construction, during each photographing, the calibration of the second photointerrupter 13 is effected in advance. That is, the output of the second photointerrupter 13 is varied by individual difference, temperature, humidity or lapse of time and therefore, if the output of the second photointerrupter corresponding to the target value $B_n$ is determined without calibration, the stop diameter will be varied by the fluctuation of the output thereof (individual difference, temperature, humidity or lapse of time). Although this variation is not so great and during stop-down, the exposure time occupies a greater weight in the exposure error of the whole than the stop diameter, if the construction of FIG. 28 is adopted, even the fluctuation of the stop diameter will become null (because calibration is effected each time) and an exposure of high accuracy will become possible.

This is because on the basis of the output of the first photointerrupter 312 of the pulse encoder type which is free of any fluctuation of the detection output of the amount of opening by individual difference, temperature, humidity or lapse of time, the output of the second photointerrupter 13 corresponding to the stop diameter is determined each time and immediately before photographing is effected, and such a determining method means nothing but that the output of the second photointerrupter 13 is calibrated each time.

As described above, in the embodiment of FIG. 28, it becomes possible to enhance the exposure accuracy during stopped-down photographing.

The above-described example is a case where the desired aperture during stopped-down photographing is just in a certain pulse of the output of the first photointerrupter 312 (e.g. the slit 311a of FIG. 2), but where there is no slit corresponding to the desired aperture (for example, when the desired aperture is between the slit 311a and the slit 311b), the output of the second photointerrupter 13 during the outputting of the nearer slit is used as the target value $B_n$.

Here, as another example for coping with the above-noted problem, consider a case where when the desired aperture is between the slits 311a and 311b, the output of the second photointerrupter 13 is used as the target value $B_n$ faithfully to it.

Figure 29:
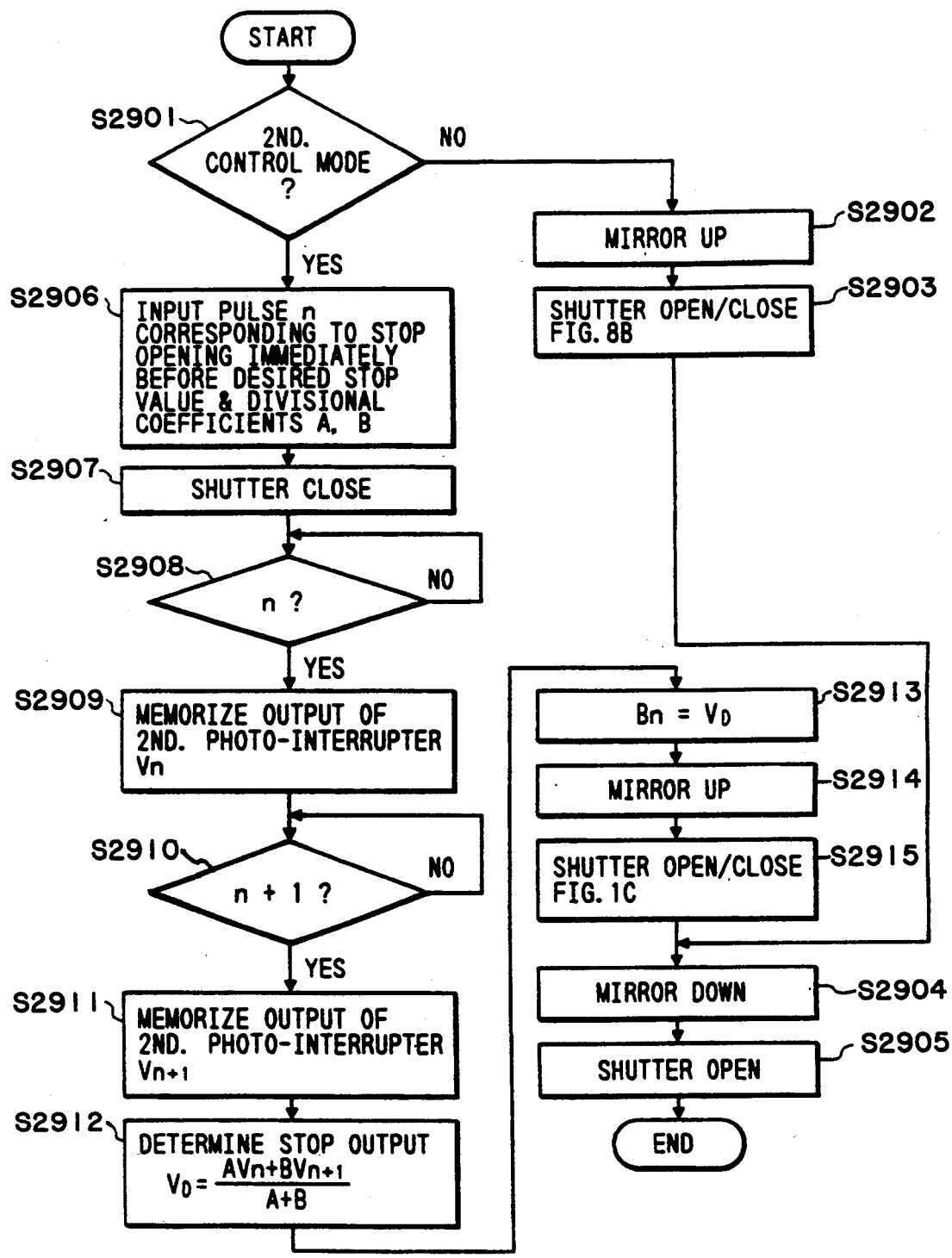
FIG. 29 is a flow chart illustrating the operation of a fifteenth embodiment.

FIG. 29 is a flow therefor and shows a fifteenth embodiment. Steps S2901–S2905 correspond to steps S2801–S2805 of FIG. 28. The differences of this embodiment from the embodiment of FIG. 28 are steps S2906, and S2908–S2915. The count pulse n of the slit 311a immediately before the desired aperture is reached (i.e., when the aperture is slightly greater than the desired aperture) is input (at the next slit count n+1, the aperture becomes slightly smaller than the desired aperture) and further, coefficients A and B which divide the value between the count pulse n and the next count pulse n+1 are also input. (The desired aperture is at a place whereat the value between the count pulses n and n+1 is divided by A and B. ) When at a step S2908, n pulses are output, at a step S2909, the then output $V_n$ of the second photointerrupter 13 is memorized, and when at a step S2910, n+1 pulses are output, at a step S2911, the output $V_{n+1}$ of the second photointerrupter 13 is also memorized. At a step S2912, the output $V_D$ of the second photointerrupter 13 corresponding to the desired aperture is obtained by dividing $V_n$ and $V_{n+1}$ by A and B.

$$V_D = \frac{AV_n + BV_{n+1}}{A + B},$$

and $V_D$ is used as the target value $B_n$.

With the construction as described above, in the second control mode, the stop diameter can be controlled more finely than the intervals between the slits 311 and therefore, exposure of higher accuracy becomes possible.

In the construction as shown in FIG. 2 wherein since the mirror supporting frame 22 shields the film surface 24 from light, the shutter can be opened and closed independently of the shielding of the film from light and therefore, during each cycle of exposure, the second photointerrupter 13 can be calibrated immediately before that, the influence of any fluctuation of the output of the second photointerrupter 13 upon exposure becomes null, whereas the shielding of the film surface 24 from light is not limited to by the mirror supporting frame 22, but may also be effected by the light intercepting device 27 as shown in FIG. 5. (The photographer recognizes the object by means of an external finder, not shown.)

Figure 30:
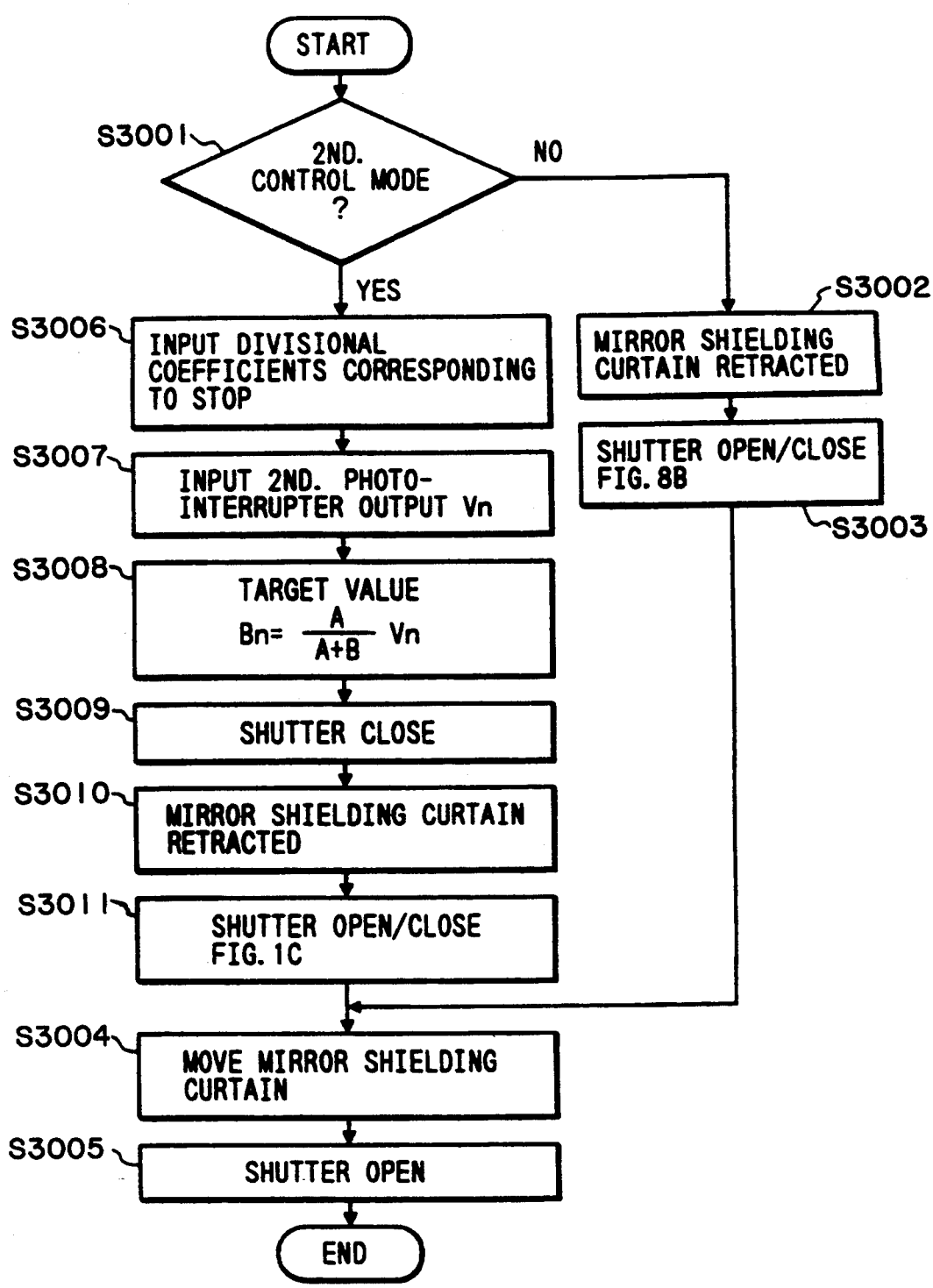
FIG. 30 is a flow chart illustrating the operation of a sixteenth embodiment.

FIG. 30 shows the flow of the calibration by the mechanism of FIG. 5, and shows a sixteenth embodiment. This flow is started by the release switch being fully depressed, and automatic focus adjustment has been terminated by this time. The differences of FIG. 30 from FIG. 29 are that mirror up and mirror down are replaced by the retraction and entry of a mirror shielding curtain, and the mechanism of calibration of steps S2906 to S2912, and at the step S2906 of FIG. 29, the ratio of the desired aperture to that when the shutter is fully open at the step S2906, the stop diameter resulting from the fully open aperture being divided into A : B) is input in conformity with the photometric value, and at a step iii), the output $V_n$ of the second photointerrupter 13 is input (since at this time, the shutter is open, the space between the light projecting and receiving portions of the photointerrupter is not shielded from light and the photointerrupter puts out a maximum output). At a step IV), the output of the photointerrupter 13 when the shutter is fully open is divided into A: B and this is used as the target value $B_n$.

$$\left( B_n = \frac{B}{A + B} V_n \right)$$

As in FIG. 29, exposure is effected by a series of operations. The embodiments hitherto described are of a construction in which the second photointerrupter 13 puts out a maximum output when the shutter is fully open, but if a construction is adopted in which the second photointerrupter 13 puts out a maximum output when the shutter is fully closed (the space between the light projecting and receiving portions of the second photointerrupter 13 is shielded from light when the shutter is fully open), the calibration of the second photointerrupter 13 will also be possible in the construction shown in FIG. 1A.

Figure 31:
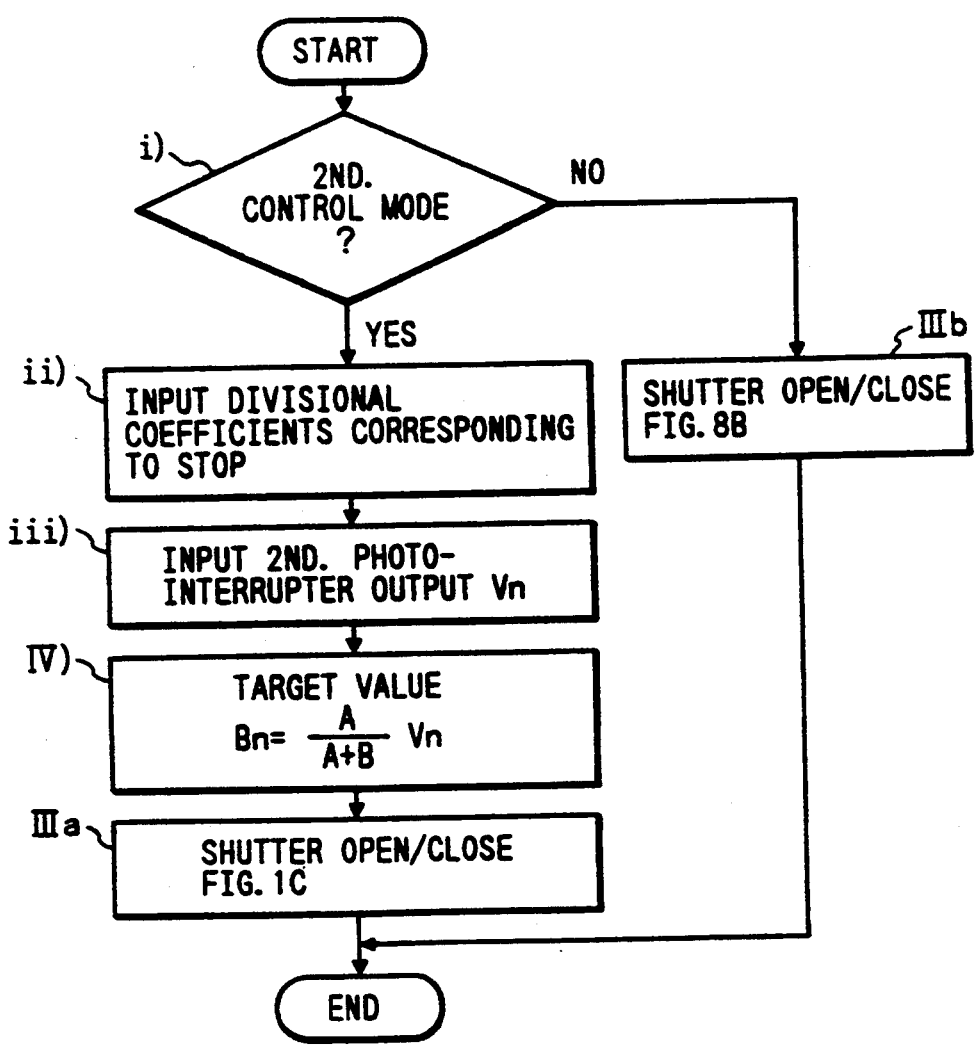
FIG. 31 is a flow chart illustrating the operation of a seventeenth embodiment.

FIG. 31 shows the flow of it, and shows a seventeenth embodiment. At a step S3104, the output $V_n$ of the second photointerrupter is input, and since at this time, the shutter is fully closed, $V_n$ is a maximum output, and at a step S3105, this output can be divided and used as the target value and in the second control mode, the shutter can be opened and closed.

Turning back to FIG. 30, calibration is effected by dividing the maximum output of the second photointerrupter 13 and obtaining an output corresponding to the desired aperture value, and this is possible because it is premised that the output of the second photointerrupter 13 is maximum when the shutter is fully open, and is zero when the shutter is fully closed. However, the output of the photointerrupter 13 when the shutter is fully closed is not always zero, but in some cases, it includes a DC offset voltage, and in such cases, even if the maximum output is divided to obtain an output corresponding to the desired aperture value, the errors thereof will be superposed one upon another. This will now be described specifically. Let it be assumed that for example, when the maximum output is $V_{max}$, an output corresponding to the desired aperture value has been obtained at $$B_n = \frac{A}{A+B} V_{max}.$$

If the output when the shutter is fully closed is zero, the output corresponding to the desired output $V_{min}$ (corresponding to the DC offset) when the aperture value will be correct, but if there is an shutter is fully closed, the true maximum output is $V_{max}-V_{min}$ and therefore, $$\frac{A}{A+B} V_{max}$$

is not the output corresponding to the desired aperture value. Therefore, when a correct output is to be obtained, it is necessary to obtain the minimum output $V_{min}$ of the second photointerrupter 13 as well and subtract it from the maximum output $V_{max}$, and then divide the result.

Figure 32:
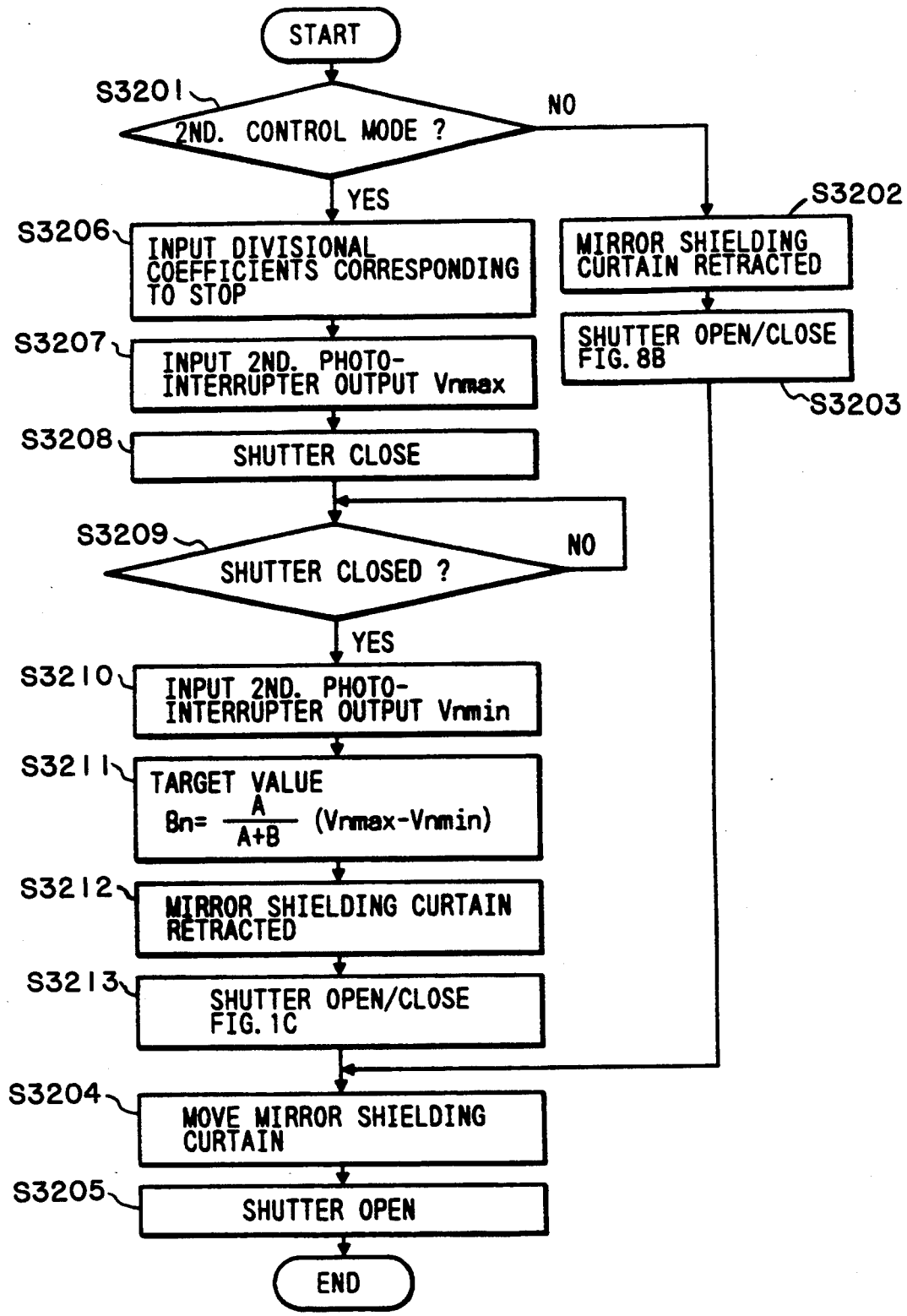
FIG. 32 is a flow chart illustrating the operation of an eighteenth embodiment.

FIG. 32 shows the flow of it, and shows an eighteenth embodiment. The difference of this flow from the flow of FIG. 30 is that at a step S3207, the output (maximum output) of the second photointerrupter 13 when the shutter is fully open is obtained, whereafter at a step S3208, the shutter is closed, and at a step S3209, the shutter is rendered fully closed by the timer or the first photointerrupter, whereafter at a step S3210, the output (mini,hum output) of the second photointerrupter 13 when the shutter is fully closed is obtained and at a step S3211 the difference between the maximum output and the minimum output is found, and it is divided and the result is used as the target value $B_n$.

According to the above-described method, even if DC offset is created in the output of the second photointerrupter 13, the output of the second photointerrupter corresponding to the desired aperture value can be obtained without any error and the accuracy of calibration can be enhanced.

In the embodiments of FIGS. 28 to 32, the first and second photointerrupters have been described as being used as first and second opening amount detecting means, whereas this is not restrictive, but of course, these photointerrupters can be replaced by magneto-electrical conversion elements such as Hall elements or other sensors such as sensors using an eddy current and what is important is that means for digitally detecting the amount of opening in a pulse encoder fashion and means for analogously detecting the amount of opening are provided at a time on the shutter. For example, where Hall elements or the like are employed, the position detecting portion 310 is magnetized in a slit-like fashion, instead of providing the slits 311, and a highly permeable member or a magnetic member is attached to the protruding portion 12a of the base member 12, and can be opposed to the Hall elements. In FIGS. 4A and 4B, in the shielding of the mirror from light, the second photointerrupter 13 is calibrated by the use of the first photointerrupter 312, and in FIGS. 4A and 4B, calibration is effected by only the second photointerrupter 13 by the use of a light intercepting plate, but in the shielding of the mirror from light, calibration may be effected by only the second photointerrupter 13, or the second photointerrupter 13 may be calibrated by the use of the first photointerrupter 312 during the light interception by the light intercepting plate.

As described above, according to the present embodiment, provision is made of the means for digitally detecting the amount of opening in a pulse encoder fashion and means for analogously detecting the amount of opening, whereby both during normal photographing and during stopped-down photographing, exposure can be effected with good accuracy irrespective of any fluctuation of the outputs of the opening amount detecting means.

Figure 33:
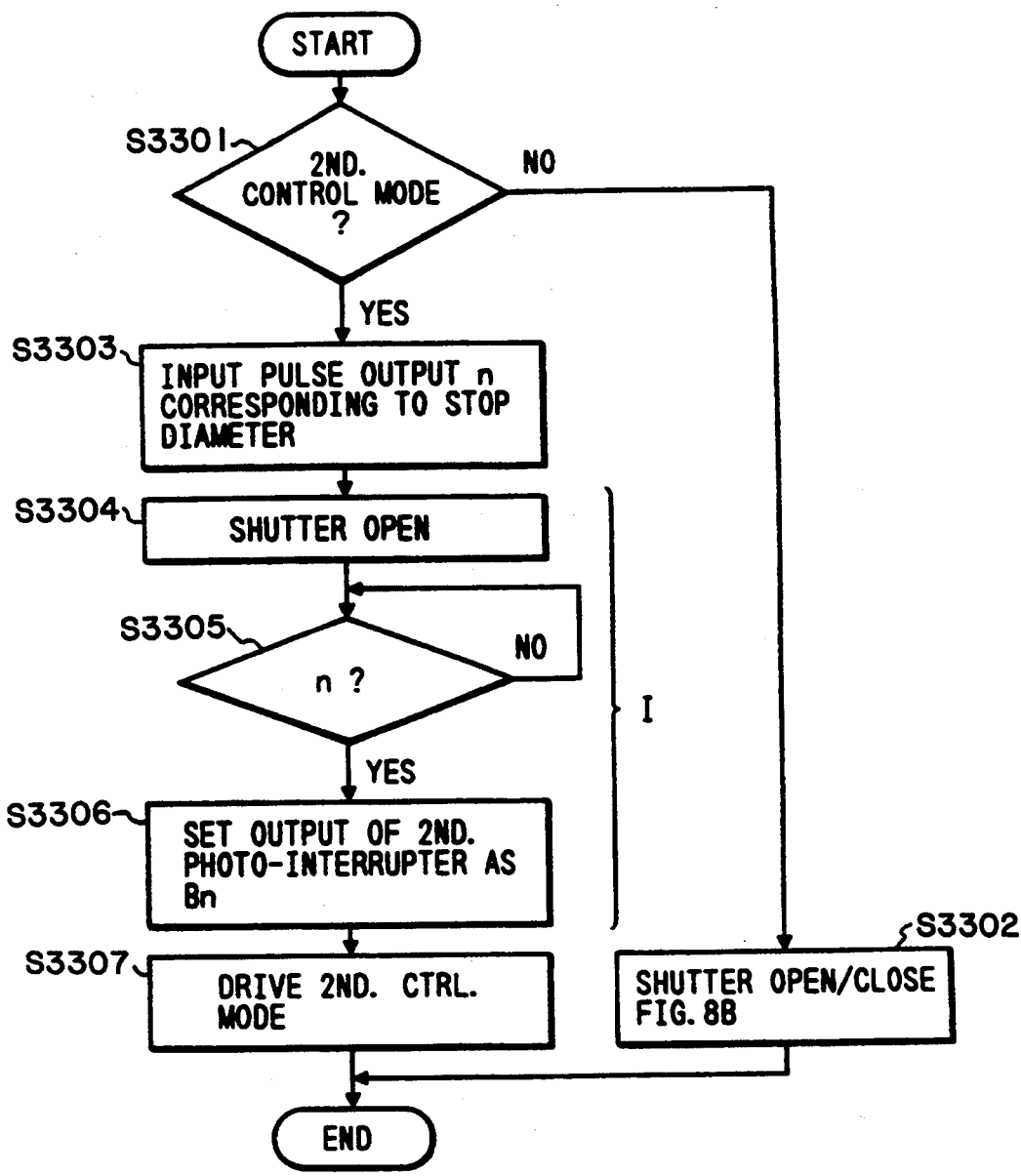
FIG. 33 is a flow chart illustrating the operation of a nineteenth embodiment.

FIG. 33 shows a flow as a nineteenth embodiment. The shutter construction used in this embodiment is of the type of FIG. 1. This flow is started by the release button being fully depressed, and at a step S3301, the flow is divided by the photographing mode switching means 112, and during normal photographing, at a step S3302, the shutter is opened and closed, thus terminating the flow, and when stopped-down photographing (the second control mode) is selected, the count number n up to the slit corresponding to the desired aperture determined by the photometric value 318 or the aperture value arbitrarily chosen by the photographer (the number of slits passed from the time when the shutter is fully closed until the time when the shutter reaches the desired aperture) is input at a step S3303, and in the first control mode (step S3304), the shutter is driven in the opening direction until the output of the first photointerrupter counts n pulses, and when at a step S3305, n pulses are output, and at a step S3306, the then output $V_n$ of the second photointerrupter 13 is used as the target value $B_n$, and at a stop S3307, automatic control is effected so that in the second control mode, the output of the second photointerrupter 13 may maintain the target value $B_n$, and the target value $B_n$ is rendered into zero after the termination of a predetermined exposure time, and in conformity therewith, the shutter is driven so that the output of the second photointerrupter 13 may become zero (that is, the shutter may become fully closed), thus terminating the flow. At the step S3304, the shutter is opened by the first control mode, whereas this is not restrictive, but the coil 11 may be simply electrically energized to thereby open the shutter. Even in such case, the mode shifts to the second control mode after n pulses are output and therefore, it never happens that the shutter is opened. However, the shutter blades overrun due to their own inertia even after n pulses are output and therefore, in order to reduce the amount of overrun, the electrical energization of the coil 11 is effected by a small current to thereby open the shutter slowly. In this case, the shutter blades are made to open slowly. Also, in this case, an exposure error occurs correspondingly to the slow opening of the shutter blades, but since long-time exposure is used during stopped-down photographing, the time till the opening of the shutter does not cause a great error and also, if this time until the opening of the shutter is known in advance and correspondingly thereto, the time for which the shutter is maintained open (exposure time) is adjusted, the error will become null.

If the shutter opening operation of the step S304 is performed in the first control mode and further, a smaller amount of current than in the first control mode during normal photographing is supplied to the coil 11, the amount of overrun by inertia will likewise become small and also, after n pulses are output, brake (electrical energization in the closing direction) will be applied in the opening direction and therefore, the amount of overrun can be made smaller. Besides, the above-described example of the shutter opening at the step iii)' is a case where the desired aperture during stopped-down photographing is just in a certain pulse (e.g. the slit 311a of FIG. 1A) of the output of the first photointerrupter 312, but when there is no slit corresponding to the desired aperture (for example, when the desired aperture is between the slit 311a and the slit 311b), the output of the second photointerrupter 13 during the outputting of the nearer slit is used as the target value $B_n$.

Here, as another example for copying with the above-noted problem, consider a case where when the desired aperture is between the slits 311a and 311b, the output of the second photointerrupter 13 is used as the target value $B_n$ faithfully to it.

Figure 34:
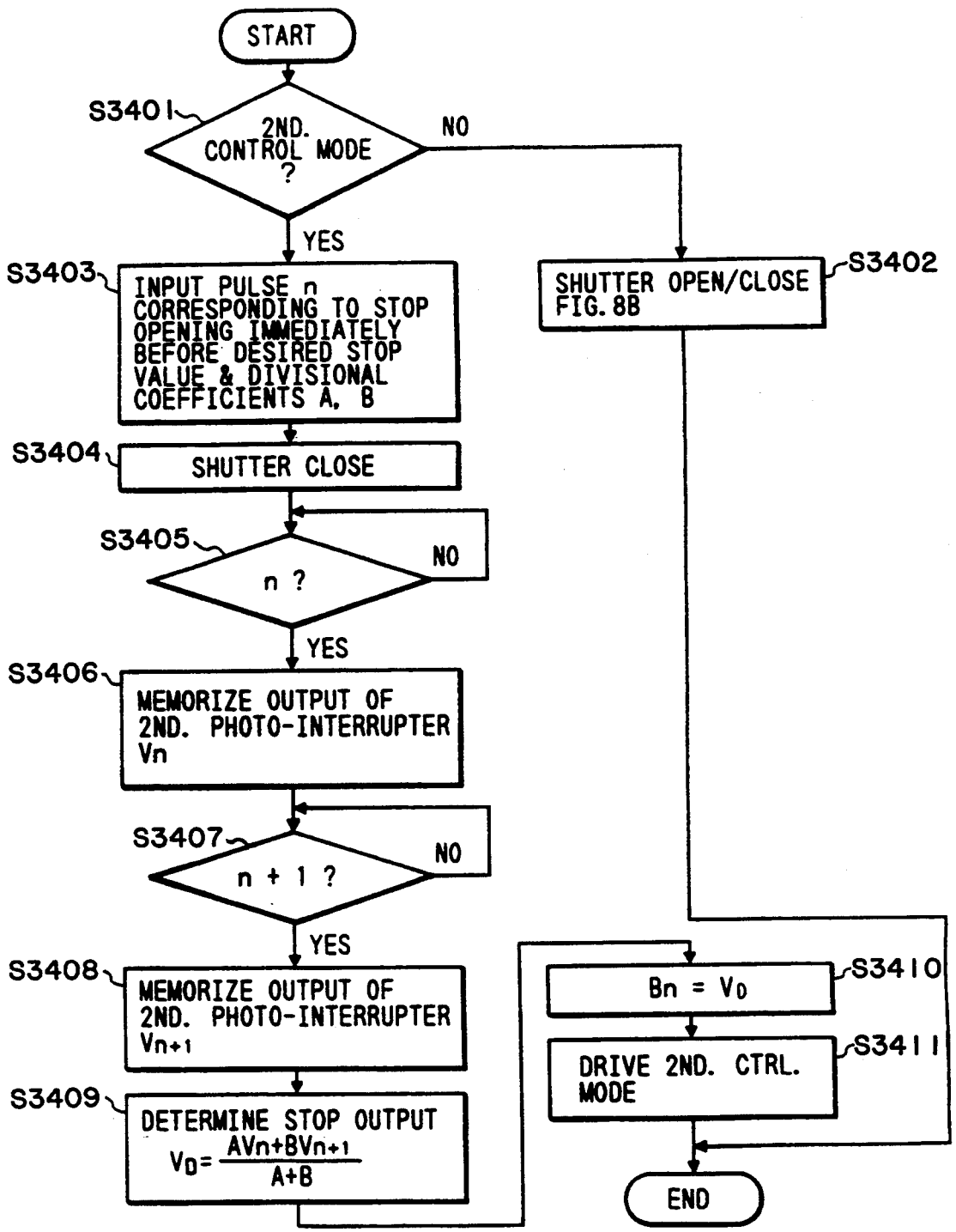
FIG. 34 is a flow chart illustrating the operation of a twentieth embodiment.

FIG. 34 is a flow therefor and shows a twentieth embodiment. The differences of FIG. 34 from FIG. 33 are at steps S3403 and S3405, S3409 and step S3403. The count pulse n of the slit 311a immediately before the desired aperture is reached (i.e., when the aperture is slightly greater than the desired aperture) is input (at the next slit count n+1, the aperture becomes slightly smaller than the desired aperture) and further, coefficients A and B which divide the value between the count pulse n and the next count pulse n+1 are also input. (The desired aperture is at a place whereat the value between the count pulses n and n+1 is divided by A and B.) When at the step S3405, n pulses are output, at the step S3406, the then output $V_n$ of the second photointerrupter 13 is memorized, and when at the step S3407, n+1 pulses are output, at the step S3408, the output $V_{n+1}$ of the second photointerrupter 13 is also memorized. At the step S3409, the output $V_D$ of the second photointerrupter 13 corresponding to the desired aperture is obtained by dividing $V_n$ and $V_{n+1}$ by A and B.

$$\left(V_D = \frac{AV_n + BV_{n+1}}{A + B}\right)(V),$$

and $V_D$ is used as the target value $B_n$.

With the construction as described above, in the second control mode, the stop aperture can be controlled more finely than the intervals between the slits 311 and therefore, control of higher accuracy can be accomplished. Also, instead of the calibration of the second photointerrupter 13 being effected on the basis of the output of the first photointerrupter 312 as described above, the maximum value of the output of the second photointerrupter 13 (the output thereof when the shutter is open) may be obtained and divided to thereby calculate the output of the second photointerrupter 13 corresponding to that during the desired aperture, and this output may be used as the target value $B_n$. In such case, the first photointerrupter 312 is not required during calibration and therefore, power saving can be achieved.

Figure 35:
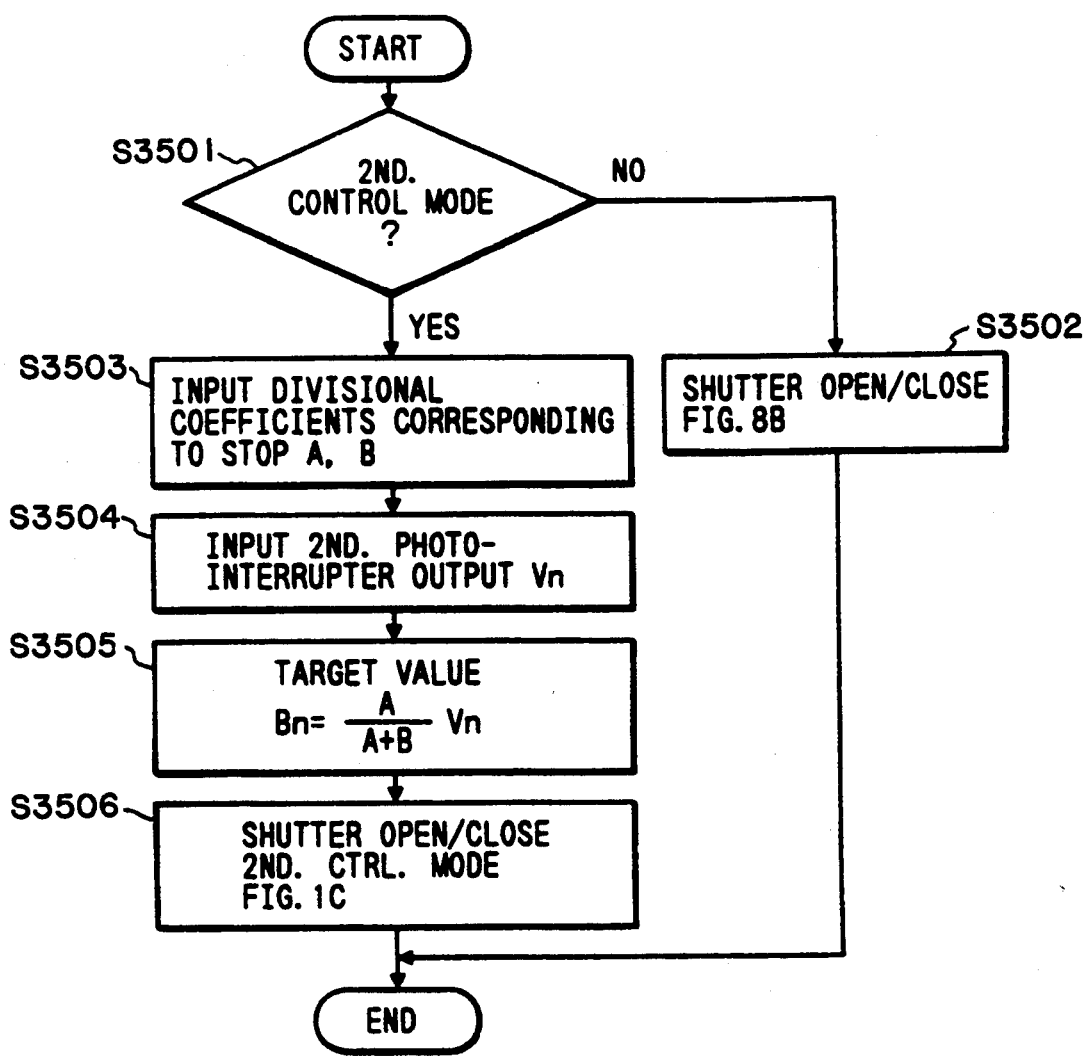
FIG. 35 is a flow chart illustrating the operation of a twenty-first embodiment.

FIG. 35 shows the flow chart of the twenty-first embodiment. This flow is started by the release switch being fully depressed.

The difference of FIG. 35 from FIG. 33 is the mechanism of the calibration of steps S3503–S3506 In FIG. 35, at the step S3503, the ratio of the desired aperture to the aperture when the shutte is fully open at the step S3503, the stop diameter resulting from the aperture when the shutter is open being divided into A : B) is input in conformity with the photometric value, and at the step S3504, the output $V_n$ of the second photointerrupter 13 is input. At this time, the shutter is fully closed and therefore, the space between the light projecting and receiving portions of the second photointerrupter is not shielded from light and the second photointerrupter puts out a maximum output. (In FIG. 35, the operation becomes converse, but the design is changed such that the output of the photointerrupter 13 becomes maximum when the shutter is fully closed.) At the step S3505, when the shutter is fully open, the output of the photointerrupter 13 is divided into A : B and the result is used as the target value $B_n$:

$$\left(B_n = \frac{A}{A + B} V_n\right)$$

Figure 36:
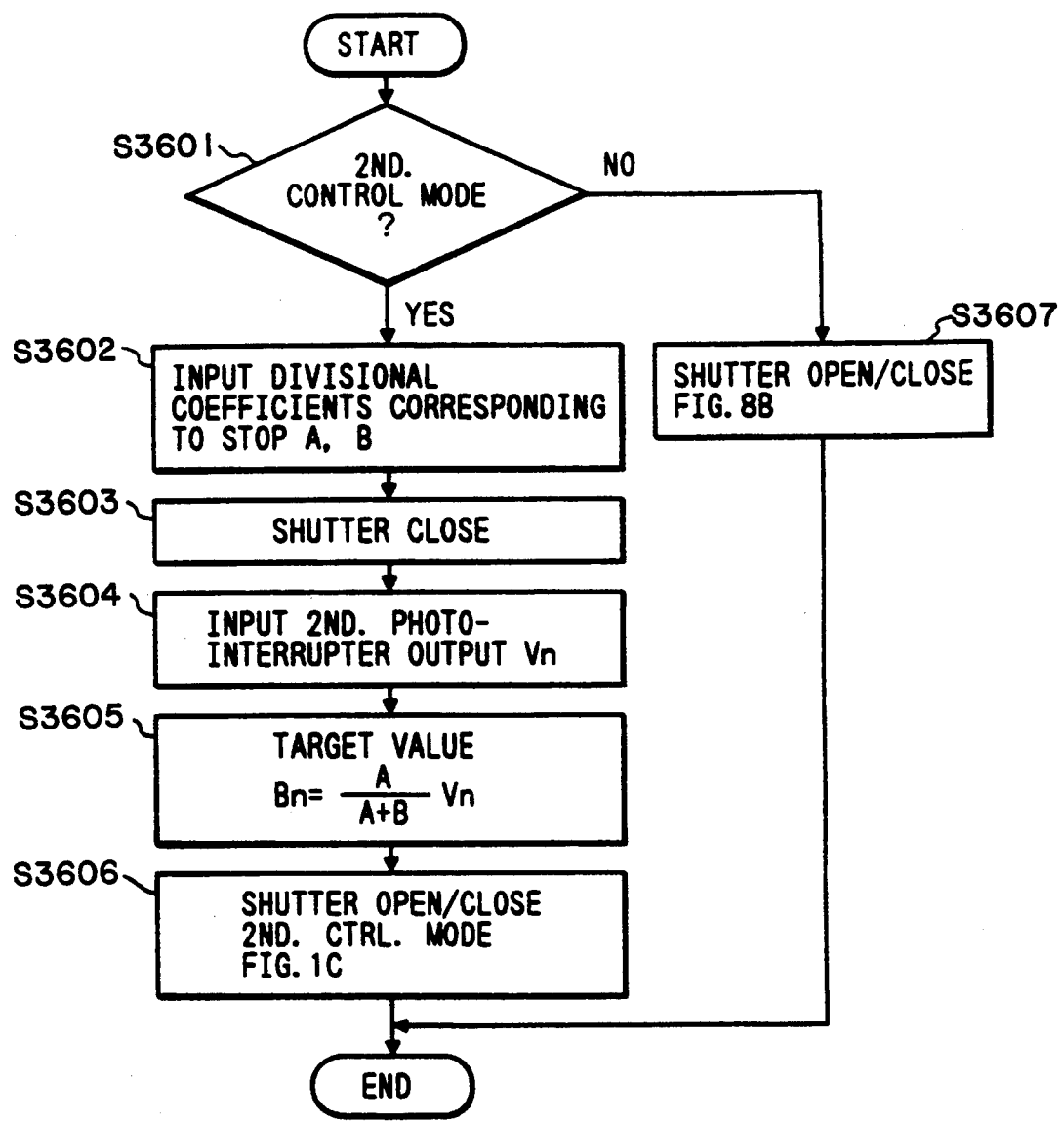
FIG. 36 is a flow chart illustrating the operation of a twenty-second embodiment.

Then, in the second control mode, the opening and closing of the shutter (exposure) are effected by the flow shown in FIG. 1C, thus terminating the flow. That is, when such calibration is effected, becomes unnecessary to drive the shutter in the opening direction in the first control mode. Of course, when as in FIG. 1A, the second photointerrupter outputs a maximum output with the shutter open, the shutter may first be opened in the first control mode, and then the maximum output V of the second photointerrupter may be obtained and divided to find the target value $B_n$, whereafter in the second control mode, the shutter may be closed to the desired aperture. FIG. 36 shows this flow and shows a twenty-second embodiment. The difference of FIG. 36 from FIG. 35 is that at a step S3603, the shutter is opened in the first control mode and at steps S3604 and S3605, the target value $B_n$ is found from the then output $V_n$ of the second photointerrupter 13 and the shutter is controlled in the second control mode. With such a construction, the shutter is once fully opened, but since during stopped-down photographing, the exposure time is long, the exposure error of the short time for which the shutter is fully open does not pose so serious a problem.

Turning back to FIG. 35, the maximum output of the second photointerrupter is divided and an output corresponding to the desired aperture value is obtained to thereby effect calibration, and this is possible because it is premised that the output of the second photointerrupter 13 is maximum when the shutter is fully closed, and is zero when the shutter is fully open. However, the output of the photointerrupter 13 when the shutter is fully open is not always zero, but in some cases, it includes a DC offset voltage, and in such cases, even if the maximum output is divided to obtain an output corresponding to the desired aperture value, the errors thereof will be superposed one upon another. This will now be described specifically. Let it be assumed that for example, when the maximum output is $V_{max}$, an output corresponding to the desired aperture value has been obtained for $$B_n = \frac{A}{A+B} V_{max}.$$

If the output when the shutter is fully open is zero, the output corresponding to the desired aperture value is correct, but when there is an output $V_{min}$ (corresponding to DC offset) when the shutter is fully open, the true maximum output is $V_{max} - V_{min}$ and thus, $$\frac{A}{A+B} V_{max}$$

is not the output corresponding to the desired aperture value. Therefore, when a correct output is to be obtained, it is necessary to obtain the minimum output $V_{min}$ of the second photointerrupter 13 as well and subtract it from the maximum output $V_{max}$, and then divide the result.

Figure 37:
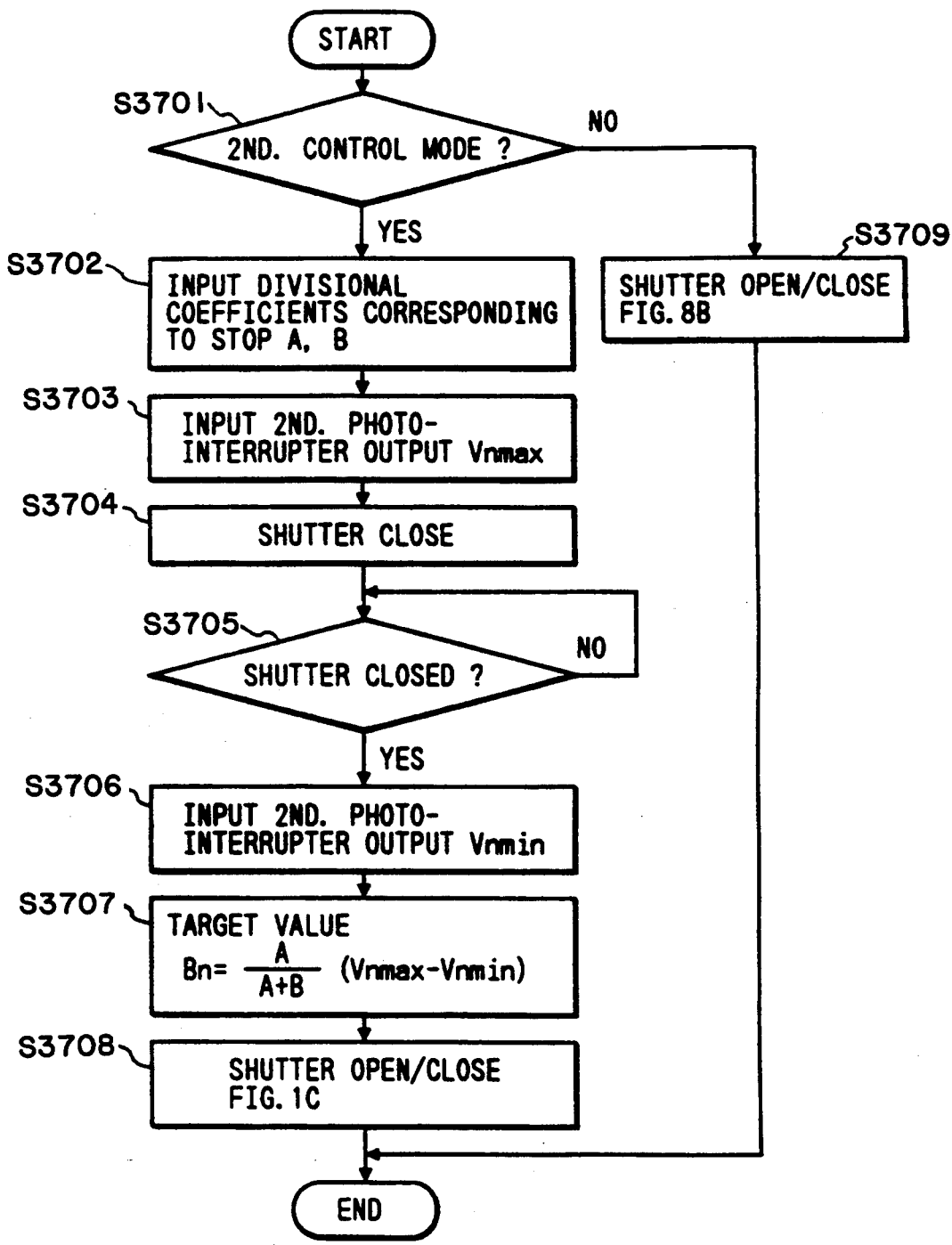
FIG. 37 is a flow chart illustrating the operation of a twenty-third embodiment.

FIG. 37 shows the flow of it and shows a twenty-third embodiment. The difference of the flow of FIG. 37 from the flow of FIG. 35 is that at a step S3703, the output (maximum output) of the second photointerrupter 13 when the shutter is fully open is obtained, whereafter at a step S3704, the shutter is closed, and at a step S3705, the fully closed state of the shutter is confirmed by the timer or the first photointerrupter, whereafter at a step S3706, the output (minimum output) of the second photointerrupter 13 when the shutter is fully closed is obtained, and at a step S3707, the difference between the maximum output and the minimum output is found, and it is divided and the result is used as the target value $B_n$.

According to the above-described method, even if DC offset is created in the output of the second photointerrupter 13, the output of the second photointerrupter 13 corresponding to the desired aperture value can be obtained without any error and the accuracy of calibration can be enhanced.

In the embodiments of FIGS. 33 to 37, the first and second photointerrupters have been described as being used as first and second opening amount detecting means, whereas this is not restrictive, but of course, these photointerrupters can be replaced by magneto-electrical conversion elements such as Hall elements or other sensors such as sensors using an eddy current, and what is important is that means for digitally detecting the amount of opening in a pulse encoder fashion and means for analogously detecting the amount of opening are provided at a time on the shutter, and the second opening amount detecting means is calibrated during the exposure to the image plane by the opening and closing of the shutter. For example, where Hall elements or the like are employed, the position detecting means 310 is magnetized in a slit-like fashion, instead of providing the slits 311, and a highly permeable member or a magnetic member is attached to the protruding portion 12a of the base member 12, and can be opposed to the Hall elements.

As described above, in the device of the present embodiment, the means for digitally detecting the amount of opening and the means for analogously detecting the amount of opening are provided on the shutter, and the means for analogously detecting the amount of opening is calibrated during the exposure to the image plane by the opening and closing of the shutter, whereby both during normal photographing and during stopped-down photographing, exposure can be effected with good accuracy irrespective of any fluctuation of the outputs of the opening amount detecting means.

Figure 38:
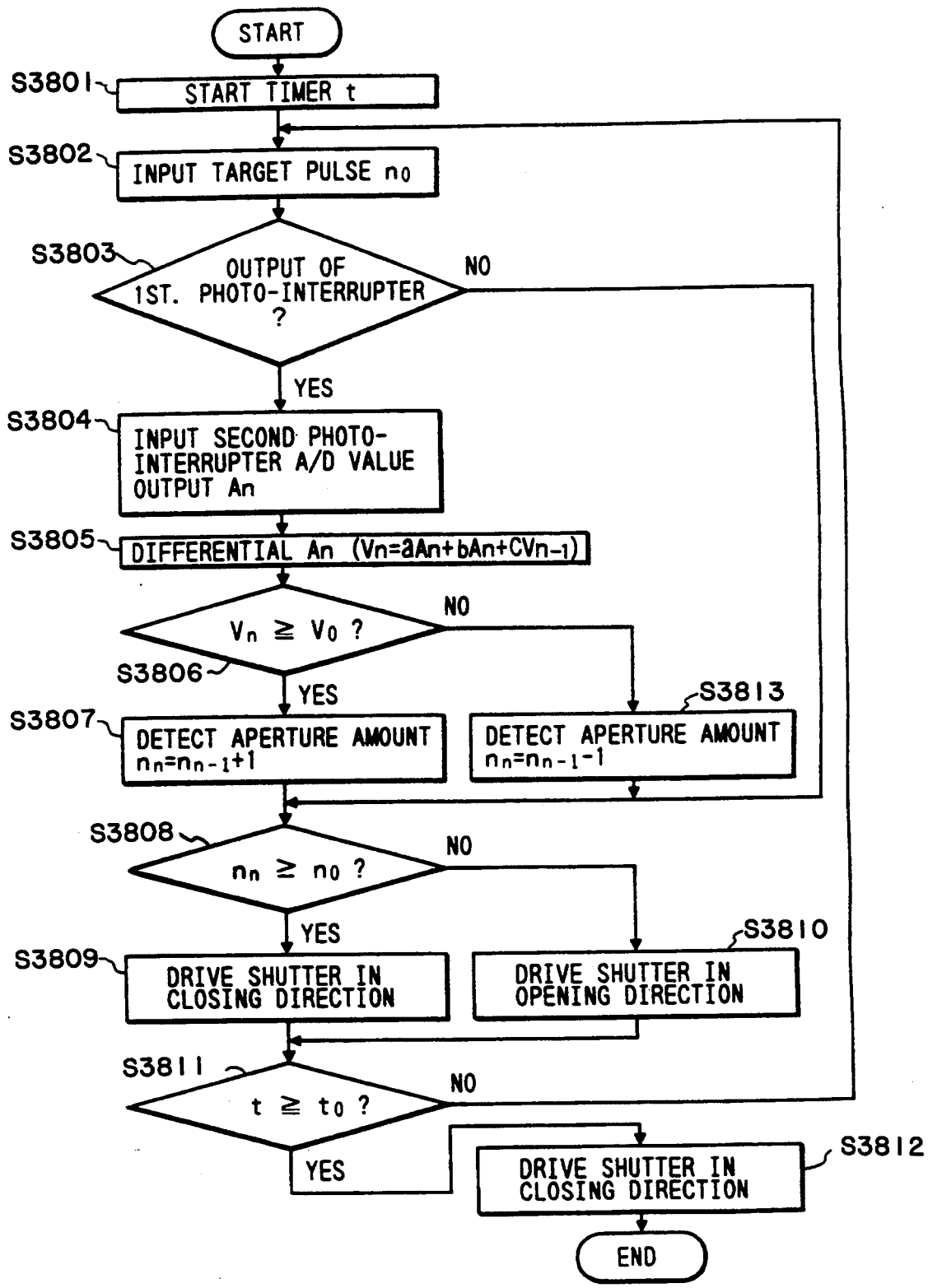
FIG. 38 is a flow chart illustrating the operation of a twenty-fourth embodiment.

FIG. 38 shows the flow of a twenty-fourth embodiment. The shutter device used in this embodiment is of the type of FIG. 12A. This flow is started by the release button being fully depressed, and at a step S3801, an exposure time conforming to the photometric value 310 beings to be counted and at the same time, the first and second photointerrupters begin to be actuated, and at a step S3803, the count number $n_0$ up to the slit 311 (e.g. 311a) corresponding to the desired aperture value (the number of slits from the fully closed state to the slit 311a corresponding to the desired aperture value) is input, and at a step S3803), the number of slits (initially zero) passed through the first photointerrupter is input, and at a step S3804), the A/D-converted value $A_n$ of the output $V_n$ of the second photointerrupter is input and at a step S3805, $V_n$ is differentiated to thereby find the opening speed (from the polarity of which, the direction in which the shutter is moving can be known), and at a step S3806 the polarity is judged, and if the shutter is moving in the opening direction ($V_n \geq V_0$), the slit count is added, and if the shutter is moving in the closing direction ($V_n < V_0$), the slit count is subtracted.

At a step S3807, the pulse $n_n$ of the first photointerrupter is renewed (if there is no variation from the last count $n_{n-1}$), and at a step S3808), it is compared with a target pulse $n_0$ and if it has not reached the target ($n_n < n_0$) (this is because $n_n$ is initially zero), at a step S3811, the shutter is driven in the opening direction, and if at a step S3811 time has not elapsed up to the exposure time t, return is made to the step S3802. On the other hand, if at the step S3803, the pulse count of the first photointerrupter is renewed ($n_n = n_{n+1} + 1$), advance is made to steps S3804→S3805→S3806, the count is increased or decreased by a step S3807 or S3813 in conformity with the direction in which the shutter is moving, to thereby find the amount of opening, and advance is made to a step S3808. When at a step 1−X), the exposure time t has elapsed ($t \geq t_0$), at a step S3811, the shutter is closed, thus terminating the flow. Also if at the step S3808, $n_n \geq n_0$, at a step S3809, the shutter is driven in the closing direction, whereby at the step S3808, $n_n < n_0$ and the shutter is driven in the opening direction and therefore, the shutter is held in the vicinity of the desired aperture value.

In the construction of FIG. 38, the amount of opening of the shutter is not by an analog device detected (but is detected by the counting of the slits) and therefore, any fluctuation of the output of the photointerrupter does not deteriorate the exposure accuracy.

Figure 39B:
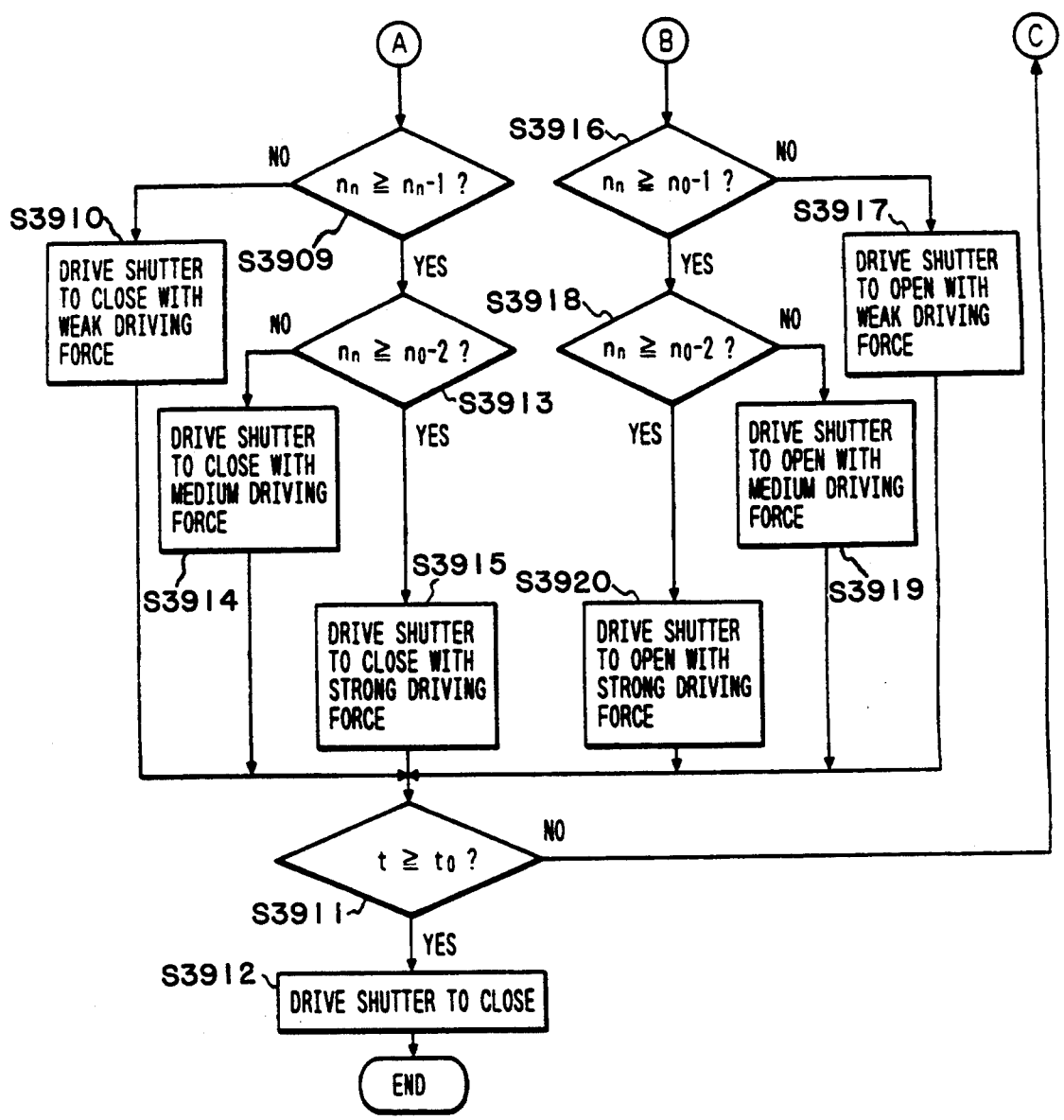
FIG. 39 is comprised of FIGS. 39A and 39B, which are flow charts illustrating the operation of a twenty-fifth embodiment.

FIGS. 39A and 39B show the flows of a twenty-fifth embodiment, and the differences of this flow from the flow of FIG. 38 are that the differentiating operation of the step S3805 is eliminated (this is because differentiation is effected before the input to the microcomputer, and the speed of the microcomputer can be enhanced correspondingly to the fact that differentiation is not effected in the microcomputer (the calculation load is decreased) ), and that at steps S3908, S3909, S3913, S3916 and S3918, the remaining pulses up to the target pulse are obtained and at steps S3910, S3914, S3915, S3917, S3919 and S3920, the driving force (the amount of current applied to the coil) is adjusted in conformity with the amount thereof. More particularly, at the steps S3905, S3906 and S3907, the amount of opening is found, and whether the pulse $n_n$ thereof is greater or smaller than the target pulse $n_0$ is discriminated at the step S3908, and if it is greater than the target pulse $n_0$, the shutter is opened more greatly than the target aperture and therefore, advance is made to the step S3909, and at the step S3909, whether the amount of opening $n_n$ is greater or smaller than the opening aperture smaller by one pulse than the target pulse $n_0$, and if it is smaller (that is, if the shutter is opened by an amount corresponding to one pulse from the target pulse $n_0$), it is very approximate to the target pulse and therefore, at the step S3910 the shutter is driven in the closing direction by a weak driving force (a small current being supplied to the coil), and if it is greater, advance is made to the step S3913 where whether the amount of opening $n_n$ is greater or smaller than the opening aperture smaller by two pulses than the target pulse $n_0$ is discriminated, and if it is smaller (that is, if the shutter is opened by an amount corresponding to two pulses from the target pulse $n_0$), at a step S3914 the shutter is driven in the closing direction by a medium driving force, and if it is greater, the shutter is opened considerably more than the target pulse and therefore, at a step S3915, the shutter is driven in the closing direction by a strong driving force. Also, if at the step S3908 $n_n < n_0$ the shutter is still opened smaller than the target aperture, the difference between $n_n$ and the target pulse $n_0$ is likewise found and in conformity with the amount thereof, the shutter is driven in the closing direction by a strong, medium or weak driving force.

If the above-described driving is effected, the driving force can be weakened as the target value $n_0$ is approached, and therefore the overshooting of the amount of opening $n_n$ relative to the target value $n_0$ is eliminated.

Figure 40B:
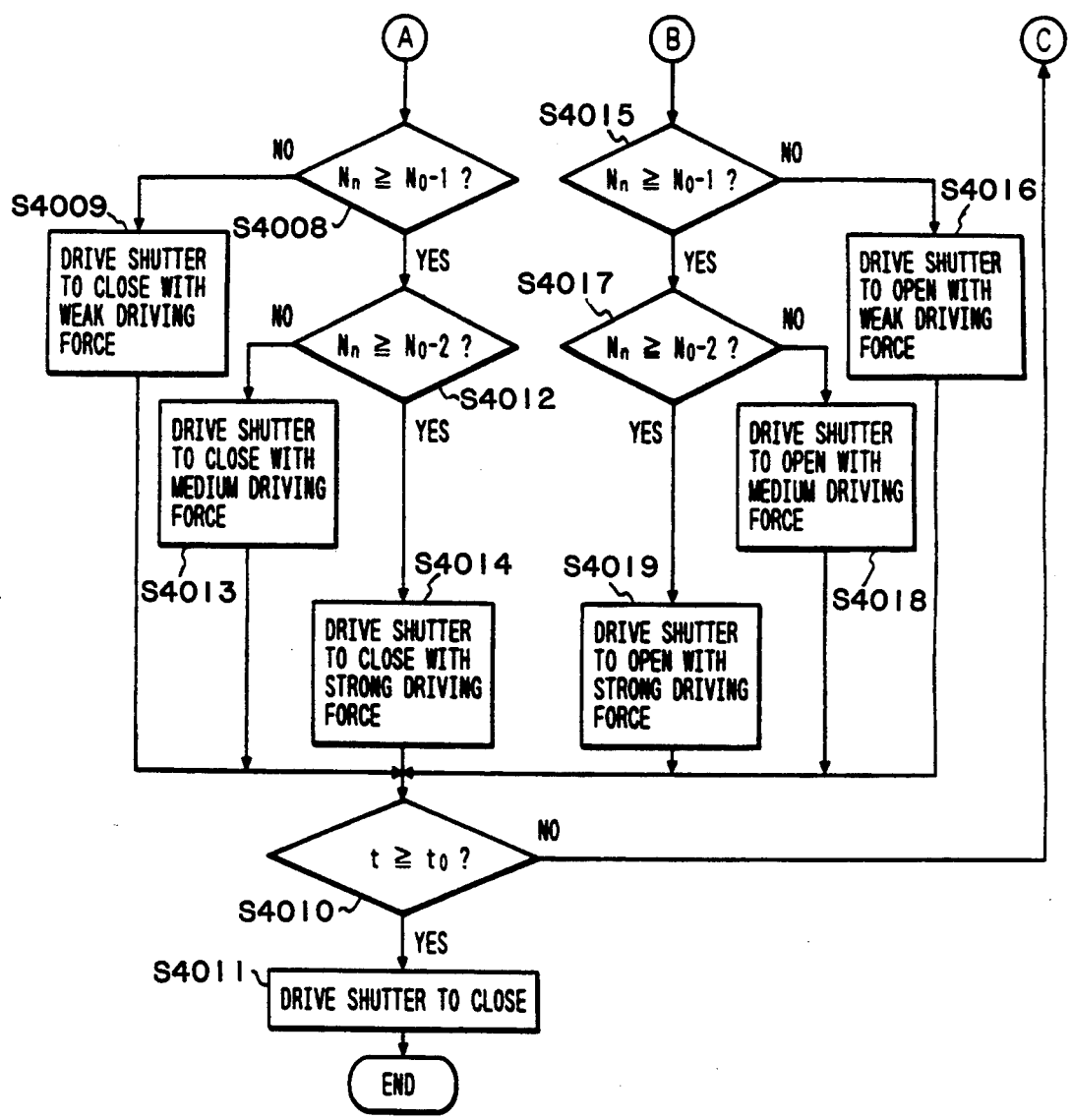
FIG. 40 is comprised of FIGS. 40A and 40B, which are flow charts illustrating the operation of a twenty-sixth embodiment.

FIGS. 40A and 40B show a twenty-sixth embodiment of the present invention. In FIGS. 39A and 39B, the output of the second photointerrupter 13 is differentiated in the microcomputer to find the opening speed and the opening direction is discriminated on the basis of the result thereof steps S3904 and S3905 while in FIGS. 40A and 40B at a step S4004 the A/D-converted value $A_n$ of the output of the second photointerrupter is input, and at a step S4004 it is compared with the last input value $A_{n-1}$ and if $A_n > A_{n-1}$, it is judged that the smaller is moving in the opening direction, and if $A_n < A_{n-1}$, it is judged that the shutter is moving in the closing direction, and in conformity therewith, the opening pulse is increased or decreased to find the amount of opening and thereby control the driving. With such a method, it becomes unnecessary to effect the differentiating operation and the differentiating circuit also becomes unnecessary.

As described above, the device of the present embodiment is provided with position detecting means for counting the output pulse to thereby detect the amount of opening of the shutter, and driving direction detecting means for detecting the direction in which the shutter is driven, whereby exposure can be effected highly accurately irrespective of temperature, humidity, lapse of time and individual difference, and stopped-down photographing can also be effected highly accurately.

What is claimed is:

1. An exposure control device comprising:
   first opening state determination means for digitally determining an aperture opening state;
   second opening state determination means for determining by analog means the aperture opening state; and
   control means for controlling the aperture opening state in accordance with information from at least one of said first opening state determination means and said second opening state determination means.

2. An exposure control device comprising:
   first opening state determination means for determining an aperture opening varying amount;
   second opening state determination means for determining an aperture opening position; and
   control means for controlling an aperture opening state in accordance with information of at least one of said first opening state determination means and said second opening state determination means.

3. An exposure control device comprising:
   first opening state determination means for coarsely determining an aperture opening state;
   second opening state determination means for finely determining the aperture opening state; and
   control means for controlling the aperture opening state in accordance with information from at least one of said first opening state determination means and said second opening state determination means.

4. An exposure control device according to any one of claims 1 or 2 or 3, wherein said first opening state determination means includes means for counting a plurality of output pulses created on the basis of a movement of a moving member adapted to move to vary an aperture opening amount, thereby digitally determining the aperture opening amount.

5. An exposure control device according to claim 4 wherein said second opening state determination means includes a sensor for producing a signal corresponding to a position of a moving member adapted to move, to vary an aperture opening amount, thereby determining by analog means the aperture opening amount.

6. An exposure control device according to claim 5, wherein said control means includes means for determining an aperture opening direction in accordance with the information from said second opening state determination means when said plurality of output pulses as the information from said first opening state determination means are created.

7. An exposure control device according to claim 4, wherein said control means includes means specifying information with respect to said plurality of output pulses.

8. An exposure control device according to claim 7, wherein said control means includes means for maintaining an aperture opening amount in accordance with the information specified by said second opening state determination means.

9. An exposure control device according to claim 4, wherein said control means includes means controlling the aperture opening amount so as to maintain the value of the information from said second opening amount detecting means at the time when outputting of n pulses of said plurality of output pulses.

10. An exposure control device according to any one of claims 1 or 2 or 3, further comprising photometry means for detecting an object brightness.

11. An exposure control device according to claim 10, wherein said control means includes means for correcting the information from said second opening state determination means in accordance with the detected information from said photometry means.

12. An exposure control device according to any one of claims 1 or 2 or 3, wherein said second opening state determination means includes a sensor for producing a signal corresponding to a position of a moving member adapted to move, to vary an aperture opening amount, thereby determining by analog means the aperture opening amount.

13. An exposure control device according to claim 12, wherein said second control means includes means for using the information from said second opening means as divided memory information.

14. An exposure control device according to any one of claims 1 or 2 or 3, wherein said control means includes means for using the information from said second opening state determination means at a time when said shutter is fully closed and the information from said second opening state determination means at a time when said shutter is fully open, thereby determining the information from said second opening state determination means.

15. An exposure control device according to any one of claims 1 or 2 or 3, wherein said control means includes means for slowing down a driving speed of opening an aperture as the information from said second opening state determination means approaches a target value.

16. A device according to any one of claims 1 or 2 or 3, further comprising:
a shutter for changing the aperture opening state.

17. A device according to any one of claims 1 or 2 or 3, wherein at least one of said first opening state determination means and said second opening state determination means includes means for determining an aperture opening amount.

18. A device according to claim 17, wherein said control means includes means for controlling the aperture opening amount.

19. A device according to any one of claims 1 or 2 or 3, wherein said control means includes means for controlling an aperture opening amount.

20. A camera having an exposure control device, comprising:
photometry means for detecting a luminance of an object;
first opening state determination means for determining an aperture opening varying amount;
second opening state determination means for determining an aperture opening position; and
control means for controlling an aperture opening state in accordance with information from said photometry means, said control means using information from at least one of said first opening state determination means and said second opening state determination means to control the aperture opening state.

21. A camera comprising:
first opening state determination means for digitally determining an aperture opening state;
second opening state determination means for determining by analog means the aperture opening state; and
control means for controlling the aperture opening state in accordance with information from at least one of said first opening state determination means and said second opening state determination means.

22. A camera comprising:
photometry means for detecting a luminance of an object;
first opening state determination means for coarsely determining an aperture opening state;
second opening state determination means for finely determining the aperture opening state; and
control means for controlling the aperture opening state in accordance with information of said photometry means, said control means using information from at least one of said first opening state determination means and said second opening state determination means.

23. A camera according to any one of claims 20 or 21 or 22, wherein said first opening state determination means includes means for counting a plurality of output pulses created on the basis of a movement of a moving member adapted to move, to vary an aperture opening amount, thereby digitally determining the aperture opening amount.

24. A crane according to claim 23, wherein said second opening state determination means includes a sensor for producing a signal corresponding to a position of a moving member adapted to move, to vary an aperture opening amount, thereby determining by analog means the aperture opening amount.

25. A camera according to claim 24, wherein said control means includes means for determining an aperture opening direction in accordance with the information from said second opening state determination means when said plurality of output pulses as the information from said first opening state determination means are created.

26. A crane according to claim 23, wherein said control means includes means specifying information with respect to said plurality of output pulses.

27. A camera according to claim 26, wherein said control means includes means for maintaining an aperture opening amount in accordance with the information specified by said second opening state determination means.

28. A camera device according to claim 23, wherein said control means includes means controlling the aperture opening amount so as to maintain the value of the information from said second opening amount detecting means at the time when outputting of n pulses of said plurality of output pulses.

29. A camera according to any one of claims 20 or 39 or 22, wherein said photometry means includes means for detecting light passed through an aperture to be controlled.

30. A crane according to claim 29, wherein said control means includes means for correcting the information from said second opening state determination means in accordance with the detected information from said photometry means.

31. A camera according to any one of claims 20 or 21 or 22, wherein said second opening state determination means includes a sensor for producing a signal corresponding to a position of a moving member adapted to move, to vary an aperture opening amount, thereby determining by analog means the aperture opening amount.

32. An exposure control device according to claim 31, wherein said second control means includes means for using the information from said second opening means as divided memory information.

33. A camera according to any one of claims 20 or 21 or 22, wherein said control means includes means for using the information from said second opening state determination means at a time when said shutter is fully closed and the information from said second opening state determination means at a time when said shutter is fully open, thereby determining the information from said second opening state determination means.

34. An exposure control device according to any one of claims 20 or 21 or 22, wherein said control means includes means for slowing down a driving speed of opening an aperture as the information from said second opening state determination means approaches a target value.

35. A camera according to any one of claims 20 or 21 or 22, wherein said control means includes means for keeping a predetermined amount of an aperture in accordance with the information from said second opening state determination means and thereafter bringing the aperture into a fully closed state.

36. A camera according to any one of claims 20 or 21 or 22, wherein said control means includes means for forcing an aperture to be opened and closed before actual exposure.

37. A camera comprising:
first opening state determination means for determining an aperture opening varying amount;
second opening state determination means for determining an aperture opening position; and
control means for controlling an aperture opening state in accordance with information of at least one of said first opening state determination means and said second opening state determination means.

38. A camera comprising:
first opening state determination means for coarsely determining an aperture opening state;
second opening state determination means for finely determining the aperture opening state; and
control means for controlling the aperture opening state in accordance with information from at least one of said first opening state determination means and said second opening state determination means.

39. A camera comprising:
photometry means for detecting a luminance of an object;
first opening state determination means for digitally determining an aperture opening state;
second opening state determination means for determining by analog means the aperture opening state; and
control means for controlling the aperture opening state in accordance with information of said photometry means, said control means using information from at least one of said first opening state determination means and said second opening state determination means.

40. A camera according to any one of claims 20 or 39 or 22, further comprising a shielding member disposed between a shutter and an exposing surface and adapted to be changed over to a state in which said exposing surface is shielded from light passed through an opening of the shutter and a state in which said exposing surface is not shielded from the light passed through the opening of the shutter.

41. A camera according to claim 40, wherein said shielding member includes a movable mirror.

42. A camera according to claim 41, wherein said photometry means includes means for detecting a light reflected by a mirror surface of said movable mirror.

43. A camera according to any one of claims 20 or 21 or 37 or 38 or 39 or 22, and further including:
a shutter for changing the aperture opening state.

44. A camera according to any one of claims 20 or 21 or 37 or 38 or 39 or 22, wherein at least one of said first opening state determination means and said second opening state determination means includes means for determining an aperture opening amount.

45. A camera according to claim 44, wherein said control means includes means for controlling the aperture opening amount.

46. A camera according to any of claims 20 or 21 or 37 or 38 or 39 or 22, wherein said control means includes means for controlling an aperture opening amount.

* * * * *

UNITED STATES PATENT AND TRADEMARK OFFICE
CERTIFICATE OF CORRECTION

PATENT NO. : 5,402,202
DATED : March 28, 1995
INVENTOR(S) : KOICHI WASHISU, ET AL.

It is certified that error appears in the above-indentified patent and that said Letters Patent is hereby corrected as shown below:

Figure 4A, In the Drawings:
    "PHOTOMETRING" should read --PHOTOMETERING--.
Figure 17B,
    "PHOTOMETRING" (both occurrences) --PHOTOMETERING--.
Figure 18A,
    "PHOTOMETRING" (three occurrences) --PHOTOMETERING--.
Column 1,
    line 31, "limit" should read --limiting--;
    line 52, "as controlled." should read --by the driving circuit 317.--; and
    line 62, "drive" should read --drives--.
Column 2,
    line 2, "as controlled" should be deleted;
    line 3, "direction by" should read --direction as controlled by--; and
    line 29, "step S801," should read --step S804,--.
Column 5,
    line 24, "to 1B" should read --and 1B--; and
    line 44, "FIG. 8A" should read --FIGS. 8A--.

UNITED STATES PATENT AND TRADEMARK OFFICE
CERTIFICATE OF CORRECTION

PATENT NO. : 5,402,202
DATED : March 28, 1995
INVENTOR(S) : KOICHI WASHISU, ET AL.

It is certified that error appears in the above-indentified patent and that said Letters Patent is hereby corrected as shown below:

Column 7,
    line 35, "output" should read --analog--.
Column 10,
    line 54, "step S-25," should read --step S425--.
Column 12,
    line 20, "is" should read --are--; and
    line 48, "S718," should read --S728,--.
Column 13,
    line 24, "the-base" should read --the base--.
Column 16,
    line 13, "shorten" should read --shorter--.
Column 17,
    line 24, "S1720," should read --S1722,--; and
    line 27, "S1720" should read --S1722--.
Column 18,
    line 11, "S1829," should read --S1828,--;
    line 12, "S-89," should read --S1829,--; and
    line 14, "S-75" should read --S1801--.

UNITED STATES PATENT AND TRADEMARK OFFICE
CERTIFICATE OF CORRECTION

PATENT NO. : 5,402,202
DATED : March 28, 1995
INVENTOR(S) : KOICHI WASHISU, ET AL.

It is certified that error appears in the above-indentified patent and that said Letters Patent is hereby corrected as shown below:

Column 19,
    line 54, "be," should read --be--.
Column 20,
    line 54, "$Bn_1$," should read --$Bn^1$--.
Column 21,
    line 5, "to" should be deleted.
Column 22,
    line 29, "S2702" should read --S2707--.
Column 24,
    line 51, "A:B)" should read --A:B--.
Column 25,
    line 38, "desired output" should read --desired aperture value will be correct, but if there is an output--;
    line 39, "aperture" should be deleted;
    line 40, "value will be correct, but if there is an" should be deleted; and
    line 61, "(mini,hum" should read --(minimum--.

UNITED STATES PATENT AND TRADEMARK OFFICE
CERTIFICATE OF CORRECTION

PATENT NO. : 5,402,202
DATED : March 28, 1995
INVENTOR(S) : KOICHI WASHISU, ET AL.

Page 4 of 5

It is certified that error appears in the above-indentified patent and that said Letters Patent is hereby corrected as shown below:

<u>Column 27,</u>
line 32, "step iii)'" should read --step S3304--; and
line 49, "S3405, S3409" should read --S3405-3409--.

<u>Column 28,</u>
line 26, "S3506" should read --S3506.--;
line 28, "shuttle" should read --shutter--; and
line 53, "becomes" should read --it becomes--.

<u>Column 30,</u>
line 52, "S3811," should read --S3810,--;
line 61, "step 1-X)." should read --step S3811.--; and
line 62, "S3811," should read --S3812,--.

<u>Column 31,</u>
line 45, "S3908" should read --S3908,--;
line 61, "steps S3904 and S3905" should read --(steps S3904 and S3905),--;
line 66, "smaller" should read --shutter--; and
line 67, "$A_n < A_{n-1}$'" should read --$A_n < A_{n-1}$,--.

UNITED STATES PATENT AND TRADEMARK OFFICE
CERTIFICATE OF CORRECTION

PATENT NO. : 5,402,202
DATED : March 28, 1995
INVENTOR(S) : KOICHI WASHISU, ET AL.

It is certified that error appears in the above-indentified patent and that said Letters Patent is hereby corrected as shown below:

Column 32,
    line 52, "claim 4" should read --claim 4,--.
Column 34,
    line 38, "crane" should read --camera--; and
    line 51, "crane" should read --camera--.
Column 35,
    line 13, "An exposure control device" should read --A camera--;
    line 25, "An exposure control device" should read --A camera--; and
    line 31, "crane" should read --camera--.

Signed and Sealed this

Fourth Day of July, 1995

Attest:

*Attesting Officer*

BRUCE LEHMAN

*Commissioner of Patents and Trademarks*